US008750841B2

(12) United States Patent
Johnson et al.

(10) Patent No.: US 8,750,841 B2
(45) Date of Patent: Jun. 10, 2014

(54) SYSTEM AND METHOD FOR AUTOMATICALLY LEAVING AN OUTGOING CALLER MESSAGE

(76) Inventors: William J. Johnson, Flower Mound, TX (US); Jason M. Johnson, Flower Mound, TX (US)

(*) Notice: Subject to any disclaimer, the term of this patent is extended or adjusted under 35 U.S.C. 154(b) by 427 days.

(21) Appl. No.: 12/800,395

(22) Filed: May 14, 2010

(65) Prior Publication Data

US 2010/0227595 A1 Sep. 9, 2010

Related U.S. Application Data

(63) Continuation-in-part of application No. 12/590,831, filed on Nov. 13, 2009, and a continuation-in-part of application No. 12/287,064, filed on Oct. 3, 2008, and a continuation-in-part of application No. 12/077,041, filed on Mar. 14, 2008.

(51) Int. Cl.
*H04M 3/42* (2006.01)
(52) U.S. Cl.
USPC .... 455/414.1; 455/41.2; 455/411; 455/412.2; 455/413; 455/456.1; 455/456.2; 455/456.3
(58) Field of Classification Search
USPC ............................................. 455/41.2, 414.1
See application file for complete search history.

(56) References Cited

U.S. PATENT DOCUMENTS

| | | | |
|---|---|---|---|
| 4,644,351 A | 2/1987 | Zabarsky et al. | |
| 5,195,031 A | 3/1993 | Ordish | |
| 5,337,044 A | 8/1994 | Folger et al. | |
| 5,469,362 A | 11/1995 | Hunt et al. | |
| 5,758,049 A | 5/1998 | Johnson et al. | |
| 5,835,061 A | 11/1998 | Stewart | |
| 5,969,678 A | 10/1999 | Stewart | |
| 6,073,062 A | 6/2000 | Hoshino et al. | |
| 6,236,365 B1 | 5/2001 | LeBlanc et al. | |
| 6,246,948 B1 | 6/2001 | Thakker | |
| 6,252,544 B1 | 6/2001 | Hoffberg | |
| 6,259,405 B1 | 7/2001 | Stewart et al. | |
| 6,266,615 B1 | 7/2001 | Jin | |
| 6,326,918 B1 | 12/2001 | Stewart | |
| 6,345,288 B1 | 2/2002 | Reed et al. | |
| 6,381,311 B2 * | 4/2002 | Joyce et al. | 379/88.23 |
| 6,405,123 B1 | 6/2002 | Rennard et al. | |
| 6,414,635 B1 | 7/2002 | Stewart et al. | |
| 6,452,498 B2 | 9/2002 | Stewart | |
| 6,456,234 B1 | 9/2002 | Johnson | |
| 6,571,279 B1 | 5/2003 | Herz et al. | |
| 6,615,131 B1 | 9/2003 | Rennard et al. | |
| 6,697,018 B2 | 2/2004 | Stewart | |

(Continued)

*Primary Examiner* — Liton Miah
(74) *Attorney, Agent, or Firm* — Yudell Isidore Ng Russell PLLC

(57) ABSTRACT

Provided is a system and method for automatically leaving an Outgoing Caller Message (OCM) at a callee's (i.e. called) recording system. If a mobile caller reaches an OutGoing Message (OGM) from a callee's system because the callee does not answer, the caller can opt to automatically leave a preconfigured message instead of spending time leaving a message. An OCM background thread of processing is started at the mobile device for taking over the active call, and the initial active call processing thread terminates for releasing user interface focus so the caller is free to perform other application processing while background processing occurs. The OCM background thread determines the best OCM to leave, for example based in part on a situational location of the mobile caller, and then automatically leaves the OCM at the callee's system before terminating the call.

16 Claims, 37 Drawing Sheets

(56) References Cited

U.S. PATENT DOCUMENTS

| | | |
|---|---|---|
| 6,731,238 B2 | 5/2004 | Johnson |
| 6,759,960 B2 | 7/2004 | Stewart |
| 7,009,556 B2 | 3/2006 | Stewart |
| 7,386,396 B2 | 6/2008 | Johnson |
| 8,090,387 B1 * | 1/2012 | Batson, Jr. ............... 455/456.3 |
| 8,265,664 B1 * | 9/2012 | Cenciarelli et al. ........... 455/466 |
| 2002/0035493 A1 | 3/2002 | Mozayeny et al. |
| 2002/0046069 A1 | 4/2002 | Mozayeny et al. |
| 2002/0046077 A1 | 4/2002 | Mozayeny et al. |
| 2002/0091991 A1 | 7/2002 | Castro |
| 2002/0095454 A1 * | 7/2002 | Reed et al. .................... 709/201 |
| 2004/0151151 A1 | 8/2004 | Kubler et al. |
| 2004/0228330 A1 | 11/2004 | Kubler et al. |
| 2004/0246940 A1 | 12/2004 | Kubler et al. |
| 2004/0252051 A1 | 12/2004 | Johnson |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2006/0022048 A1 | 2/2006 | Johnson |
| 2006/0252465 A1 * | 11/2006 | Karstens et al. .............. 455/567 |
| 2007/0005188 A1 | 1/2007 | Johnson |
| 2007/0232326 A1 | 10/2007 | Johnson |
| 2007/0233387 A1 | 10/2007 | Johnson |
| 2007/0276587 A1 | 11/2007 | Johnson |
| 2008/0030308 A1 | 2/2008 | Johnson |
| 2008/0170679 A1 * | 7/2008 | Sheha et al. .............. 379/201.06 |
| 2008/0301561 A1 * | 12/2008 | Bain .............................. 715/730 |
| 2009/0067593 A1 * | 3/2009 | Ahlin .......................... 379/88.22 |
| 2009/0167524 A1 * | 7/2009 | Chesnutt et al. ......... 340/539.19 |
| 2009/0190734 A1 * | 7/2009 | White et al. ............. 379/201.02 |
| 2010/0056113 A1 * | 3/2010 | Silverman ..................... 455/413 |
| 2010/0159946 A1 * | 6/2010 | Cheung et al. ............. 455/456.1 |

* cited by examiner

// Figs. 30A through 30E syntaxes (e.g. delimiters, etc) used should enforce
// appropriate unambiguous grammar parsability for Lex&Yacc, top down
// recursive parsing, XML encoding, other syntactic embodiments, applicable semantic
// representations, and any other syntactic/semantic embodiments. Figs. 30A through 30E BNF
// grammar elaborates for a corresponding interpreter, recommended syntaxes, programming
// language structures and/or objects, DB schemas, ANSI datastream encoding (e.g. X.409),
// flowchart processing blocks and locations in parent application flowcharts, and any other
// analogous implementation embodiments or subsets thereof.

// *** Common BNF grammar (e.g. in Data 8): ***

Variables         = "null" | Variables Variable
        // Variables are placed anywhere; Can be used for referencing (a="..." b=a  c=b)

Variable          = VarType(VarName) = "null" | VarType(VarName) = ...value(s)... |
                    VarType(VarName) = [ Variables ] [ VarInstantiations ] |
                    VarType(VarName) = [ VarInstantiations ] [ Variables ]
        // Variables scope to following & descending nesting; "value" has appropriate syntax
        // per VarType; VarName can be set to other variables (e.g. indirect tree structure)

VarInstantiations = "null" | VarInstantiations VarInstantiate

VarInstantiate    = *VarName(Param1="x1", Param2="x2", ... ParamN="xN")  for N >= 0
        // Parameters allow optionally substituting occurrences in VarName with new values
        // prior to instantiation.

VarName           = "text string"

Description       = "null" | "text string" | VarInstantiate

History           = [ CreatorInfo ] [ ModifierInfo ] | VarInstantiations

CreatorInfo       = "null" | [ CreateDateTime ] [ CreatorID ] [ CreatorIDType ]
                    [ CreatorAddr ] [ CreatorSysID ] [ CreatorSysType ]
                    [ CreatorSysAddr ] | VarInstantiations ModifierInfo      = "null" | [ LastModifyDateTime ] [ LastModifyID ]
          [ LastModifyIDType ] [ LastModifyAddr ] [ LastModifySysID ]
          [ LastModifySysType ] [ LastModifySysAddr ] | VarInstantiations CreateDateTime    = "date/time stamp" | VarInstantiate CreatorID         = ID CreatorIDType     = IDType

*Fig. 8A*

```
CreatorAddr         = Address

CreatorSysID        = "text string" | VarInstantiate

CreatorSysType      = "system type" | VarInstantiate    // e.g. type of MS

CreatorSysAddr      = Address

LastModifyDateTime  = "date/time stamp" | VarInstantiate

LastModifyID        = ID

LastModifyIDType    = IDType

LastModifyAddr      = Address

LastModifySysID     = "text string" | VarInstantiate

LastModifySysType   = "system type" | VarInstantiate

LastModifySysAddr   = Address

ID                  = "MS ID" [ Description ] [ History ] |
                      "MS Group ID" [ Description ] [ History ] | "User ID" [ Description ] [ History ] |
                      "User Group ID" [ Description ] [ History ] | "logical handle" [ Description ] [ History ] |
                      "physical handle" [ Description ] [ History ] | VarInstantiations IDType              = "MS_ID" | "MS_Group_ID" | "User_ID" | "User_Group_ID" |
                      "logical_handle" | "physical_handle" | VarInstantiate Address             = "ip address" | "SNA address" | "Postal address" |
                      "point" | "logical address" | "physical address" | "situational location" |
                      "2 dimensional area" | "3 dimensional area" | VarInstantiate TimeSpec            = "Xdate/time stamp" | "Xdate/time period" | VarInstantiate VarType             = Description | History | ID | IDType | CreatorInfo | ModifierInfo |
                      CreateDateTime | CreatorID | CreatorIDType | CreatorAddr | CreatorSysID |
                      CreatorSysType | CreatorSysAddr | LastModifyDateTime | LastModifyID |
                      LastModifyIDType | LastModifyAddr | LastModifySysID | LastModifySysType |
                      LastModifySysAddr | Address | "Xdate/time stamp" | "Xdate/time period" | "text string" |
                      "system type" | TimeSpec | "MS ID" | "MS Group ID" | "User ID" | "User Group ID" |
                      "logical handle" | physical handle" | "...Address elaborations..." |
                      "...IDType elaborations..." | Variable // | VarInstantiate here as well (but elaborates)
```

```
// ***** BNF grammar for Permissions 10: *****

PermissionBody    = "null" | [ Variables ] [ Permissions ]
        // [ Variables ] placed anywhere (not shown in constructs below to enhance readability)

Permissions       = "null" | Permissions Permission | VarInstantiations

Permission        = Grantor Grantee [ Grants ] [ TimeSpec ] [ Description ] [ History ] |
                        VarInstantiations
        // No Grants implies granting all permissions; This embodiment ensures non-null
        // Grantor and Grantee, but "null" could be used (e.g. for placeholder entries).

Grantor           = ID [ IDType ] | VarInstantiations
        // ID defaults (e.g. MS ID) when IDType not present Grantee           = ID [ IDType ] | VarInstantiations Grants            = "null" | Grants Grant | Privileges | VarInstantiations Grant             = "grant name" AND (Privileges [ TimeSpec ] [ Description ] [ History ] |
                        Grants [ TimeSpec ] [ Description ] [ History ] |
                        VarInstantiations)

Privileges        = "null" | Privileges Privilege | VarInstantiations

Privilege         = "atomic privilege for assignment" [ MSRelevance ]
                        [ TimeSpec ] [ Description ] [ History ] | VarInstantiations MSRelevance       = "MS relevance descriptor"

Groups            = "null" | Groups Group | VarInstantiations

Group             = "group name" AND (IDs [ Description ] [ History ] |
                        Groups [ Description ] [ History ] |
                        VarInstantiations)

IDs               = "null" | IDs ID [ IDType ] | VarInstantiations

VarType           = *VarType | Permissions | Permission | Grantor | Grantee | Grants |
                        Grant | Privileges | Privilege | MSRelevance | Groups | Group |
                        IDs
```

*Fig. 8C*

```
// ***** BNF grammar for Charters 12: *****
```
                                                                                    ╱— 3068a CharterBody       = "null" | [ Variables ] [ Charters ]
        // [ Variables ] placed anywhere (not shown in constructs below to enhance readability)

Charters          = "null" | Charters Charter | VarInstantiations

Charter           = Grantee Grantor Expression Actions [ TimeSpec ] [ Description ]
                       [ History ] | VarInstantiations Expression        = Conditions [ TimeSpec ] | VarInstantiations
        // This embodiment ensures at least one condition to a Charter, but "null" could be
        // used (e.g. for placeholder entries).

Conditions        = Condition | Conditions CondOp Condition] | VarInstantiations CondOp            = "and" | "or" | VarInstantiations Condition         = Term Op Term [ TimeSpec ] [ Description ] [ History ] |
        Value [ TimeSpec ] [ Description ] [ History ] |
        Invocation [ TimeSpec ] [ Description ] [ History ] | VarInstantiations
        // Another embodiment allows unary operators (e.g. "not"), for example for boolean
        // WDR fields (e.g. Applications field(s)). Current boolean tests for "True" or "False",
        // or non-zero = "True" and zero = "False". Value & Invocation result in a boolean.

Term              = WDRTerm  [ TimeSpec ] [ Description ] [ History ] |
                    AppTerm  [ TimeSpec ] [ Description ] [ History ] |
                    Value    [ TimeSpec ] [ Description ] [ History ] |
                    Invocation [ TimeSpec ] [ Description ] [ History ] |
                    PointSet [ TimeSpec ] [ Description ] [ History ] |
                    VarInstantiate WDRTerm           = "Any WDR 1100 field, or any subset thereof" [ Description ]
                       [ History ] | VarInstantiate AppTerm           = "Any Application data field, or any subset thereof" [ Description ]
                       [ History ] | VarInstantiate Value             = Data | "number" | "text string" | "value" | "True" | "False" |
                       "atomic term" | "map term" | ID [ IDType ] | "null" | VarInstantiate PointSet          = [2D | 3D] [Geo | Cartesian | Polar]
                       "text string" [ Description ] [ History ] |
                       "numeric(s)" [ Description ] [ History ] |
                       Data [ Description ] [ History ] | VarInstantiate

Data            = "typed memory pointer" | "typed memory value" | "typed file path" |
                  "typed file path and offset" | "typed DB qualifier" | VarInstantiate
    // i.e. pointer or value from stack, globals, shared memory, file data location, DB
    // pointer, DB value, or any other data.

Invocation      = "DLL interface(optional params...)" |
                  "Linked interface(optional params...)" |
                  "executable path(optional params...)" | VarInstantiate
    // Invocation can return any value of any type, except will be converted to a boolean
    // when used as a Term (0 = False, else = True). Best to return boolean when Term use.

Op              = [ "atomic not operator" ] "atomic operator" | ProfileMatch |
                  VarInstantiate ProfileMatch    = "atomic profile match operator" | VarInstantiate Actions         = "null" | Actions Action Action          = [ Host ] Command Operand [Parameters]
                  [ TimeSpec ] [ Description ] [ History ] | VarInstantiations Host            = "null" | ID [IDType] | VarInstantiations Command         = "atomic command" | VarInstantiations
    // Command may map to translation member entry of natural language map Operand         = "atomic operand" | VarInstantiations
    // Some embodiments have no need for an operand in this grammar (e.g. command file
    // reference, DLL call, self contained command, invocation callout, etc).

Parameters      = "null" | Parameters Parameter | VarInstantiations

Parameter       = WDRTerm [ Description ] [ History ] |
                  AppTerm [ Description ] [ History ] |
                  Value [ Description ] [ History ] |
                  Invocation [ Description ] [ History ] |
                  ID [ IDType ] [ Description ] [ History ] |
                  VarInstantiate [ Description ] [ History ]

VarType         = *VarType | Charters | Charter | Expression | Conditions | Condition |
                  CondOp | WDRTerm | Term | Value | PointSet | Data | Invocation | Op |
                  Actions | ProfileMatch | Action | Command | Operand | Parameters |
                  Parameter | Host

*Fig. 8E*

| appname | Application Description | Status |
|---|---|---|
| source | Configurable MS ID | Registered |
| profile | % and # operator object | Registered |
| email | Electronic mail | Registered |
| calendar | Electronic calendar | Registered |
| ab | Electronic address book | Registered |
| phone | Electronic phone | Registered |
| emergency | Emergency use | Registered |
| loc | LBX locational data sharing | Registered |
| rfid | Radio Frequency Identification | Registered |
| hotspot | Wifi/Wimax/Xan | Registered |
| services | Published services for service propagation | Registered |
| statistics | MS statistics (may be shared between MSs) | Registered |
| traffic | Traffic Reports | RFP |
| appliance | Appliance Control | RFP |
| acctmgt | Account Management (ATM, Banking) | RFP |
| transport | Public Transportation (Bus, Taxi, Air, Train) | RFP |
| carpool | Automotive "car-pooling" | RFP |
| advertise | Advertising | RFP |
| news | News | RFP |
| media | Video, Pictures | RFP |
| parking | Parking lot awareness | RFP |
| employ | Employment, Job Awareness | Presented |
| real | Real Estate | Presented |
| personal | Personal Use | Tabled |

*Fig. 14*

```
                    ┌─ 9850
     ┌──────────────────────────────┐
     │           HANDLE             │─ 9850a
     ├──────────────────────────────┤
     │            TYPE              │─ 9850b
     ├──────────────────────────────┤
     │          MESSAGE             │─ 9850c
     ├──────────────────────────────┤
     │            USE               │─ 9850d
     ├──────────────────────────────┤
     │          DEFAULT             │─ 9850e
     ├──────────────────────────────┤
     │           INTENT             │─ 9850f
     ├──────────────────────────────┤
     │         EXPRESSION           │─ 9850g
     ├──────────────────────────────┤
     │      DELIVERY CRITERIA       │─ 9850h
     ├──────────────────────────────┤
     │          HISTORY             │─ 9850i
     ├──────────────────────────────┤
     │           ACTIVE             │─ 9850j
     ├──────────────────────────────┤
     │      FILTER JOIN VALUE       │─ 9850k
     ├──────────────────────────────┤
     │        DESCRIPTION           │─ 9850l
     └──────────────────────────────┘

┌─ 9855
     ┌──────────────────────────────┐
     │      FILTER JOIN VALUE       │─ 9855a
     ├──────────────────────────────┤
     │       FILTER JOIN TYPE       │─ 9855b
     ├──────────────────────────────┤
     │            DATA              │─ 9855c
     ├──────────────────────────────┤
     │        DESCRIPTION           │─ 9855d
     ├──────────────────────────────┤
     │          HISTORY             │─ 9855e
     └──────────────────────────────┘
```

*Fig. 16A*

| App | Scenario | Result |
|---|---|---|
| AD | Configured special event causes process of ADs | AD MADRs Expressions checked; MADR(s) processed when Expression = True |
| OGM | Unanswered inbound phone call triggers event to process OGMs | OGM MADRs Expressions checked; MADR(s) processed when Expression = True |
| OCM | Active outbound call; OCM action causes event to process OCMs | OCM MADRs Expressions checked; MADR(s) processed when Expression = True; Call subsequently terminated |
| OCM | Active inbound call; OCM action causes event to process OCMs | OCM MADRs Expressions checked; MADR(s) processed when Expression = True; Call continues normally |
| email | Email sent/received at local MS with COM-L enabled | COM-L-email MADRs Expressions checked; MADR(s) processed when Expression = True |
| email | Email sent with COM-R enabled | COM-R for email application MADRs presented to sender for selection; selected MADR(s) appended to email and sent to recipient(s) for processing |
| calendar | Calendar item (e.g. meeting notice) sent/received at local MS with COM-L enabled | COM-L-calendar MADRs Expressions checked; MADR(s) processed when Expression = True |
| calendar | Calendar item (e.g. meeting notice) sent with COM-R enabled | COM-R-cal MADRs presented to sender for selection; selected MADR(s) appended to calendar item and sent to recipient(s) for processing there |
| phone | Call made/received with COM-L enabled | COM-L-phone MADRs Expressions checked; MADR(s) processed when Expression = True |
| phone | Call made with COM-R enabled | COM-R-phone MADRs presented to caller for selection before placing call; selected MADR(s) appended to out-of-band call parameters and sent to callee(s) for processing there |
| ... | ... | ... |

*Fig. 17*

SYSTEM AND METHOD FOR AUTOMATICALLY LEAVING AN OUTGOING CALLER MESSAGE

CROSS-REFERENCES TO RELATED APPLICATIONS

This application is a continuation in part of application Ser. No. 12/590,831 filed Nov. 13, 2009 and entitled "System and Method for Location Based Exchanges of Data Facilitating Distributed Locational Applications" which is a continuation in part of application Ser. No. 12/287,064 filed Oct. 3, 2008 and entitled "System and Method for Location Based Exchanges of Data Facilitating Distributed Locational Applications" which is a continuation in part of application Ser. No. 12/077,041 filed Mar. 14, 2008 and entitled "System and Method for Location Based Exchanges of Data Facilitating Distributed Locational Applications", hereinafter referred to as the parent applications. Given the size of the parent applications and so as to not obfuscate new material, it is to be appreciated that parent applications are intended and assumed to be included herein in their entirety, however drawings and descriptions are provided for a complete and stand-alone disclosure. This application is filed on the same day as a co-pending application entitled "System And Method For Automated Content Presentation Objects" which contains an identical specification except for the title and abstract.

TECHNICAL FIELD

The present disclosure relates generally to managing information for automatic presentation or distribution, and more particularly to managing an information/messaging repository containing heterogeneous formats for automatically being presented and/or distributed for certain application events associated with determined data processing system conditions.

BACKGROUND

Different users use different types of Mobile data processing Systems (MSs) which are also called mobile devices: laptops, tablet computers, Personal Computers (PCs), Personal Digital Assistants (PDAs), cell phones, automobile dashboard mounted data processing systems, shopping cart mounted data processing systems, mobile vehicle or apparatus mounted data processing systems, Personal Navigational Devices (PNDs), Android enabled devices, iPhones (iPhone is a trademark of Apple, Inc.), iPads (iPad is a trademark of Apple, Inc.), and other various handheld mobile data processing systems, etc. There are many applications which use various message formats to carry out a variety of functionality. Many of these applications intersect in functionality, message formats, and processing. This causes redundant processing and storing of data at a MS which is usually limited in performance, storage capacity and processing power. A method is needed for consolidating, standardizing, or at least organizing overlapping messaging functionality to provide optimal MS processing, storage and performance. The term "message" or "messaging" as used herein is meant to be interpreted in the broadest sense of conveying or communicating information to a recipient user.

A well organized method is needed for enabling users to manage messages (e.g. information for presentation) for any of a variety of reasons that make sense at a MS. Users should be able to make use of saved messages for automating Out-Going Messages (OGMs) such as those played to callers of a phone (e.g. voice) mail system, Out-going Caller Messages (OCMs) which are disclosed as those messages being left automatically to a phone (e.g. voice) mail system, Confirmation Of delivery Messages (COMs) which are disclosed as those messages for automatically distributing based on a previous distribution, and ADvertising messages (ADs) for conveying an advertising information to recipient(s). ADs are useful in many applications involving OGMs, OCMs and COMs, and AD type messages do not have to be advertisements. Providing MS applications with access to a well architected "content-centric" interface gives rise to synergistic functionality quickly incorporated into new applications. Incorporating a content-centric solution enables providing low cost MSs and MS applications through advertisement bills paid by companies seeking novel ways to advertise.

Different systems for email, phone mail and calendaring provide different methods for a confirmation of delivery. For example, one email system will provide a Confirmation Of Delivery (COD) status to the sender when an email arrives to a recipient's in-basket while another will provide a COD status when a recipient opens the email item. Systems may also implement different methods for communicating the status. Some will send a separate COD email (e.g. received as new email in in-basket), and some will require a sender to examine (e.g. poll), or perform user interface actions, for status associated with the email sent. A consistent method is needed across heterogeneous applications and for supporting any application involved in distribution of information between a sender and recipient such as phone applications, address book applications, calendar applications, or any other application involved in inbound or outbound data. Providing a COD status also may be an opportune time to additionally provide an advertisement. An advertising framework should provide enough non-advertising functionality to entice users to use the framework.

The multi-threaded Location Based Exchanges (LBX) MS has the ability to carry out processing which was conventionally carried out by external services. For example, a corporate PBX (Private Branch Exchange) would accept phone mail system messages from callers for unanswered phones, enable user interfaces to retrieve phone mail system messages, enable call waiting, and provide many other useful phone system features. In another example, a MS can incorporate its own call answering service, and save caller recordings like a conventional answering machine. The LBX MS can be self-contained for functionality, and may also interface directly to another MS for phone features which were provided by a service. In particular, as MSs incorporate peer to peer operation, there is no need for services to middle-man functionality. The MSs themselves contain adequate processing power and LBX multi-threaded capability to provide necessary processing for functionality which was conventionally provided by a service. Therefore, a method and system is needed for centralizing common messaging interfaces across a plurality of heterogeneous LBX MS applications. Leveraging third party advertisement budgets for such functionality is desirable.

While LBX is a preferred embodiment, telecommunications companies are reluctant to give up control of phone user interactions and billing conversation enablement. Even two MS users standing next to each other may be required to go through their phone company network processing in order to have a conversation using their MSs. In the LBX architecture, two users standing next to each other can make use of a direct wireless peer to peer LBX connection to accomplish their connectivity. IP datagrams (e.g. WDRs (i.e. Whereabouts Data Records or Wireless Data Records)) or a validated-delivery protocol of WDRs may be exchanged between the MSs for carrying out data exchanges or conversations, for example one channel for carrying data from the caller to the callee and another channel for carrying data from the callee to the caller. Therefore, the disclosed method and system must handle traditional telephony (e.g. cellular) environments as well as LBX peer to peer communications environments.

SUMMARY

Disclosed is a system and method for centralizing common messaging (e.g. information for presentation) interfaces across a plurality of heterogeneous MS applications including MSs in a LBS (Location Based Service(s)) as well as a LBX (Location Based eXchange(s)) environment. A message repository is architected to accommodate many different uses across many different applications. Preferably, the applications interface to at least one Application Programming Interface (API) for enabling, or using, desired functionality. The term OGM (Out-Going Message) is well known in the art to automatic answering machines, phone mail systems, and the like. New configurable functionality is disclosed for improving OGM applications, in particular for how an appropriate OGM is determined and used. A new term Out-going Caller Message (OCM) is disclosed. MS users are interested in getting more out of their time. For example, when a MS caller reaches an OGM from a callee's system (e.g. busy, or no answer forwards to phone mail), the MS caller can opt to leave an OCM rather than wait for the OGM to complete and then verbally leave a message. OCM processing enables the MS caller to immediately end the call and continue using other MS applications or processing while the OCM is automatically and concurrently being left at the callee's system. Another new term Confirmation Of delivery Message (COM) is disclosed. MS users are often interested in getting a confirmation that a previous distribution was delivered, and perhaps under what conditions the distribution was delivered in, or under what conditions the recipient of a distribution experiences. A COM is informative as to circumstances involved in a particular delivery. COMs can be privileged (i.e. permissions) between a COM sender and COM recipient, preferably by granting permissions in the LBX architecture. Permissions (e.g. local at MS) can also be used to govern which callers can receive which OGM, or an OGM at all. Permissions can also be used to deny a sender (e.g. caller) the ability to notify the recipient (e.g. callee) a distribution attempt (e.g. call) is being made.

The terminology "MADR", "MADR object", and "presentation object" are used interchangeably throughout this disclosure. A MADR is an object because it contains data along with associated methods for processing.

A primary advantage herein is to save a novice user time from creating and testing new LBX charters for automated messaging processing. The parent applications disclose systems and methods for accomplishing every event determination and content delivery/presentation feature disclosed herein through a user's charter configurations, however it may be advantageous to provide user configurations through a presentation content-centric approach, in particular for operating system independent advertisement objects (i.e. MADRs) which can shared between systems. While there are convenient user interface embodiments derived from the parent applications for accomplishing functionally equivalent charters, a multi-purpose message repository may replace charter configuration with a simpler user configuration theme. A rich platform from a presentation object vantage point is therefore provided. Many useful charters need not be configured since desired functionality can be conveniently configured through Message Area Data Records (MADRs). A MS may come prepackaged with MADR objects which may or may not be "tweaked" later to minimize a user's time in configuring charters for the same functionality. MADR objects may be shared between heterogeneous MSs or distributed to different types of MSs by services.

It is an advantage herein for providing useful non-advertising functionality in the same repository that may include advertising entities in order for users to enjoy having the repository regardless of any advertisement processing. Presentation and messaging objects which may be configured are useful to a user even if a single advertisement had never been configured. MADRs have many applications outside of advertising, however the architecture is designed with operating system independent advertisements in mind. A richer user experience is also provided through implementation of Caller Location (CLOC) information automatically appended to outbound application distributions including calls (audio or video) made. The receiving systems use the CLOC information of the caller for various automated processing. The CLOC is treated as importantly as caller identifier information and is carried in an analogous manner with calls.

An advantage herein is for advertisements to be maintained in the message repository with enough information to: a) capture the originator's (e.g. author) intent for being "user friendly" reconciled with an observer's preferences for presentation; and b) capture the originator's (e.g. author) intent for being "user friendly" reconciled with an observer's preferences for events which cause the presentation. U.S publication 2009/0265214 ("Advertising In Operating System", Jobs et al) describes methods for advertising processing in an operating system. Conventional advertising formats are handled with a specialized operating system for how to process the advertisement so that the source (i.e. originator or author) ensures or maximizes its messaging while the recipient (e.g. viewer) is also able to control to a somewhat lesser extent when presentation is desired. The problem is the same advertisement may be treated differently to at a different operating system. The originator (e.g. source, author, etc) of the advertisement loses automatic control over how the advertisement should be presented at any operating system. The present disclosure supports encoding information associated with the advertisement for how any receiving operating system is to present it, and there are many configurations for when advertisements are best presented in a user-friendly manner, rather than forcing a user into viewing a presentation by crippling or limiting operating system usability during a presentation. This disclosure has the advantage of supporting heterogeneous operating systems with unique advertisement presentation capabilities based on a recipient's preferences relative to an originator (e.g. source, author, etc) intent, while doing so according to privileges, and in a "user-friendly" manner.

An advantage herein is for advertisements to be maintained in the same message repository that users find useful for OGM, OCM and COM processing. Advertisements can be presented unexpectedly in accordance with inbound or outbound application events and a set of associated MS conditions, or advertisements can be presented in an anticipated manner according to configurations. A data processing system sharing MADRs may or may not be a MS, but rather a privileged identity operating in a peer to peer, or service, manner for providing advertisements to MSs.

Another advantage is supporting a variety of embodiments, such as having no centralized service for containing message information (e.g. LBX embodiment), or having a centralized service for containing message information (e.g. LBS embodiment). Functionality is as disclosed regardless of the particular architectural embodiment for how MSs interact. Further, hard wired systems (i.e. "LAN-lines") accessing local data or remote service data, may incorporate disclosed functionality. In some embodiments, one, none, or all participating systems involve a wireless connected MS.

Another advantage is to support information formats and purposes for a variety of current and future application technologies while making use of existing marketplace communications hardware, communications methods and software interfaces, and location methods available during MS travels where possible to accomplish distributing messages and providing presentations. Any wave spectrum and any protocols for carrying data may be used in embodiments described herein.

Yet another advantage is to prevent the redundant storing of message information when more than one purpose is to be used for a message. Existing messages can be shared by applications and users. User's can customize messages and configurations in one place for many different applications. For example, a recorded message left by a first user (caller) can also be used by a second user (callee) for an OGM or an OCM. Synergy is provided to different messaging platforms by providing a single message repository with a heterogeneous set of purposes, message formats, interoperable configuration, and uses.

Another advantage is for automatic call handling and call processing based on messages saved for specified purposes.

Yet another advantage is for peer to peer content delivery and local MS configuration of that content. Users need no connectivity to a service. Content is delivered under a variety of circumstances for a variety of configurable reasons. For example, MS to MS communications (MS2MS) may be used for carrying out peer to peer processing for carrying out communicating one user's content configurations to another user's MS.

Another advantage is to support OGMs, and for configuring expressions which are used to govern which OGM plays to which caller. Expressions include a set of conditions which can be determined such as time information, caller and identifier information, location information, application data information, or other information which may be determined at a data processing system in real time.

Another advantage is to support OCMs for enabling more efficient use of a person's time. A person who wants to leave a message for another person can do so in a minimal amount of time by immediately ending the call upon determining the sought callee is not available, and that a message (i.e. OCM) should be left. Expressions (like OGM expressions) and user controls can be configured for automatic determination of the best OCM to leave at the callee's phone mail system.

Another advantage is integration of a MS user's defined waymark information for automatic reference and annotation for informative purposes. For example, a user can make a call and automatically leave his whereabouts to a callee's system in terms of personal waymark or map term information (Parent applications contain map term (Map Term Data Record (MTDR)) information). Likewise, a user can automatically know the whereabouts of a callee in terms of their personal waymark/pushpin or map term information when encountering message processing.

Another advantage is to support COMs for automated presentation or indication when a callee or distribution (email, SMS/text message, calendar item, etc) recipient has been delivered a previous call or distribution. An informative message can be automatically sent for a variety of conditions as described in an expression elaborated at the receiving system for receiving system conditions determined in real time upon delivery. COMs provide informative messages for confirmation and circumstances about the receiving system during confirmation. Physical delivery or post office embodiments also apply, for example when a package including a RFID or MS receives an inbound distribution containing an expression determined at the package for automated messaging of package status based on an evaluated expression.

Another advantage is automatically including location information with a message such as a SMS/text message, email, data processing request, or other distribution sent from one data processing system (e.g. MS) to another. Other information complementing the location information (e.g. situational location information) may also be included. The receiving data processing system can use the included location and other information to provide directed and intelligent processing that would otherwise not be possible had the distribution been received without such information. Also, automatically including the information with the distribution prevents a user from having to perform user actions in explicitly providing the information.

Another advantage is maintaining of statistical data for why, how, when, and where Message Area Data Record (MADR) data is used, and who is involved with related MADR processing. This provides means for reporting, for example how many times an advertisement was presented and under what circumstances it was presented.

Yet another advantage is using permissions to govern every aspect of MADR object processing, for example reconciling an originator's intent with an observer's preferences, governing what MADR post-creation maintenance/management can be performed by other users, deciding what can be shared between systems, and governing each point of processing where more than one user (e.g. originator, maintainer, observer) may conflict in preferences for what MADR processing occurs. Permissions (privileges) can also be configured between users for an authority hierarchy for who can do what. This enables the distribution of MADR objects for prescribed processing that can be performed.

Further features and advantages of the disclosure, as well as the structure and operation of various embodiments of the disclosure, are described in detail below with reference to the accompanying drawings. In the drawings, like reference numbers generally indicate identical, functionally similar, and/or structurally similar elements. Dashed outlines (e.g. process blocks, data record fields) may be used in the drawings to highlight, or indicate optional embodiments. None of the drawings, discussions, or materials herein is to be interpreted as limiting to a particular embodiment. The broadest interpretation is intended. Other embodiments accomplishing same functionality are within the spirit and scope of this disclosure. It should be understood that information is presented by example and many embodiments exist without departing from the spirit and scope of this disclosure.

DESCRIPTION OF DRAWINGS

There is no guarantee descriptions in this specification explain every novel feature found in the drawings. Parent application drawings have been included herein for pointing out some present disclosure details in light of parent applications. The present disclosure will be described with reference to the accompanying drawings, wherein:

FIGS. 8A through 8E depict the preferred embodiment BNF grammar disclosed in detail in the parent applications;

FIG. 14 depicts a LBX application fields implementation status table disclosed in detail in the parent applications;

FIG. 16A depicts a preferred embodiment of a Message Area Data Record (MADR) for discussing synergistic message processing and configuration;

FIG. 17 depicts a table to facilitate explanation of message repository data processing;

DETAILED DESCRIPTION

Figure 1:
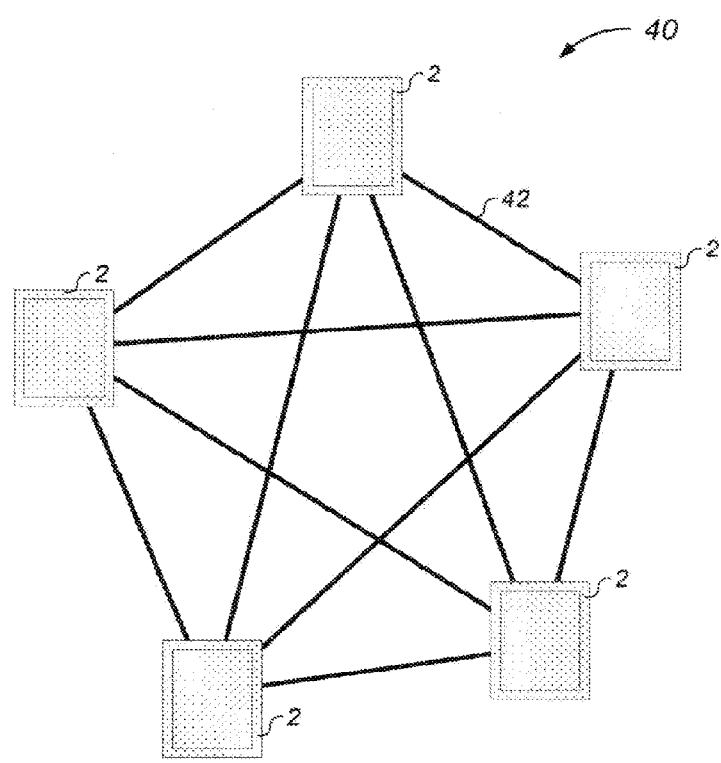
FIG. 1 depicts a Location Based eXchanges (LBX) architectural illustration for discussing the present disclosure.

With reference now to detail of the drawings, the present disclosure is described. Obvious error handling is omitted from the flowcharts in order to focus on key aspects. Obvious error handling includes database I/O errors, field validation errors, errors as the result of database table/data constraints or unique keys, data access errors, communications interface errors or packet collision, hardware failures, checksum validations, bit error detections/corrections, and any other error handling as well known to those skilled in the relevant art in context of this disclosure. A thread synchronization scheme (e.g. semaphore use) is assumed where appropriate. A semicolon may be used in flowchart blocks to represent, and separate, multiple blocks of processing within a single physical block. This allows simpler flowcharts with fewer blocks in the drawings by is placing multiple blocks of processing description in a single physical block of the flowchart. Flowchart processing is intended to be interpreted in the broadest sense by example, and not for limiting methods of accomplishing the same functionality. Preferably, field validation in the flowcharts checks for SQL injection attacks, communications protocol sniff and hack attacks, preventing of spoofing system or MS addresses, syntactical appropriateness, and semantics errors where appropriate. Disclosed user interface processing and/or screenshots are also preferred embodiment examples that can be implemented in various ways without departing from the spirit and scope of this disclosure. Alternative user interfaces (since this disclosure is not to be limiting) will use similar mechanisms, but may use different mechanisms without departing from the spirit and scope of this disclosure. Novel features disclosed herein need not be provided as all or none. Certain features may be isolated in some embodiments, or may appear as any subset of features and functionality in other embodiments.

FIG. 1 depicts a Location Based eXchanges (LBX) architectural illustration for discussing the present disclosure. LBX MSs are peers to each other for features and functionality. An MS 2 communicates with other MSs without requiring a common functionality social service for interaction. For example, FIG. 1 depicts a wireless network 40 of five (5) MSs. Each is able to directly communicate with others that are in the vicinity (e.g. nearby as indicated by within a maximum wireless range). In a preferred embodiment, communications are limited reliability wireless broadcast datagrams having recognizable data packet identifiers. In another embodiment, wireless communications are reliable transport protocols carried out by the MSs, such as TCP/IP. In other embodiments, usual communications data (e.g. during wireless phone call conversations) includes new data in transmissions for being recognized by MSs within the vicinity. Regardless of the embodiment, an MS 2 can communicate with any of its peers in the vicinity using any reasonable method. While the MSs are communicating wirelessly to each other, path 42 embodiments may involve any number of intermediary systems or communications methods for facilitating a peer to peer transmission, for example for routing peer to peer data transmissions in topologies discussed with FIG. 4.

Figure 2:
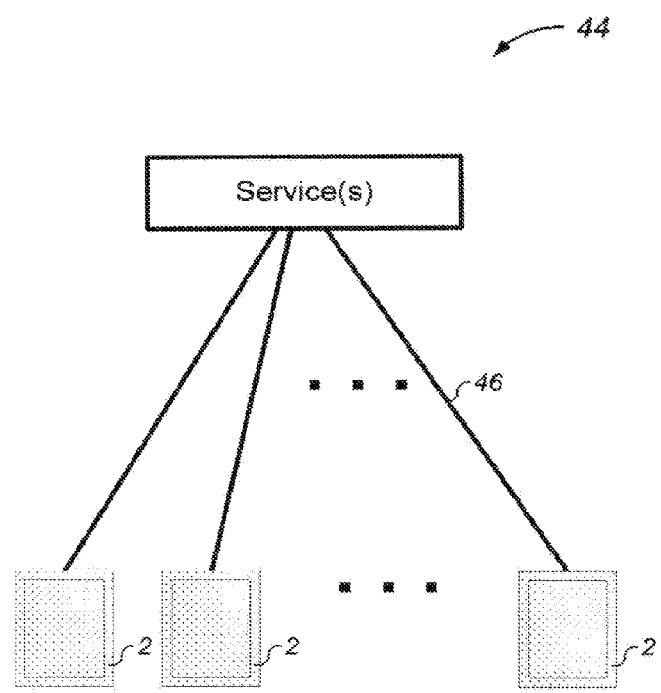
FIG. 2 depicts a Location Based Services (LBS) architectural illustration for discussing the present disclosure.

FIG. 2 depicts a Location Based Services (LBS) architectural illustration for discussing the present disclosure. In order for a MS to interact with another MS, there is service architecture 44 for accomplishing a social functionality interaction. The LBX architecture supports at a MS what was previously performed through a shared social service. Disclosed functionality may involve a LBS or LBX architecture, or the like.

Figure 3:
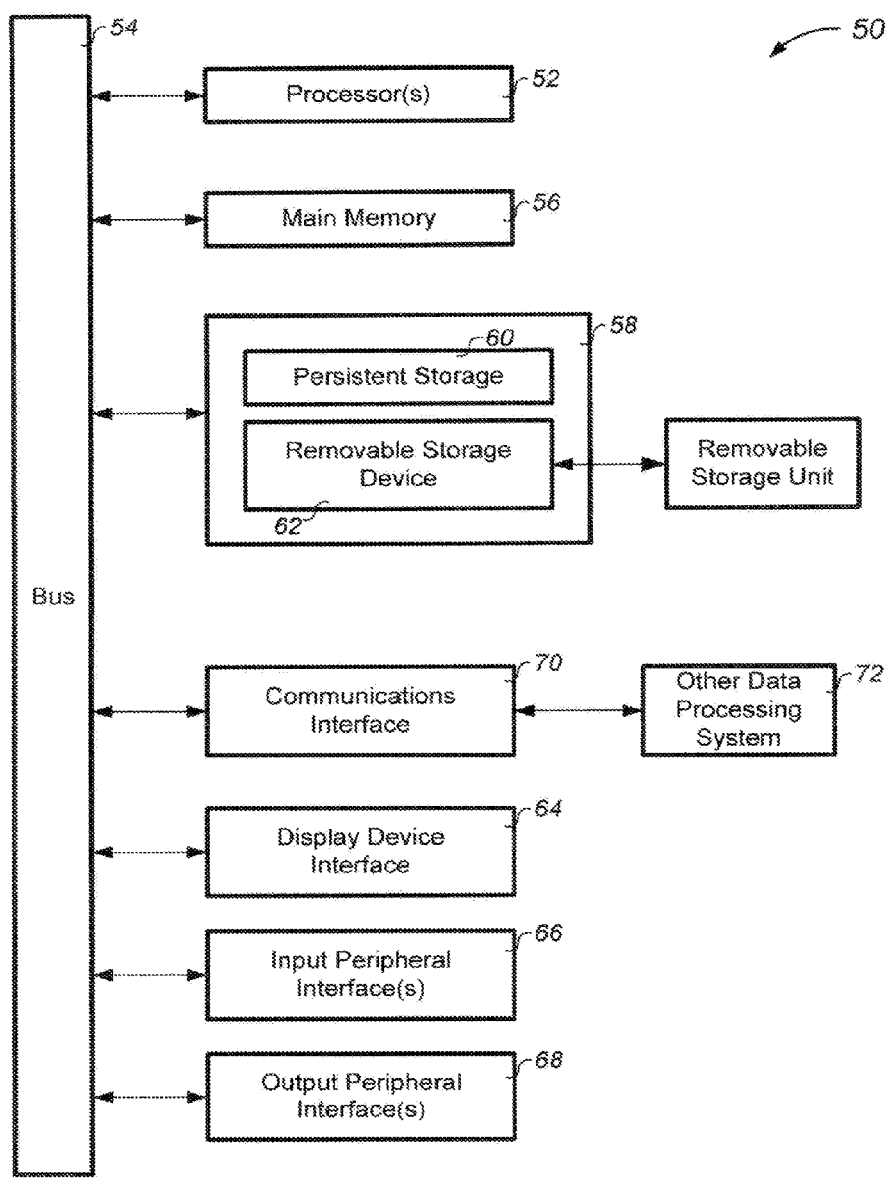
FIG. 3 depicts a block diagram of a data processing system useful for implementing a MS, a service, or any data processing system carrying out disclosed processing or functionality.

FIG. 3 depicts a block diagram of a data processing system useful for implementing a MS, a service, or any data processing system carrying out disclosed processing or functionality. In one embodiment, a MS 2 is a data processing system 50. Data processing system 50 includes at least one processor 52 (e.g. Central Processing Unit (CPU)) coupled to a bus 54. Bus 54 may include a switch, or may in fact be a switch 54 to provide dedicated connectivity between components of data processing system 50. Bus (and/or switch) 54 is a preferred embodiment coupling interface between data processing system 50 components. The data processing system 50 also includes main memory 56, for example, random access memory (RAM). Memory 56 may include multiple memory cards, types, interfaces, and/or technologies. The data processing system 50 may include secondary storage devices 58 such as persistent storage 60, and/or removable storage device 62, for example as a compact disk, floppy diskette, USB flash, or the like, also connected to bus (or switch) 54. In some embodiments, persistent storage devices could be remote to the data processing system 50 and coupled through an appropriate communications interface. Persistent storage 60 may include flash memory, disk drive memory, magnetic, charged, or bubble storage, and/or multiple interfaces and/or technologies, perhaps in software interface form of variables, a database, shared memory, etc.

The data processing system 50 may also include a display device interface 64 for driving a connected display device (not shown). The data processing system 50 may further include one or more input peripheral interface(s) 66 to input devices such as a keyboard, keypad, Personal Digital Assistant (PDA) writing implements, touch interfaces, mouse, voice interface, or the like. User input ("user input", "user events" and "user actions" used interchangeably) to the data processing system are inputs accepted by the input peripheral interface(s) 66. The data processing system 50 may still further include one or more output peripheral interface(s) 68 to output devices such as a printer, facsimile device, or the like. Output peripherals may also be available via an appropriate interface.

Data processing system 50 will include communications interface(s) 70 for communicating to another data processing system 72 via analog signal waves, digital signal waves, infrared proximity, copper wire, optical fiber, other wave spectrums, or any reasonable communication medium. A MS may have multiple communications interfaces 70 (e.g. cellular connectivity, 802.x, etc). Other data processing system 72 may be an MS. Other data processing system 72 may be a service.

Data processing system programs (also called control logic, or processing code) may be completely inherent in the processor(s) 52 being a customized semiconductor, or may be stored in main memory 56 for execution by processor(s) 52 as the result of a read-only memory (ROM) load (not shown), or may be loaded from a secondary storage device into main memory 56 for execution by processor(s) 52. Such programs, when executed, enable the data processing system 50 to perform features of the present disclosure as discussed herein. Accordingly, such data processing system programs represent controllers of the data processing system.

In some embodiments, the disclosure is directed to a control logic program product comprising at least one processor 52 having control logic (software, firmware, hardware microcode) stored therein. The control logic, when executed by processor(s) 52, causes the processor(s) 52 to provide functions of the disclosure as described herein. In another embodiment, this disclosure is implemented primarily in hardware, for example, using a prefabricated component state machine (or multiple state machines) in a semiconductor element such as a processor 52.

Those skilled in the art will appreciate various modifications to the data processing system 50 without departing from the spirit and scope of this disclosure. A data processing system, and more particularly a MS, preferably has capability for many threads of simultaneous processing which provide control logic and/or processing. These threads can be embodied as time sliced threads of processing on a single hardware processor, multiple processors, multi-core processors, Digital Signal Processors (DSPs), or the like, or combinations thereof. Such multi-threaded processing can concurrently serve large numbers of concurrent MS tasks. Concurrent processing may be provided with distinct hardware processing and/or as appropriate software driven time-sliced thread processing. Those skilled in the art recognize that having multiple threads of execution on an MS may be accomplished in different ways in some embodiments. This disclosure strives to deploy software to existing MS hardware configurations, but disclosed software can be deployed as burned-in microcode to new hardware of MSs.

Data processing aspects of drawings/flowcharts are preferably multi-threaded so that many MSs and applicable data processing systems are interfaced with in a timely and optimal manner. Data processing system 50 may also include its own clock mechanism (not shown), if not an interface to an atomic clock or other clock mechanism, to ensure an appropriately accurate measurement of time in order to appropriately carry out time related processing.

Figure 4:
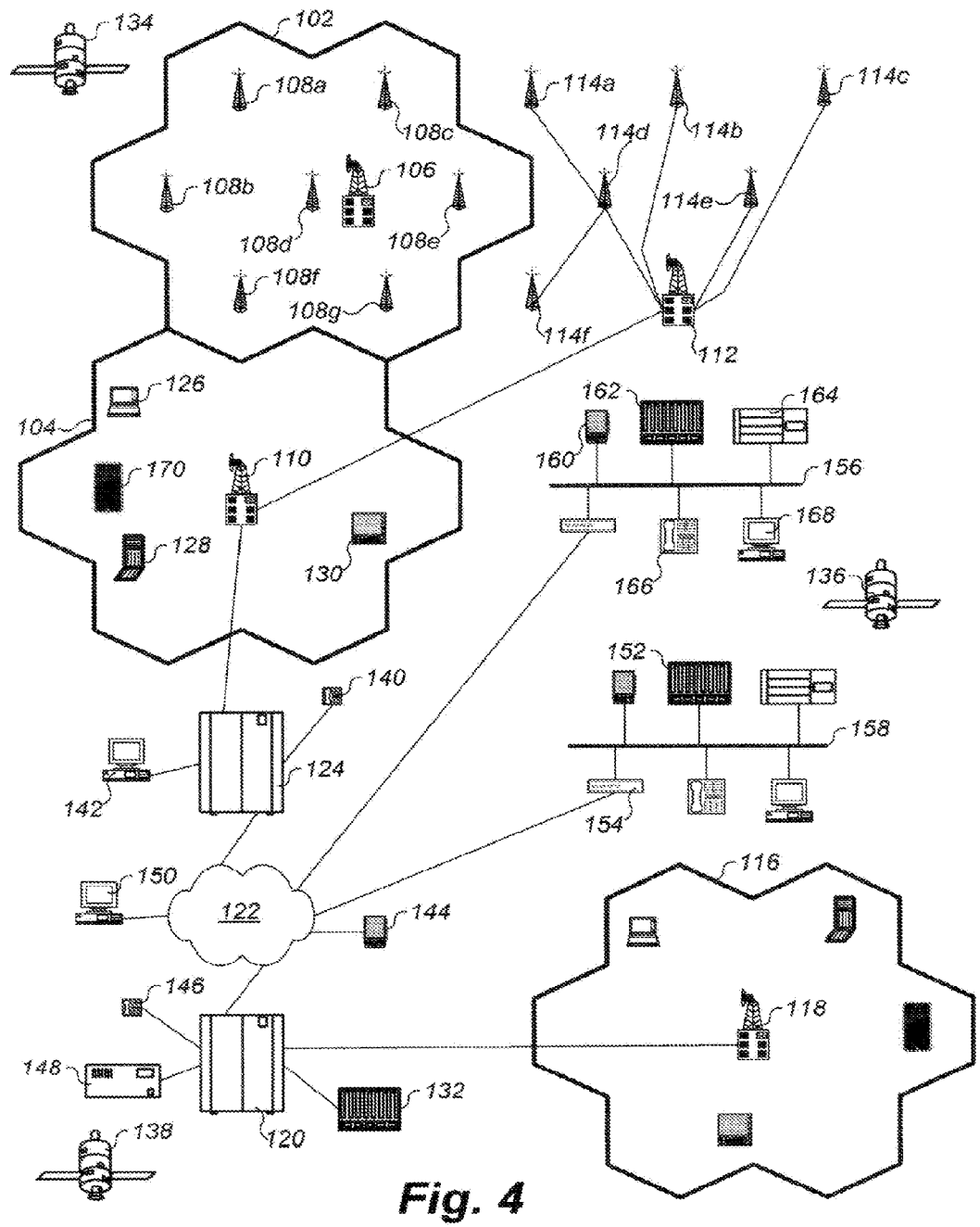
FIG. 4 depicts a network illustration for discussing various deployment embodiments of interconnectivity processing aspects of the present disclosure.

FIG. 4 depicts a network illustration for discussing various deployments of interconnectivity processing aspects of the present disclosure. In some embodiments, a cellular network cluster 102 and cellular network cluster 104 are parts of a larger cellular network. Cellular network cluster 102 contains a controller 106 and a plurality of base stations, shown generally as base stations 108. Each base station covers a single cell of the cellular network cluster, and each base station 108 communicates through a wireless connection with the controller 106 for call processing, as is well known in the art. Wireless devices communicate via the nearest base station (i.e. the cell the device currently resides in), for example base station 108b. Roaming functionality is provided when a wireless device roams from one cell to another so that a session is properly maintained with proper signal strength. Controller 106 acts like a telephony switch when a wireless device roams across cells, and it communicates with controller 110 via a wireless connection so that a wireless device can also roam to other clusters over a larger geographical area. Controller 110 may be connected to a controller 112 in a cellular cluster through a physical connection, for example, copper wire, optical fiber, or the like. This enables cellular clusters to be great distances from each other. Controller 112 may in fact be connected with a physical connection to its base stations, shown generally as base stations 114. Base stations may communicate directly with the controller 112, for example, base station 114e. Base stations may communicate indirectly to the controller 112, for example base station 114a by way of base station 114d. It is well known in the art that many options exist for enabling interoperating communications between controllers and base stations for the purpose of managing a cellular network. A cellular network cluster 116 may be located in a different country. Base controller 118 may communicate with controller 110 through a Public Service Telephone Network (PSTN) by way of a telephony switch 120, PSTN 122, and telephony switch 124, respectively. Telephony switch 120 and telephony switch 124 may be private or public. In one cellular network embodiment of the present disclosure, services execute at controllers, for example controller 110. In some embodiments, the MS includes processing that executes at a wireless device, for example mobile laptop computer 126, wireless telephone 128, a personal digital assistant (PDA) 130, an iPhone 170, or the like. As the MS moves about, positional attributes are monitored for determining location. The MS may be handheld, or installed in a moving vehicle. Locating a wireless device using wireless techniques such as Time Difference of Arrival (TDOA) and Angle Of Arrival (AOA) are well known in the art. Services may also execute on a server computer accessible to controllers, for example server computer 132, provided an appropriate timely connection exists between cellular network controller(s) and the server computer 132. Wireless devices (i.e. MSs) are preferably known by a unique identifier, for example a phone number, caller id, device identifier, MS identifier, network address, or like appropriate unique handle.

In another embodiment of the present disclosure, GPS satellites such as satellite 134, satellite 136, and satellite 138 provide information, as is well known in the art, to GPS devices on earth for triangulation locating of the GPS device. In this embodiment, a MS has integrated GPS functionality so that the MS monitors its positions. device identifier, or like appropriate unique handle (e.g. network address).

In yet another embodiment of the present disclosure, a physically connected device, for example, telephone 140, computer 142, PDA 144, telephone 146, and fax machine 148, may be newly physically connected to a network. Each is a MS, although the mobility is limited. Physical connections include copper wire, optical fiber, USB, or any other physical connection, by any communications protocol thereon. Devices are preferably known by a unique identifier, for example a phone number, caller id, device identifier, physical or logical network address, or like appropriate unique handle. The MS is detected for being newly located when physically connected. A service can be communicated to upon detecting connectivity. The service may execute at an Automatic Response Unit (ARU) 150, a telephony switch, for example telephony switch 120, a web server 152 (for example, connected through a gateway 154), or a like data processing system that communicates with the MS in any of a variety of ways as well known to those skilled the art. MS detection may be a result of the MS initiating a communication with the service directly or indirectly. Thus, a user may connect his laptop to a hotel network, initiate a communication with the service, and the service determines that the user is in a different location than the previous communication. A local area network (LAN) 156 may contain a variety of connected devices, each an MS that later becomes connected to a local area network 158 at a different location, such as a PDA 160, a server computer 162, a printer 164, an internet protocol telephone 166, a computer 168, or the like. Hard copy presentation could be made to printer 164 and fax 148.

Current technology enables devices to communicate with each other, and other systems, through a variety of heterogeneous system and communication methods. Current technology allows executable processing to run on diverse devices and systems. Current technology allows communications between the devices and/or systems over a plethora of methodologies at close or long distance. Many technologies also exist for automatic locating of devices. It is well known how to have an interoperating communications system that comprises a plurality of individual systems communicating with each other with one or more protocols. As is further known in the art of developing software, executable processing of the present disclosure may be developed to run on a particular target data processing system in a particular manner, or customized at install time to execute on a particular data processing system in a particular manner.

Figure 5:
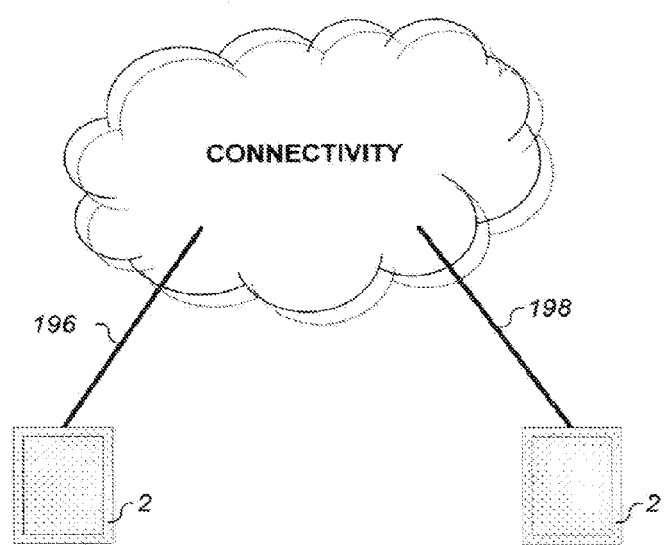
FIG. 5 depicts an architectural illustration for discussing communications between any two mobile data processing systems of the present disclosure.

FIG. 5 depicts an architectural illustration for discussing communications between any two mobile data processing systems of the present disclosure. For example any two MSs can communicate with each other using the architectures and various embodiments thereof of FIG. 1, FIG. 2 and FIG. 4. A calling or sending MS communicates its location information automatically over a path 196 to a callee or receiving MS by way of a path 198. Paths 196 and 198 may or may not be the same connectivity path. For example, in the LBX environment, location information may be transmitted wirelessly, or by routing processes, in a WDR between MSs. In an LBS environment, the location information may be carried by way of one or more social services, prior to arriving to the receiving MS. Regardless of the embodiment for connectivity between the MSs, whereabouts information of sufficient confidence is automatically accessed at the source MS and appropriately appended to the particular application distribution (telephone call, email, text message, calendar item, etc) for sending outbound to the receiving MS. Whereabouts information is preferably accessed from a local MS queue maintaining the highest confidence location of the MS at any particular time using one or more location technologies that may be available. If no confident whereabouts can be determined, no CLOC may be appended. The user may or may not be in control for when the location information is sent outbound with particular distributions. Having the location of the sending MS with the distribution received by the receiving MS enables automatic processing that would otherwise not be possible. There are many embodiments for how to represent the location information in units, syntax, scheme, or other suitable methods. Specific application distribution examples include:

Conventional cellular phone call: The location information is treated as critical to the call as a telephony caller identifier (e.g. calling number), ANI (Automatic Number Identifier), CLI (Calling Line Identification), CLID (Caller Line Identification) or any other identifier scheme for identifying the caller of a call placed. The caller's location is inserted with caller information for automated processing at the callee's system. The location identifier is hereinafter referred to as CLOC (Caller LOCation). In a classic telephony network, the CLOC may be presented out-of-band to the callee's system through a Signaling Transfer Point (STP), for example with an SS7 or like protocol. Other out-of-band embodiments may also carry the CLOC to the callee's system, depending on audio and/or video being transmitted. There are also in-band embodiments wherein the CLOC is carried with the audio and/or video of a call placed which is then extracted by processing at the callee system, for example the first data received at the callee system. Any phone call embodiment is augmented with appending CLOC information for an outbound path 196 carrying the CLOC. Likewise, any phone call embodiment is augmented with recognizing the CLOC for automated processing as part of the call.

SMS/text message: The CLOC may be carried out-of-band to the recipient's system, for example in text message probing for a valid target, or may be carried in-band as distinct data with the textual message for extraction by processing at the recipient's system.

Email: The CLOC may be carried out-of-band to the recipient's system, for example in SMTP probing for a valid target, or may be carried in-band as distinct data with the email (e.g. email profile or attribute information) for extraction by processing at the recipient's system.

Calendar: The CLOC may be carried out-of-band to the recipient's system, for example in meeting notice validation for a valid target, or may be carried as distinct data in-band with the calendar item for extraction by processing at the recipient's system.

Generic applications: The CLOC may be carried out-of-band to the recipient's system, for example in connectivity attempt, connectivity setup, authentication or validation for a valid target, or may be carried as distinct data in-band with the particular application type of distribution for extraction by processing at the recipient's system.

CLOC information is not required for processing disclosed herein, however if available, users enjoy a richer and more desirable set of features when using the disclosed architecture in connectivity embodiments which provide CLOC information.

Figure 15:
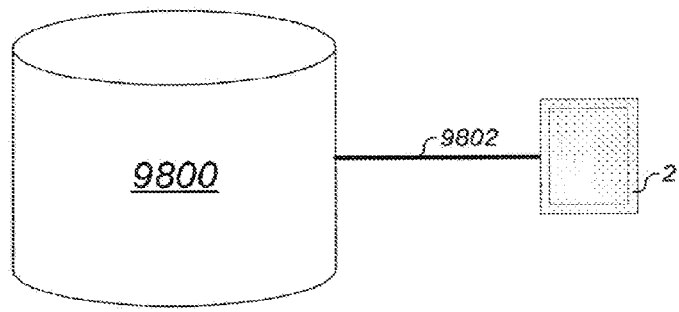
FIG. 15 depicts an illustration for discussing various access embodiments to a message repository of the present disclosure.

With reference now to FIG. 15, depicted is an illustration for discussing various access embodiments to a message repository of the present disclosure. A MS 2 accesses the message repository 9800 (also referred to as a message area) via an access path 9802 by access to local data, remote data, or a combination thereof, depending on embodiments. Any of the memory or storage embodiments described with FIG. 3 may be used for repository 9800. Access path 9802 may involve a local API, a hardware interrupt interface, processing at the MS 2, a communication path to remote data perhaps over any topology described with FIG. 4, or any other method for getting access to the repository 9800. Repository 9800 contains a centralized collection of presentation/messaging information for carrying out operations of the present disclosure.

FIG. 16A depicts a preferred embodiment of a Message Area Data Record (MADR) 9850 for discussing synergistic message processing and configuration. Message Area Data Records (MADRs) 9850 are a preferred embodiment for data maintained in repository 9800, and each is referred to as a presentation object (or messaging object). The intelligence for when, where, how and why messaging takes place is maintained in the MADRs themselves. Fields therein are described below.

Present disclosure data records (FIGS. 15 through 17 or any other disclosed data records), may be maintained in an SQL database, or maintained in record form by a data processing system. Appropriate indexes and/or constraints are defined in a SQL embodiment. Depending on the embodiment, some data record fields disclosed may be multi-part fields (i.e. have sub-fields), fixed length records, varying length records, or a combination with field(s) in one form or another. Some data record field embodiments will use anticipated fixed length record positions for subfields that can contain useful data, or a null value (e.g. −1). Other embodiments may use varying length fields depending on the number of sub-fields to be populated, or may use varying length fields and/or sub-fields which have tags indicate their presence. Other embodiments will define additional data record fields to prevent putting more than one accessible data item in one field. Other embodiments may implement pointers in fields to memory (e.g. memory pointer) or storage locations (e.g. file pointer and perhaps file offset therein) which may or may not have been dynamically allocated. In any case, processing will have means for knowing whether a value is present or not, and for which field (or sub-field) it is present. Absence in data may be indicated with a null indicator (−1), or indicated with its lack of being there (e.g. varying length record embodiments). Fields described may be converted: a) prior to storing; or b) after accessing; or c) by storage interface processing (e.g. for standardized processing). Fields described may not be converted (i.e. used as is). Any field may contain a join value (e.g. SQL) to one or more other data entities (e.g. tables) which contain a matching value (e.g. in at least one column) to associate additional data (e.g. one or more other columns of data) to any record 9850 field.

Handle field 9850a contains a unique handle to a particular MADR. Various embodiments include a user assigned name (e.g. string), a unique integer (e.g. generated by a SQL Database (DB) unique sequence number generator), or other unique data instance for accessing a particular MADR 9850. Field 9850a is to contain a unique value across all MADRs regardless of embodiment, for example when created or altered. Type field 9850b contains the type of message field 9850c of the MADR 9850, for example categorized in audio recording types, video recording types, text types, executable types, and application information types. There are many different message types depending on what formats will or can be supported in field 9850c. Some examples:

audio recording types: WAV (WaveForm), WMA (Windows Media Audio), ALE (Apple Lossless), MP3, bit sample rate information, or any combination of information describing an audio recording type for processing;

video recording types: MPEG-1, MPEG-2, WMV, MOV, AVI, pixel and/or scan line information, frame sampling rate information, or any combination of information describing a video recording type for processing;

text types: single byte characters, double byte characters, character set information, font, size, appearance, or any combination of information describing a text string for processing;

executable types: Motorola (MSB to LSB order), Intel (reverse byte order), 16 bit, 32 bit, 64 bit, stack size required, linkable code libraries required, run time variable settings, or any combination of information describing an executable for processing; or application information types: current location, current date/time, calendar information reference, current application in use (e.g. game), waymark or map term information (see LRDRs 9860), or any combination of information describing application information. Application information also includes accessing status from an external application (e.g. Twitter status, Facebook status, etc), using LRDRs to "skip" handling the presentation (e.g. do not process OGM), and/or determining the information to be presented for the nearest person(s) at the time of a distribution (e.g. a call). Application information may be referenced in user designated destinations of a specified recording, text for annunciation, or other presentation data stream, or as a single reference for an entire message output.

Some embodiments of type field 9850b simply carry a file extension or special qualifier which is recognized by an operating system for handling the MADR. Other embodiments define a plurality of fields formed together to determine a particular type. Message field 9850c contains (or points to) the message in the appropriate format as described by field 9850b and may be maintained to a file or suitable MS memory. In context of a particular message type, message field 9850c may contain the substitution identifiers of U.S. Pat. No. 5,434,910 ("Method and system for providing multimedia substitution in messaging systems", Johnson et al). Field 9850c may involve an executable that does no presentation (e.g. MADR configured to perform desired processing). Field 9850c may be advertising content, for example where a source shared/communicated the MADR(s) to the MS for conditional presentation at the MS. Use field 9850d contains use information of the message of the MADR 9850. A single message can have many uses (e.g. multiple bits set). In a preferred embodiment, field 9850d is a bit mask wherein specific bit positions indicate a particular event use. For example, a bit set to 1 is enabled and a bit set to 0 is disabled. There may be bit settings for OGM, OCM, varieties of COM-R (e.g. COM for particular application to process at Remote MS), varieties of COM-L (e.g. COM for particular application to process at Local MS (e.g. a receiving or sending MS)) for inbound or outbound distributions, or other uses. Varieties of COM-R and COM-L accommodate confirmation of delivery messaging for different applications such as email, calendar, address book, phone, advertising, or any other application where acknowledgement is desired for a related distribution (e.g. delivery of another message), or the inbound/outbound event serves as a useful trigger for presentation. Various embodiments will granulate COM use settings differently. For example, the calendar application can have bit settings for: COM-R-cal (e.g. MADRs for processing at a Remote receiving MS), COM-L-in-cal (e.g. MADRs for processing at the Local MS for inbound calendar items), COM-L-out-cal (e.g. MADRs for processing at the Local MS for outbound calendar items); or for a preferred embodiment of: COM-R-cal (e.g. MADRs for processing at a Remote receiving MS), COM-L-cal (e.g. MADRs for processing at the Local MS for inbound or outbound calendar items); or for: COM-cal (e.g. MADRs for processing at any (local/remote) MS); or the use field 9850d may be removed from a MADR so that the use is completely specified via expression field 9850g. Any application (like the Calendar example) may also have different use field embodiments. In the preferred embodiment, use field 9850d supports many types of events which result in MADR processing. Default field 9850e indicates whether or not the message of the MADR 9850 is a default message for processing (i.e. True or False). There can be one default MADR for each of the uses (e.g. described by field 9850d) so that a default exists when all matching MADRs have expressions that evaluate to False. Originator intent field 9850f contains various originator instructions to be associated with the message which was not, or could not, be specified or communicated in type field 9850b. Field 9850f includes information for message presentation that can be applied differently to messages of the same type field 9850b. Field 9850f information includes specifications for an expiration of the MADR, priority setting (e.g. high or normal), appearance or presentation information, volume or volume override information, data processing system control operation, ghosting the message image (like a watermark) over a video recording, or any other originator preference for affecting play/presentation of the particular message to a user. A visual mode setting can be set here for the originator's intent of: full screen, dedicated user interface visual area, newly spawned window, pop-up (e.g. window) with "stolen" focus, title-bar area of currently focused window, use observer's preference, or other visual method for presenting MADR information. An audio mode setting can also be set for the originator's intent of: mix, preempt, or use observer's preference. Field 9850f may also include a prescription for which users, groups of users, authority levels of users, or which specific privilege(s) configured can maintain, distribute/share, manage, view, alter, present, or delete the MADR. Expression field 9850g contains an expression of conditions which can be determined at the data processing system sending and/or receiving the message (i.e. information). Delivery criteria field 9850h may contain information for how to deliver the message (e.g. by email, MS2MS, etc) and where to deliver the message to (e.g. recipient(s)). Recipient groups (e.g. MS ID group) and recipient wildcarding is supported for delivering to a plurality of recipients. A prioritized attempt may also be specified wherein unsuccessful deliveries cause further delivery attempts. A null setting in field 9850h is resolved to the user of the MS where presentation is to occur. History field 9850i preferably contains a plurality of fields including creation date/time stamp, last changed date/time stamp, creator identity information, updater identity information, system address information where actions took place, and any other information useful for forming useful history of why MADR data is the way it is. Identity information may be a specific identifier or a group identifier, for example used in enforcing intent field 9850f for specific MS processing. Active field 9850j is preferably a Boolean (Yes/No) indicating whether or not the MADR is active (i.e. participates in being considered for automated processing). Filter join value field 9850k contains a null, or a join link to at least one Event Filter Record (EFR) 9855. Description field 9850l contains an optional user documentary (e.g. text) for the MADR 9850. MADRs are operating system independent objects for being processed locally or remotely, and are shared between systems based on permissions.

Event Filter Records (EFRs) 9855 may contain one or more records (rows) which are joined to one or more MADRs by matching filter join field 9855a with filter join field 9850k. A filter join type field 9855b contains the type of data being joined to the MADR(s), and data field 9855c contains data of the type described by field 9855b. For example, data field 9855c is whereabouts information (e.g. location) when type field is WHEREABOUTS, data field 9855c is keyword(s) information (e.g. a string or delimiter separated text strings) when type field is KEYWORDS, and data field 9855c is scheduling information (e.g. date/time expressions) when type field is DATETIME. There may be many supported type fields 9855b with corresponding data 9855c. Description field 9855d contains an optional user documentary (e.g. text) for the EFR 9855. History field 9855e preferably contains a plurality of fields including creation date/time stamp, last changed date/time stamp, creator identity information, updater identity information, system address information where actions took place, and any other information useful for forming useful history of why EFR data is the way it is.

In one embodiment, EFR data is maintained as part of the MADR object itself in fields of intent field 9850f for originator (author) intent for the presentation that can be shared between systems based on permissions, maintained by permissions, and presented using permissions. A preferred embodiment separates out EFR data so that a plurality of MADRs can reference a single EFR. There may be MS applications which use EFRs for other purposes. Although EFRs extend MADR processing, the MADR plus EFR together are viewed semantically as a single MADR object for processing.

Figure 16B:
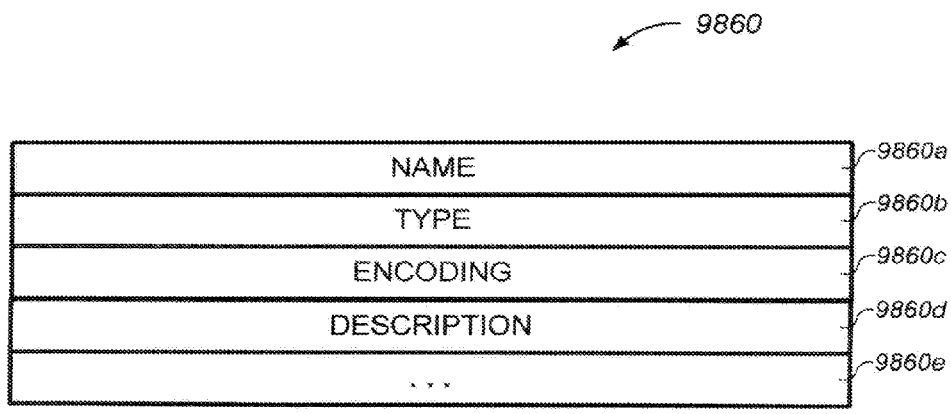
FIG. 16B depicts a preferred embodiment of a Location Reference Data Record (LRDR) for discussing message processing.

FIG. 16B depicts a preferred embodiment of a Location Reference Data Record (LRDR) 9860 for discussing message processing. Location Reference Data Records (LRDRs) 9860 contain reference-able location data which has been saved by a MS user, for example from a map application, navigation application, or other application where a user can mark a saved location. Typical industry terminology includes "waymarks", "waypoints", "pushpins", "bookmarks", "geofence", or any other metaphor whereby a user saves a location from an application, perhaps with a radius, boundary(s) or measurements indicating an area or place in space. The web service (www.gpsping.com and www.pingaps.com) of patent pending Ser. No. 11/207,080 ("System And Method For Anonymous Location Based Services", Johnson) coined terms of "PingSpots" and "Pingimeters" which are similar location metaphors and may contained in LRDRs 9860. LRDRs 9860 may or may not be maintained local to a MS. The terminology "waymark information" used herein is to include all these embodiments to facilitate explanation brevity. Encoding field 9860*c* contains any reasonable whereabouts embodiment for such metaphors, for example such as those used in a graphical user interface. LRDRs are preferably created using a convenient map navigation interface for marking locations on a map, and can be modified (i.e. LRDR fields), moved (i.e. for modifying field 9860*c*), or discarded by a user with a suitable interface.

Name field 9860*a* contains a name for the LRDR 9860, type field 9860*b* contains a type of LRDR for correct interpretation of field 9860*c* (e.g. a plurality of applications sharing a waymark information repository), encoding field 9860*c* contains the whereabouts encoding which can be parsed and processed as indicated by type field 9860*b*, description field 9860*d* contains a user defined description for the LRDR (preferably a text description which can be annotated/annunciated unambiguously), and other fields 9860*e* are not of immediate interest here. In some embodiments, name field 9860*a* contains the description and field 9860*d* is not necessary. In some embodiments, description information (e.g. field 9860*d*) is a recording (e.g. made by a user for audio and/or video presentation for describing LRDR information), and a description type field (e.g. additional field 9860t) may be provided to facilitate interpreting different description formats in field 9860*d*. A user may ensure descriptions are unique if an application does not enforce unique descriptions. Map Term Data Records (MTDRs) of the parent application can also be maintained as LRDRs and accessed appropriately when used. LRDRs 9860 provide the interface for activities of applications used to mark locations so MADR presentation processing can use those locations for useful functionality.

With reference now to FIGS. 8A through 8E, depicted is the preferred embodiment BNF grammar from the parent applications, in particular for memorable reference. An Expression of FIG. 8D may be specified for field 9850*g*. Such an Expression or derivative embodiments thereof may be user configured/specified, preconfigured user selected choices at a data processing system, configuration generated, or defaulted/set in accordance with other user configurations. Various embodiments will interpret at message access time the expression of field 9850*g*, or a data processing system (e.g. MS 2) may internalize field 9850*g* at configuration time for efficient processing at a later time (e.g. at block 9936 upon any configuration changes) when the message is accessed. The reader should appreciate the full scope, meaning, processing, and many embodiments possible for an Expression of FIG. 8D.

Figure 7:
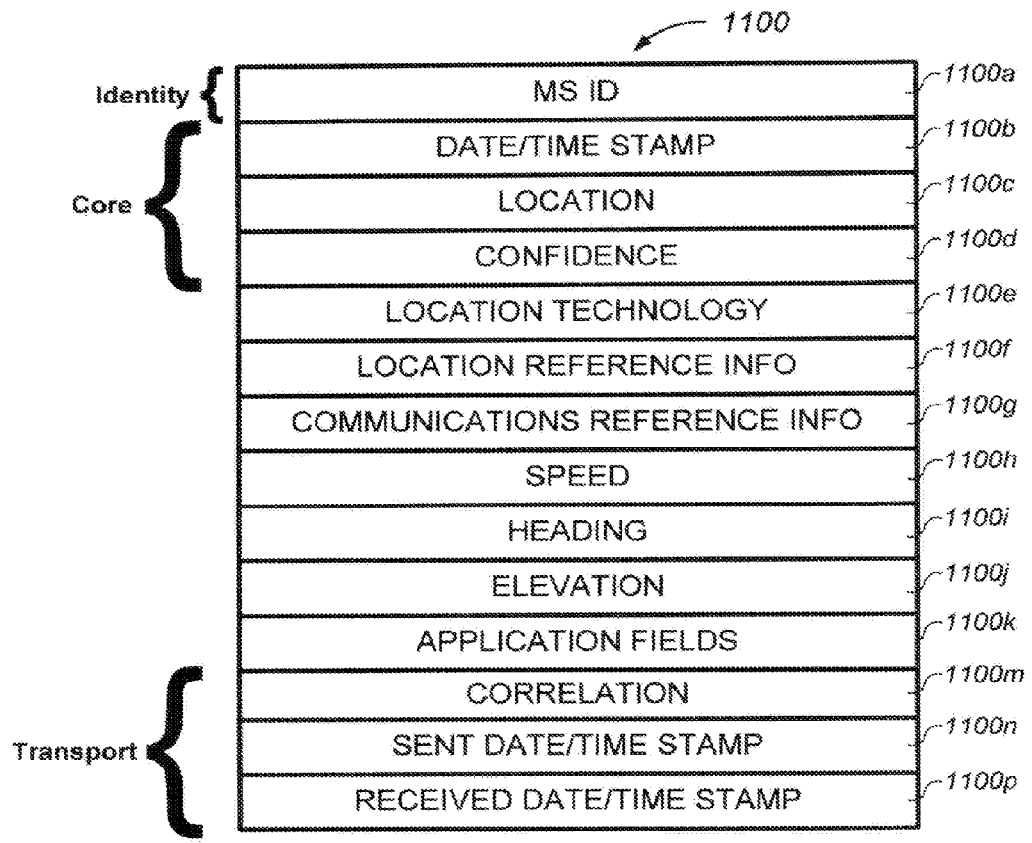
FIG. 7 depicts a preferred embodiment of a Whereabouts (or Wireless) Data Record (WDR) 1100 disclosed in detail in the parent applications.

With reference now to FIG. 7, depicted is a preferred embodiment of a Whereabouts (or Wireless) Data Record (WDR) 1100 from the parent applications, in particular for memorable reference. Recall that data communicated for the many applications of FIG. 14 is preferably carried in application sections of applications fields 1100*k*. Distinct application sections may be referenced with an appfld.X qualifier where X is the application section containing subordinate member data sections. MADR data may also be carried in application fields 1100*k*, preferably subordinate to the particular application for which the MADR data is being sent. The COM-R varieties of message processing will cause carrying MADR data to receiving systems. Depending on embodiments, data sent outbound may use a WDR, MS2MS processing, an email transport platform, or any other appropriate communications means for sending from one data processing system to another.

With reference now to FIG. 14, depicted is a LBX application fields implementation status table from the parent application, in particular for memorable reference. While FIG. 17 facilitates discussing a few application examples of message processing, any application involving a sender (or caller, invoker, submitter, etc) and recipient (or callee, invokee, submittee, etc) may participate in using the message processing disclosed. MADRs will be processed similarly to the descriptions herein for every application with inbound or outbound event. Generic processing is involved for any application.

With reference now to FIG. 17, depicted is a table to facilitate explanation of message processing for ADs, OGMs, OCMs, and generic application COM processing. Explanation table 9875 shows a processing result for a particular scenario including a select exemplary set of applications. Special applications are described in rows 9892 and generic applications are described in rows 9894. Any application may be involved in MADR processing in a similar manner to rows 9894.

AD application: AD specific events are configured for when to access AD specific MADRs in repository 9800 for AD processing (see FIG. 24). ADs may be presented local to the data processing system hosting the repository 9800, or ADs may be presented at remote data processing systems. When an event occurs, MADRs are accessed and any applicable MADRs with expression fields 9850*g* evaluating to True are presented according to the other MADR fields and the observing user's preferences. A COM may also be associated to inbound or outbound advertising information.

OGM application: When a call goes unanswered at the receiving data processing system, processing accesses OGM specific MADRs, and any applicable MADRs with expression fields 9850*g* which evaluate to True are presented according to the other MADR fields. Typically, a single OGM is presented to the caller and an opportunity is provided to the caller for leaving a recorded message. OGM processing is well known in the art, however use of the message repository 9800 processing provides an improved method for customizing OGMs to specific callers. OGMs may be video in nature for video messaging between data processing systems (e.g. MSs).

OCM application: During an active call, a user can perform an action to invoke OCM processing. If the user made the call, it is assumed that the user (caller) has selected to automatically leave a recorded message at the callee's system, for example after the callee's system has presented an OGM (to the caller). When the user invokes OCM processing, the active call thread releases user interface focus (e.g. at the MS) and continues to execute in the background for accessing OCM specific MADRs and then presenting OCM information. The user is free to perform other application processing (i.e. use other thread(s) for other tasks) at the data processing system (MS) while the active call thread automatically processes the OCM and then terminates the call. This saves the caller time from having to leave a message at a callee's system while freeing up the MS for other activities concurrently. If OCM processing is invoked during a received call, the active call thread maintains user interface focus and the OCM is presented in parallel to the active call for both the caller and callee, for example to both hear or see a recording. While the most common embodiment is for voice calls, video calls also apply. The OCM will be presented visually as well as audibly provided the selected MADR provides visual information and the call involves a video session. Typically, a single OCM is presented to a callee's data processing system.

Email application (e.g. appfld.email.X): A COM can be associated to inbound or outbound email. An email COM comes in two forms: COM-L for processing email COM-L specific MADRs at the sender or recipient local system; and COM-R for is processing specified email COM-R MADR(s) at the remote system(s). COM-L MADRs are searched for each email sent or received at the local system (e.g. MS). The SMS/texting application is analogous, preferably with out-of-band data (i.e. not part of SMS/text message) to communicate COM-R MADR information. Email descriptions are interchangeably applied to text messaging, albeit with more simple text message distributions.

Calendar application (e.g. appfld.calendar.X): A COM can be associated to inbound or outbound calendar information (e.g. meeting notice). A Calendar COM comes in the identical two forms: COM-L ("L for local) for processing calendar COM-L specific MADRs at the sender or recipient local system; and COM-R ("R" for Remote) for processing specified calendar COM-R MADR(s) at the remote system(s). COM-L MADRs are searched for each calendar item sent or received at the local system (e.g. MS).

Phone application (e.g. appfld.phone.X): A COM can be associated to inbound or outbound phone calls, voice or video, prior to OCM or OGM processing. A phone application COM comes in the identical two forms: COM-L for processing phone COM-L specific MADRs at the sender or recipient local system; and COM-R for processing specified phone COM-R MADR(s) at the remote system(s). COM-L MADRs are searched for each call made or received at the local system (e.g. MS).

For COM cases, processing takes place for MADRs which have expression field 9850*g* evaluate to True. COM-L (e.g. indicated in field 9850*d*) MADRs which have matching expressions (field 9850*g*=True) are processed for inbound and outbound scenarios. The expression itself may be used to distinguish between whether inbound or outbound distributions are of consideration, or what type of inbound or outbound event is of consideration. In some embodiments, specific COM uses (in field 9850*d*) may indicate how to search MADRs for inbound distributions, outbound distributions, and COM-R outbound distributions (e.g. COM-L-in-email, COM-L-out-email, COM-R-email).

Generic application rows 9894 provide the comprehendible model for other MS applications and COM processing that applies. The advertise application (e.g. appfld.advertise.X), profile application (e.g. appfld.profile.contents), ab application (e.g. appfld.ab.X), emergency application (e.g. appfld.emergency.X), rfid application (e.g. appfld.rfid.X), statistics application (appfld.statistics.X) and appliance application (e.g. appfld.applicance.X) incorporate COM-L and COM-R processing analogously. MADRs presented to the user, or processed at a particular system have many different uses and applications. While MADRs support various presentation formats, any executable can be processed thereby performing processing which may or may not present anything. In some embodiments, the sender's data processing system automatically determines the appropriate COM-R MADR(s) without user involvement and appends the data to the distribution without the sending user being burdened with user interface for specification.

Inbound and outbound distributions for other applications are involved with receiving or sending data within the context of a particular application. For example, the presence of content within the WDR application fields section 1100*k* which is subordinate to an appfld section of fields 1100*k* is used to trigger MADR processor. Charters may be user configured to use AppTerm conditions for causing the same triggers and presentation actions can be configured when the AppTerm expressions evaluate to True. However, a MADR is a presentation object with a "content-centric" approach, "content-centric" in that an operating system independent object (i.e. the MADR) defines all necessary information for the presentation. Application configuration can be conveniently isolated in field 9850*d*. MADRs may be populated by an application installation and removed by an application uninstall. Field 9850*d* may be set by an application installation and unset by an application uninstall. WDRs are not to be the only transport of data between systems in context of the particular application. Other embodiments for communicating data between systems may be used. Continuing with some of the other examples and regardless of transmission embodiments, an inbound/outbound advertisement, inbound/outbound profile, inbound/outbound address book entity, inbound/outbound emergency communication, inbound/outbound rfid transmission, inbound/outbound statistics data entry, inbound/outbound appliance communication transmission, or inbound/outbound distribution of data in other applications can have associated objects (i.e. MADRs) for automated presentation/messaging.

Figure 18:
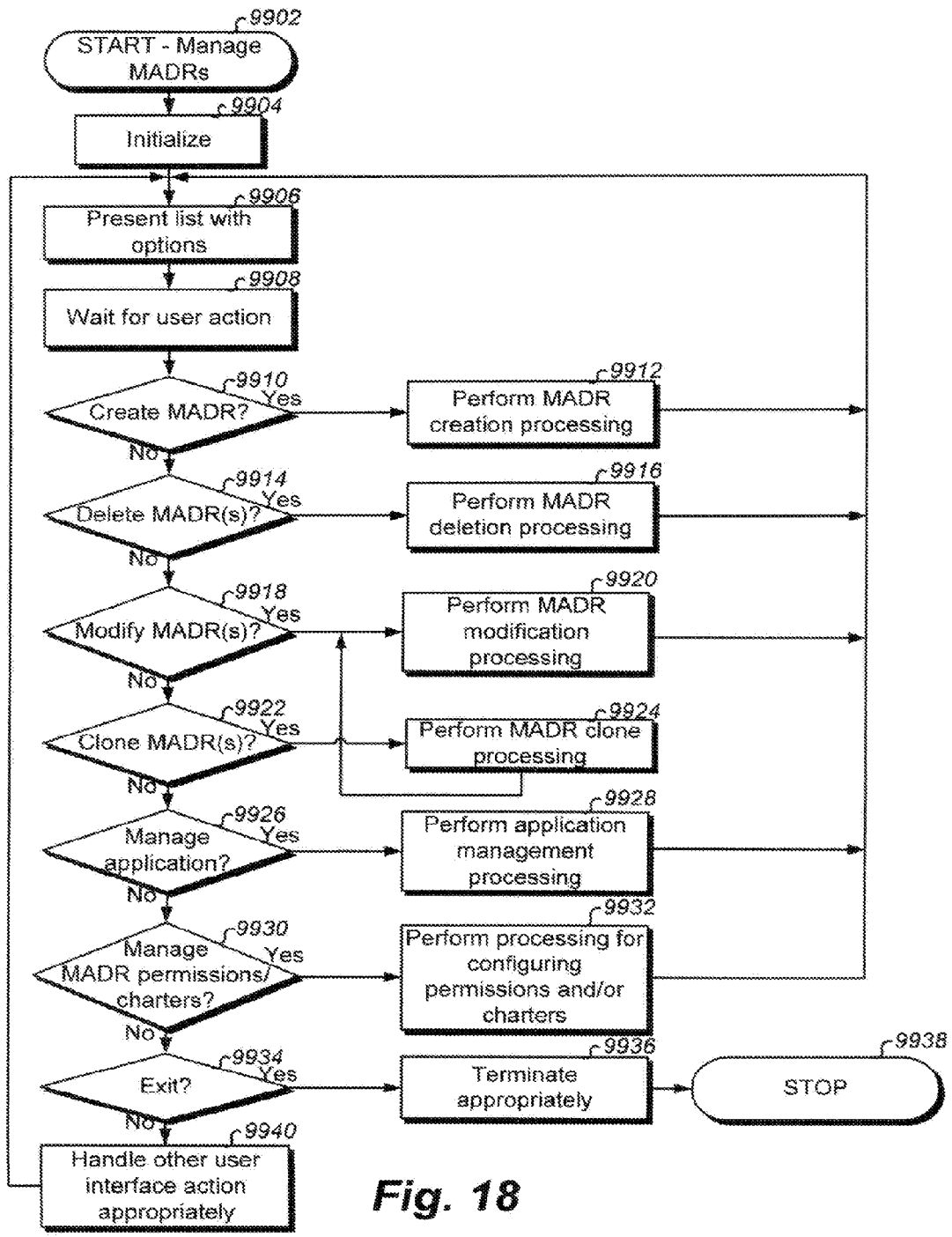
FIG. 18 depicts a flowchart for a preferred embodiment for MADR configuration processing.

With reference now to FIG. 18, depicted is a flowchart for a preferred embodiment of MADR configuration processing. Methods and systems for maintaining data records has been well described in the parent applications and similar systems and methods apply here for another record type (MADR 9850). Many convenient user interfaces can be used for equivalent user configuration functionality. The data within the record, and its use, makes MADR data unique. There are obvious user interface controls, error handling, and processing thereof. Synchronization (e.g. semaphore use) is to be incorporated, for example in multi-threaded MS processing, to prevent asynchronous threads from accessing data at inappropriate times. Processing begins at block 9902, continues to block 9904 where initialization for subsequent processing takes place (e.g. initialize for data access (e.g. start using database interface to SQL embodiment) and get MADRs), block 9906 where options are presented to the user along with a current scrollable list of MADRs, and on to block 9908 where processing waits for a user action in response to options presented at block 9906. Block 9904 preferably accesses all expired MADRs (checking data in field 9850*f*) and expires them (i.e. preferably inactivates, or discards). Block 9904 will access the current list of MADRs remotely or locally as required by the embodiment in an appropriate manner depending on how MADR data is maintained. Various embodiments may categorize MADRs, for example on one or more key fields in MADR data, in order to organize the list for optimal presentation. A MS may come preconfigured with useful MADRs. Upon detecting a monitored user action, processing leaves block 9908 for block 9910.

If block 9910 determines the user selected to create a MADR, processing continues to block 9912 where the MADR is created by the user. Block 9912 supports the user exiting out to block 9906 without having created a MADR, or block 9912 will have saved the created MADR so that it is subsequently presented with the list at block 9906. A MADR is created by interfacing with the user for validated MADR 9850 field information and any joined EFR 9855 information described above with FIG. 16A. MADRs may be validated based on use field 9850*d*, type field 9850*b*, or any other MADR field(s) specified. Block 9912 provides convenient interfaces for joining to EFR(s) and for creating EFR(s) information. Block 9912 continues back to block 9906 for re-presenting the list and options and again determining what the user would like to do. If block 9910 determines the user did not select to create a MADR, processing continues to block 9914.

If block 9914 determines the user selected to delete one or more selected MADRs, processing continues to block 9916 where the selected MADR(s) are discarded. The user may interface with the presented list for selecting one or more MADRs for deletion. Any joined EFR(s) are preferably unaffected by a deletion (except in the embodiment where EFR information is contained in the MADR itself). Block 9916 supports is the user exiting out to block 9906 without having deleted the selected MADR(s) (e.g. after an "Are you Sure?" prompt), or block 9916 will have discarded the selected MADR(s) which will subsequently be reflected in the list presented at block 9906. Block 9916 also discards any associated pending presentation prompt configurations or processing threads (from block 10654) using handle field 9850*a* (e.g. terminates threads, removes calendar entry(s), update history). Block 9916 continues back to block 9906 already described. If block 9914 determines the user did not select to delete one or more MADRs, processing continues to block 9918.

If block 9918 determines the user selected to modify one or more MADRs, processing continues to block 9920 where the selected MADR(s) are appropriately modified by the user. A MADR is altered by interfacing with the user for validated MADR 9850 field information described above with FIG. 16A. Processing of block 9920 performs modification processing using the same data validation rules used for creating a MADR. If a plurality of MADRs are selected, then the user interface at block 9920 supports making a common change across all selected MADRs, otherwise the user interfaces to a single MADR. EFR(s) are preferably unaffected by a modification, except perhaps by being newly joined to, or having join(s) removed (except in the embodiment where EFR information is contained in the MADR itself). Block 9920 supports the user exiting out to block 9906 without having modified selected MADR(s), or block 9920 will have saved the modified MADR data so it is subsequently presented with the list at block 9906. Block 9920 may discard associated pending presentation prompt configurations or processing threads using handle field 9850*a* (e.g. terminates threads, removes calendar entry(s), update history). In another embodiment, Block 9920 may support modifying associated pending presentation prompt configurations or processing thread instruction using handle field 9850*a*. Block 9920 continues back to block 9906. If block 9918 determines the user did not select to modify one or more MADR(s), processing continues to block 9922.

If block 9922 determines the user selected to clone one or more MADRs, processing continues to block 9924 where the selected MADR(s) are appropriately cloned (copied) for creating a set of new MADRs which can then be "tweaked" or further modified at block 9920. The newly created MADRs are copied in their entirety from the source MADRs except new handle field(s) 9850*a* are system generated to ensure uniqueness. The user may modify the handle(s) at block 9920 provided all MADRs contain unique handles. Block 9924 continues to block 9920 for modification processing described above. Cloned and/or modified MADR data is subsequently presented with the list at block 9906. If block 9922 determines the user did not select to clone one or more MADR(s), processing continues to block 9926.

If block 9926 determines the user selected to manage an application, then processing continues to block 9928 where any of a plurality of applications are managed for being properly configured for MADR data or changes thereof. Block 9906 preferably displays which applications can be managed so that processing at block 9928 can determine which application was selected for being managed. Block 9928 is described by FIG. 19. Block 9928 continues back to block 9906 upon FIG. 19 processing termination. If block 9926 determines the user did not select to manage an application, processing continues to block 9930.

If block 9930 determines the user selected to manage MADR related privileges or charters, processing continues to block 9932 where the user is able to create, delete, alter, or work with privileges and/or charters. Privilege and charter configuration was well described in the parent applications. Similarly, any aspect of MADR processing disclosed can be privileged for proper interoperability between MSs, and charters may or may not be managed for replacing, complementing, or enhancing functionality disclosed herein. Block 9932 continues back to block 9906 after configuration processing has been completed. The user may or may not have altered privilege or charter data (e.g. viewed privileges or charters). If block 9930 determines the user did not select to manage privileges or charters, processing continues to block 9934.

If block 9934 determines the user selected to exit FIG. 18 processing, block 9936 terminates FIG. 18 processing appropriately (e.g. terminate access to data (e.g. stop using database interface to SQL embodiment)), and FIG. 18 processing terminates at block 9938. Block 9936 also preferably performs pruning of MADRs which have expired by checking any expiration criteria of field 9850*f*. If block 9934 determines the user did not select to exit, processing continues to block 9940 where other monitored user actions leaving block 9908 are appropriately handled before continuing back to block 9906. Re-presentation of options at block 9906 may incorporate results of FIG. 18 processing up to that point.

History field 9850*i* is to be appropriately updated to reflect user configurations made in FIG. 18, for example at blocks 9912, 9920, 9924, etc. While not explicitly shown in FIG. 18, field 9850*i* is used at blocks 9906, 9912, 9914, 9920, 9924, 9928 and 9940 to enforce permissions (privileges) between the user using FIG. 18 processing and the user who originated or last updated the MADR for what MADR alterations and management is permitted to be performed. Blocks 9906, 9912, 9914, 9920, 9924, 9928 and 9940 provide errors to the user of FIG. 18 processing when a needed privilege has not been granted. In some embodiments, a privilege contains an authority level whereby users with a certain authorization level are able to perform certain modifications to MADR data, and users without a certain authority level cannot make certain modifications.

FIG. 18 processing should occur after appropriate authentication, for example to ensure a valid user, administrator, or valid credentials are used. In some embodiments, FIG. 18 includes authentication processing rather than relying on authentication prior to invocation. In some embodiments, any subset of FIG. 18 processing can be accessible to an authenticated user, administrator, or driving process, and authentication can be used to determine what subset(s) of processing are made available. For example, some users have access to configure a first set of varieties of MADRs (i.e. MADRs containing certain data (e.g. different types in field 9850*b*)), while other users have access to configure a different second set of varieties of MADRs. In other embodiments, credentials provided to FIG. 18 processing are validated at block 9904 and used at block 9906 to reveal which subset of options are made available for configuration based on credentials provided.

Permissions (privileges) may be enforced at FIG. 18 processing blocks for preventing or allowing viewing, creation, alterations, deletions, or any other maintenance, in particular when the originating user is not the same as the maintaining user. Field 9850*i* should be used to validate permissions between different users, or groups, for what can and cannot be performed to MADR(s) or other processing where reconciliation is performed. In some embodiments, intent field 9850*f* contains instruction for how to reconcile between the originator and the observer.

Figure 9:
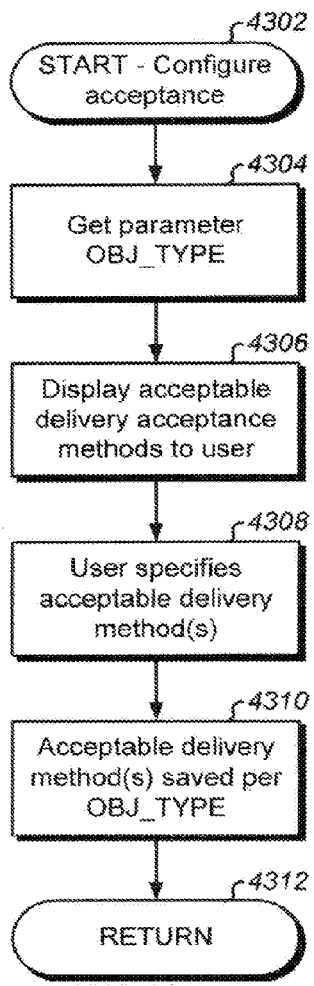
FIG. 9 depicts a flowchart for describing a preferred embodiment of a procedure for configuring MS acceptance of data from other MSs.

With reference now to FIG. 9, depicted is a flowchart for describing a preferred embodiment of a procedure for configuring MS acceptance of data from other MSs. MADR information is shared just as described in the parent applications for sharing permissions and charters. Processing starts at block 4302 and continues to block 4304 where a parameter passed by a caller is determined. The parameter indicates which object type (data type) to configure delivery acceptance (e.g. MADR_INFO). Thereafter, block 4306 displays acceptable methods for accepting data from other MSs, preferably in a radio button form in a visually perceptible user interface embodiment. A user is presented with two (2) main sets of options, the first set preferably being an exclusive selection:

Accept no data (MS will not accept data from any source); or

Accept all data (MS will accept data from any source); or

Accept data according to permissions (MS will accept data according to those sources which have permission to send certain data (perhaps privilege also specifies by a certain method) to the MS).

And the second set being:

Targeted data packet sent or broadcast data packet sent (preferably one or the other);

Electronic Mail Application;

SMS/text message; and/or

Persistent Storage Update (e.g. file system).

Block 4306 continues to block 4308 where the user makes a selection in the first set, and any number of selections in the second set. Thereafter, processing at block 4310 saves the user's selections for the object type parameter passed, and processing returns to the caller at block 4312. Communications processing may have intelligence for an hierarchy of attempts such as first trying to send or broadcast, if that fails send by email, if that fails send by SMS/text message, and if that fails alert the MS user for manually copying over the data at a future time (e.g. when MSs are in wireless vicinity of to each other). Block 4306 may provide a user selectable order of the attempt types. Intelligence can be incorporated for knowing which data was sent, when it was sent, and whether or not all of the send succeeded, and a synchronous or asynchronous acknowledgement can be implemented to ensure it arrived safely to destination(s). Applicable information is preferably maintained to a history for proper implementation.

In one embodiment, the second set of configurations is further governed by individual privileges (each send type), and/or privileges per a source identity. For example, while configurations of the second set may be enabled, the MS will only accept data in a form from a source in accordance with a privilege which is enabled (set for the source identity). Privilege examples (may also each have associated time specification) include:

Grant Joe privilege to send all types of MADRs, or certain (e.g. types, contents, features, any characteristic(s)) MADRs;

Grant Joe privilege to send certain MADRs using certain method(s) (privilege for each data type and method combination); and/or Grant Joe privilege to send certain MADRs using certain method(s) (privilege for each data type and method combination) at certain time(s).

In another embodiment, there may be other registered applications (e.g. specified other email applications) which are candidates in the second set. This allows more choices for a receiving application with an implied receiving method (or user may specify an explicit method given reasonable choices of the particular application). For example, multiple MS instant messaging and/or email applications may be selectable in the second set of choices, and appropriately interfaced to for accepting data from other MSs. This allows specifying preferred delivery methods for data (e.g. charters and/or permissions data), and an attempt order thereof.

In some embodiments, MADR data that is received may be received by a MS in a deactivated form whereby the user of the receiving MS must activate the MADR for use (e.g. use of MADR field 9850*j* for indicating whether or not the MADR is active (Y=Yes, N=No)). Field 9850*j* may also be used by the MADR originator or recipient for disabling or enabling for a variety of reasons. This permits a user to examine MADRs, and perhaps put them to a test, prior to putting them into use. Other embodiments support activating MADRs (received and/or originated): one at a time, as selected sets by user specified criteria (any charter characteristic(s)), all or none, by certain originating user(s), by certain originating MS(s), or any other desirable criteria. Of course, privileges are defined for enabling accepting MADRs from a MS, but many privileges can be defined for accepting MADRs with certain desired characteristics.

Figure 10A:
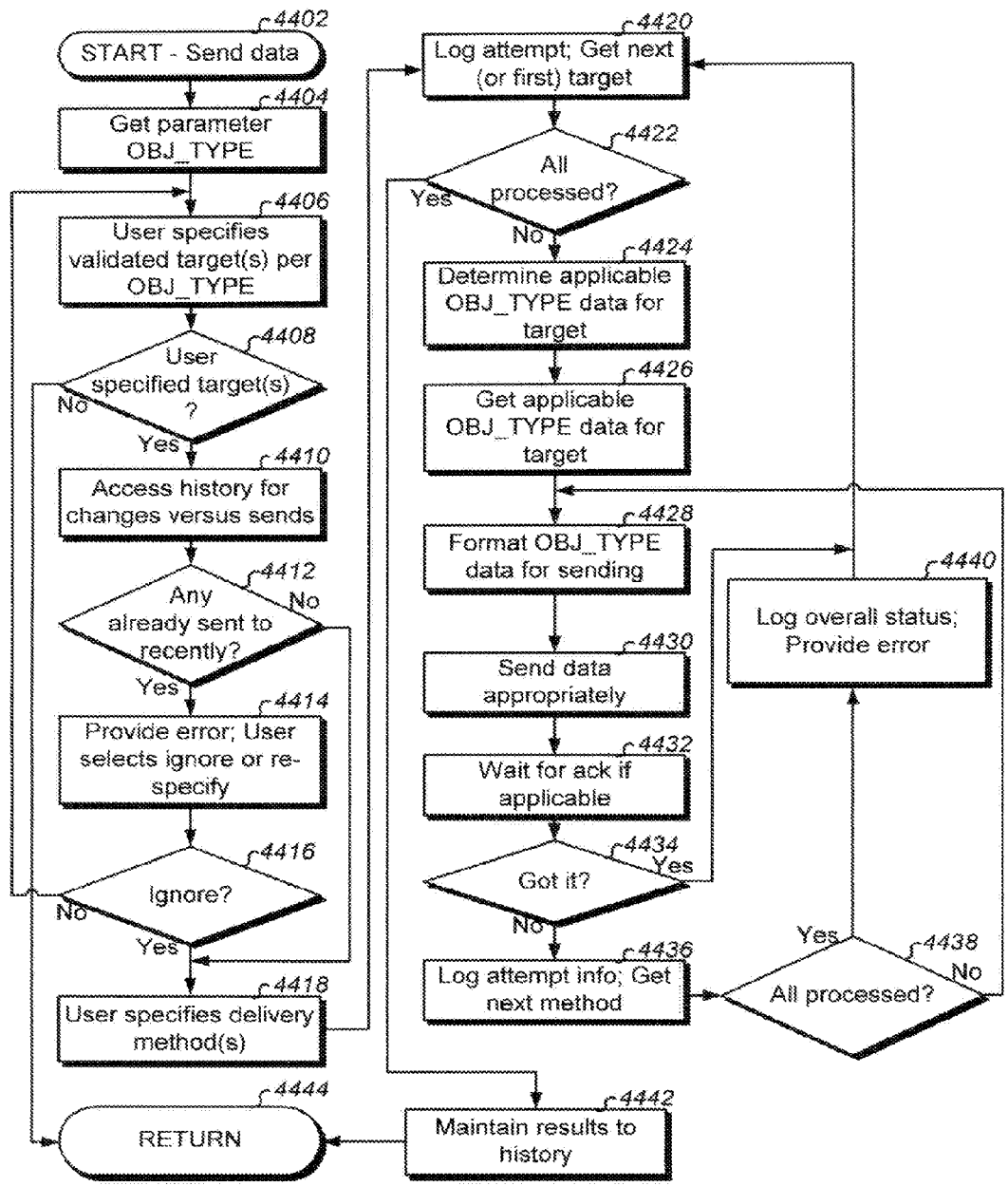
FIG. 10A depicts a flowchart for describing a preferred embodiment of a procedure for sending MS data to another MS.

FIG. 10A depicts a flowchart for describing a preferred embodiment of a procedure for sending MS data to another MS. The purpose is for the MS of FIG. 10A processing (e.g. a first, or sending, MS) to transmit information to other MSs (e.g. at least a second, or receiving, MS), for example MADR(s). See the parent applications for the FIG. 10A discussions also relevant to MADRs. Processing begins at block 4402, continues to block 4404 where the caller parameter passed to FIG. 10A processing is determined (i.e. OBJ_TYPE), and processing continues to block 4406 for interfacing with the user to specify targets to send data to, in context of the object type parameter specified for sending (MADR_INFO). An alternate embodiment will consult a configuration of data for validated target information. Depending on the present disclosure embodiment, a user may specify any reasonable supported (ID/IDType) combination of the BNF grammar ID construct (see FIG. 8B) as valid targets. Validation will validate at least syntax of the specification. In another embodiment, block 4406 will access and enforce known permissions for validating which target(s) (e.g. grantor(s)) can be specified. Various embodiments will also support wildcarding the specifications for a group of ID targets (e.g. department* for all department groups). Additional target information is to be specified when required for sending, for example, if email or SMS/text message is to be used as a send method (i.e. applicable destination recipient addresses to be specified). An alternate embodiment to block 4406 accesses mapped delivery addresses from a database, or table, (referred to as a Recipient Address Book (RAB)) associating a recipient address to a target identity, thereby alleviating the user from manual specification, and perhaps allowing the user to save to the RAB for any new useful RAB data. In another embodiment, block 4428 (discussed below) accesses the RAB for a recipient address for the target when preparing the data for sending.

Upon validation at block 4406, processing continues to block 4408. It is possible the user was unsuccessful in specifying targets, or wanted to exit block 4406 processing. If block 4408 determines the user did not specify at least one validated target (equivalent to selecting to exit FIG. 10A processing), then processing continues to block 4444 where processing returns to the caller. If block 4408 determines there is at least one target specified, then block 4410 accesses history to determine if any of the targets have been sent the specific data already. Thereafter, if block 4412 determines the most recently updated data for a target has already been sent, then block 4414 presents an informative error to the user, preferably requiring user action. Block 4414 continues to block 4416 when the user performs the action. If block 4416 determines the user selected to ignore the error, then processing continues to block 4418, otherwise processing continues back to block 4406 for updating target specifications.

Block 4418 interfaces with the user to specify a delivery method. Preferably, there are defaulted setting(s) based on the last time the user encountered block 4418. Any of the "second set" of options described with FIG. 9 can be made. Thereafter, block 4420 logs to history the forthcoming send attempt and gets the next target from block 4406 specifications before continuing to block 4422. If block 4422 determines that all targets have not been processed, then block 4424 determines applicable OBJ_TYPE data for the target (e.g. check history for any new data that was not previously successfully sent), and block 4426 gets (e.g. preferably new data, or all, depending on embodiment) the applicable target's OBJ_TYPE data (MADR(s)) before continuing to block 4428. Block 4428 formats the data for sending in accordance with the specified delivery method, along with necessary packet information (e.g. source identity, wrapper data, etc) of this loop iteration (from block 4418), and block 4430 sends the data appropriately. For a broadcast send, block 4430 broadcasts the information, and processing continues to block 4432. For a targeted send, block 4430 formats the data intended for recognition by the receiving target. Parameters are prepared so preferably a MADR and associated EFR information (i.e. a complete MADR object) is delivered in its entirety. However, other embodiments discussed may be used for dealing with EFR information. In a send email embodiment, confirmation of delivery status may be used to confirm delivery with an email interface API to check the COD (Confirmation of Delivery) status, or the sending of the email (also SMS/text message) is assumed to have been delivered in one preferred embodiment.

For sending an email, SMS/text message, or other application delivery method, block 4430 will use the additional target information (recipient address) specified via block 4406 for properly sending. Thereafter, block 4432 waits for a synchronous acknowledgement if applicable before either receiving one or timing out. If a broadcast was made, one (1) acknowledgement may be all that is necessary for validation, or all anticipated targets can be accounted for before deeming a successful ack. An email, SMS/text message, or other application send may be assumed reliable and that an ack was received. Thereafter, if block 4434 determines an applicable ack was received (i.e. data successfully sent/received), or none was anticipated (i.e. assume got it), then processing continues back to block 4420 for processing any next target(s). If block 4434 determines an anticipated ack was not received, then block 4436 logs the situation to history and the next specified delivery method is accessed. Thereafter, if block 4438 determines all delivery methods have already been processed for the current target, then processing continues to block 4440 for logging the overall status and providing an error to the user. Block 4440 may require a user acknowledgement before continuing back to block 4420. If block 4438 determines there is another specified delivery method for sending, then processing continues back to block 4428 for sending using the next method.

Referring back to block 4422, if all targets are determined to have been processed, then block 4442 maintains FIG. 10A processing results to history and the caller is returned to at block 4444. In an alternate embodiment to FIG. 10A processing, a trigger implementation is used for sending/broadcasting data at the best possible time (e.g. for new/modified MADR information) as soon as possible, as soon as a target is detected to be nearby, or in the vicinity, or as soon as the user is notified to send (e.g. in response to a modification) and then acknowledges to send. In another embodiment, background thread(s) timely poll (e.g. per user or system configurations) the MADR data to determine which data should be sent, how to send it, who to send it to, what applicable permissions are appropriate, and when the best time is to send it. A time interval, or schedule, for sending data to others on a continual interim basis may also be configured. This may be particularly useful as a user starts using a MS for the first time and anticipates making many configuration changes. The user may start or terminate polling threads as part of MS configuration processing, so that FIG. 10A is relied on to make sure MADR objects are communicated as needed. Appropriate blocks of FIGS. 10A&B will also interface to statistics data for reporting successes, failures and status of FIGS. 10A&B processing.

Figure 10B:
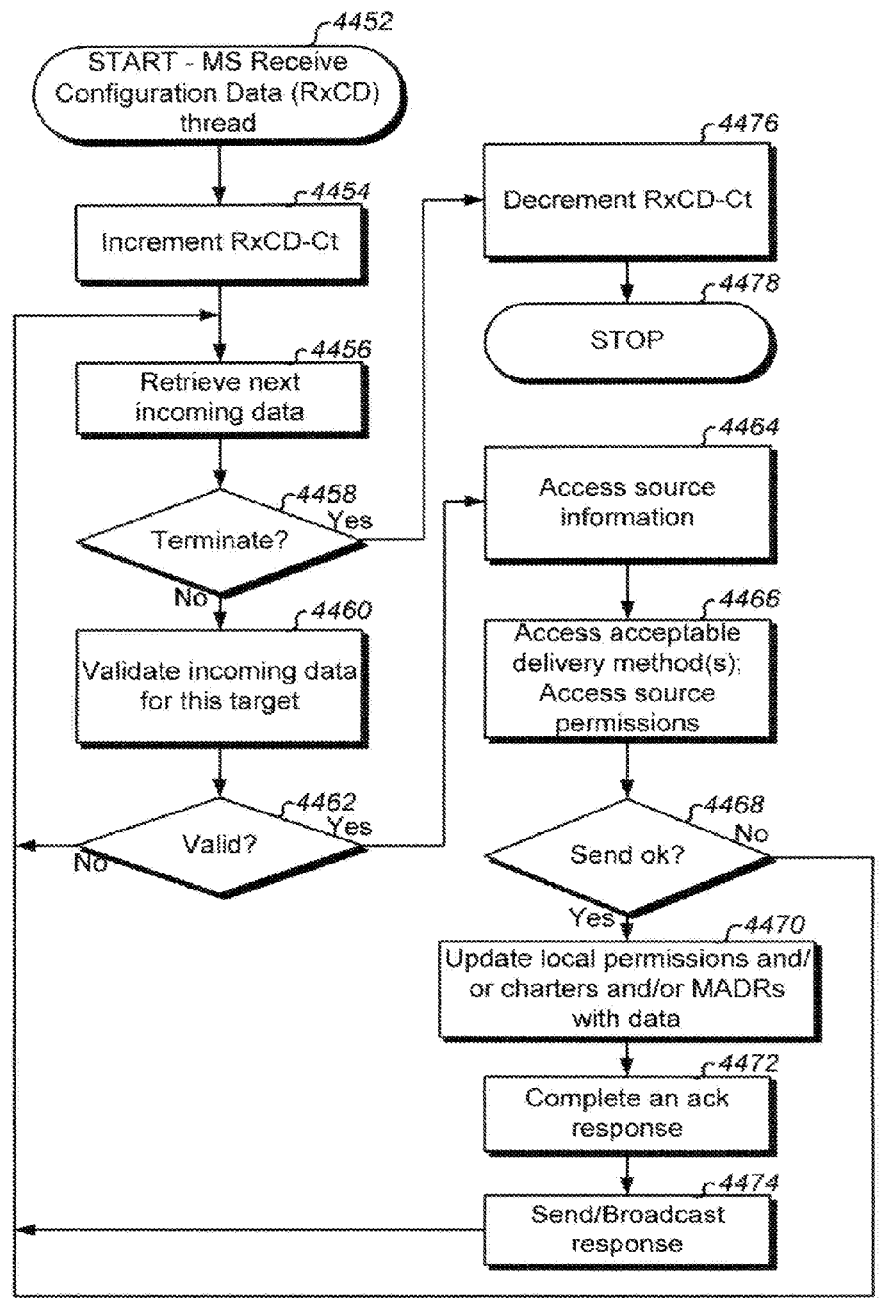
FIG. 10B depicts a flowchart for describing a preferred embodiment of receiving MS configuration data from another MS.

In sum, FIGS. 10A and 10B provide a peer to peer method for ensuring MADR information can be shared between MSs, wherein FIG. 10A sends in a peer to peer fashion and FIG. 10B receives in a peer to peer to fashion. FIG. 10A demonstrates a preferred push model. A pull model may be alternatively implemented. An alternative embodiment may make a request to a MS for its MADR data and then populate its local image of the data after receiving the response. Privileges would be appropriately validated at the sending MS(s) and/or receiving MS(s) in order to ensure appropriate data is sent/received to/from the requesting MS.

FIG. 10B depicts a flowchart for describing a preferred embodiment of receiving MS configuration data from another MS. FIG. 10B processing describes a Receive Configuration Data (RxCD) process worker thread. See the parent applications for FIG. 10B discussions also relevant to MADRs. A RxCD thread processing begins at block 4452 upon the MS receiving MADR data, continues to block 4454 where a process worker thread count RxCD-Ct is accessed and incremented by 1 (using appropriate semaphore access (e.g. RxCD-Sem)), and continues to block 4456 for retrieving sent data, perhaps a special termination request entry, and only continues to block 4458 when a record of data (MADR, or termination record) is retrieved. Block 4456 stays blocked on retrieving from a receive queue until any record is retrieved, in which case processing continues to block 4458. If block 4458 determines a special entry indicating to terminate was not found in the queue, processing continues to block 4460. There are various embodiments for RxCD thread(s) feeding from a receive queue for different record types. In another embodiment, there are separate receive queues depending on data to process. In another embodiment, thread(s) are modified with logic of RxCD thread(s) to handle MADR data specifically. Block 4460 validates incoming data for this targeted MS before continuing to block 4462. A preferred embodiment of receive processing already validated the data is intended for this MS by having listened specifically for the data, or by having already validated it is at the intended MS destination (e.g. block 4458 can continue directly to block 4464 (no block 4460 and block 4462 required)). If block 4462 determines the data is valid for processing, then block 4464 accesses the data source identity information (e.g. owner information, sending MS information, grantor/grantee information, etc, as appropriate for an embodiment), block 4466 accesses acceptable delivery methods and/or permissions/privileges for the source identity to check if the data is eligible for being received, and block 4468 checks the result. Depending on an embodiment, block 4466 may enforce an all or none privilege for accepting the MADR data, or may enforce specific privileges from the receiving MS (MS user) to the sending MS (MS user) for exactly which MADRs are acceptable to be received and locally maintained.

If block 4468 determines the delivery is acceptable, and privileged or privileged per source, then block 4470 appropriately updates the MS locally with the data (depending on embodiment of block 4466, block 4470 may remove from existing data at the MS as well as per privilege(s)), block 4472 completes an acknowledgment, and block 4474 sends/broadcasts the acknowledgement (ack), before continuing back to block 4456 for more data. In some embodiments, block 4470 may force a setting to field 9850$j$. MADRs received at block 4470 which are not compatible with the receiving MS are preferably filtered out. For example, an Intel architecture should filter out an incompatible executable (e.g. Motorola) architecture. A MS without video capability may filter out video presentation objects. Record 9850 fields are preferably checked at block 4470 to ensure unusable MADRs are not received, however an alternate embodiment may receive any MADRs so they can be shared with others, or interrogated for what a user is missing. FIG. 18 should enforce setting field 9850$j$ for MADRs which are not relevant to the particular MS. Upon receipt, block 4470 preferably uses intent field 9850$f$ information for invoking AD event processing made by FIG. 24 at some time remote from the receiving MS of FIG. 10B processing. For example, block 4470 will update local static variables, start threads, or perform any other processing as indicated by intent for AD presentation. Block 4470 will invoke appropriate AD event processing based on permissions maintained between the receiving MS (e.g. user) and the sending/originating MS (e.g. user).

If block 4468 determines the data is not acceptable, then processing continues directly back to block 4456. For security reasons, it is best not to respond with an error. It is best to ignore the data entirely. In another embodiment, an error may be returned to the sender for appropriate error processing and reporting. Referring back to block 4462, if it is determined the data is not valid, processing continues to block 4456.

Referring back to block 4458, if a worker thread termination request was found at the receive queue, then block 4476 decrements the RxCD worker thread count by 1 (using appropriate semaphore access (e.g. RxCD-Sem)), and RxCD thread processing terminates at block 4478. Block 4476 may also check the RxCD-Ct value, and signal the RxCD process parent thread that all worker threads are terminated when RxCD-Ct equals zero (0).

In an alternate embodiment, MADR data records contain a sent date/time stamp field of when the data was sent by a remote MS. Then, a received date/time stamp field for calculating a TDOA measurement can be used for location determination processing that may occur at the MS. FIG. 10B is also useful for receiving MADR objects from time to time to a MS local cache as a MS travels to whereabouts for receiving the objects. The MS local cache of MADRs can also be updated through charter configurations which execute at an originating system or the MS of FIG. 10B processing. Block 4470 preferably performs pruning of local cache MADRs which have expired by checking any expiration criteria of field 9850$f$. Block 4470 is an opportune time to ensure MADR objects at the MS are only those that should be there. In another embodiment, a separate polling thread runs at the MS for pruning MADRs to ensure that expired MADRs are automatically and timely deleted.

There are different embodiments for how to deal with EFR information associated with MADRs. In a preferred embodiment, EFR information is sent with MADR information (i.e. still viewed as a single MADR object) and received for being processed at block 4470 like other MADR data described above, albeit to the appropriate EFR form with proper join information. In another embodiment, MADR objects are received without EFR information and field 9850$k$ is an anticipated value for joining to EFR data already present, or soon to be present, at the receiving MS. In yet another embodiment, EFR data is received from time to time to MS local cache as separate data objects from MADR objects, for example from source systems which may or may not be the same source as linked MADR objects. When MADR and EFR information is received independently, fields 9850$k$ and 9855$a$ are anticipated values by the source systems for integrating effectively.

For other acceptable receive processing, methods are well known to those skilled in the art for "hooking" customized processing into application processing of sought data received. For example, in an email application, a callback function API is preferably made available to the present disclosure so that every time an applicable received email distribution is received with specified criteria (e.g. certain subject, certain attached file name, certain source, or any other identifiable email attribute(s) (provided by present disclosure processing to API)) sent by block 4430, the callback function (provided by present disclosure processing to the appropriate API) is invoked for custom processing. In this example, the present disclosure invokes the callback API for providing: the callback function to be invoked, and the email criteria for triggering invocation of the callback function; for processing of MADR data. For example, a unique subject field indicates to the email application that the email item should be directed by the email application to the callback function for processing. The present disclosure callback function then parses MADR information from the email item (may be in a binary attachment) and updates repository 9800. Data received in the email item may be textual syntax in an email body or attached file form, XML syntax in the email body or attached file form, an X.409 binary encoding in attached file form, or other appropriate format received with the email item (e.g. new Document Interchange Architecture (DIA) attribute data, etc). DIA is an IBM electronic mail (email) interchange protocol standard between email systems. A process return status is preferably returned by the callback function, for example for appropriate email confirmation of delivery processing.

In another embodiment, the present disclosure provides at least one thread of processing for polling a known API, or email repository, for sought criteria (e.g. attributes) which identifies the email item as destined for present disclosure processing. Once the email item(s) are found, they are similarly parsed and processed for updating MADR data.

Thus, there are well known methods for receiving MADRs from an originating MS to a receiving MS, for example when using email. Similarly (callback function or polling), SMS/text messages can be used to communicate MADR data from one MS to another MS, albeit at smaller data exchange sizes. The sending MS may break up larger portions of data which can be sent as parse-able text (e.g. source syntax, XML, etc.) to the receiving MS. It may take multiple SMS/text messages to communicate the data in its entirety.

Regardless of the type of receiving application, those skilled in the art recognize many clever methods for receiving data in context of a MS application which communicates in a peer to peer fashion with another MS (e.g. callback function(s), API interfaces in an appropriate loop which can remain blocked until sought data is received for processing, polling known storage destinations of data received, or other applicable processing). FIG. 10B receive processing may also be used to process MADR data from a service, for example at an opportune time when high speed communications is available. In some embodiments, the LBX service propagation architecture is leveraged for hopping data to the targeted MS wherein distance between an originating MS or service and a targeted MS is increased by intermediary MS(s) "middle-manning" the transmission.

MADR data may be manually copied from one data processing system to another over any appropriate communications connection, for example between MSs. MADR data may also be manually copied from one MS to another MS using available file management system operations (move or copy file/data processing). For example, a special directory can be defined which upon deposit of a file to it, processing parses it, validates it, and uses it to update repository 9800. Errors found may also be reported to the user, but preferably there are automated processes that create/maintain the file data to prevent errors in processing. Any of a variety of communications wave forms can be used depending on MS capability.

FIGS. 9 and 10A processing are preferably presented for a user option selection at block 9906, and then invoked (handled) upon user selection at block 9940. FIG. 9 is invoked when the user wants to configure acceptance criteria. FIG. 10A is invoked after the user has selected one or more MADRs and then selects to send them.

Figure 19:
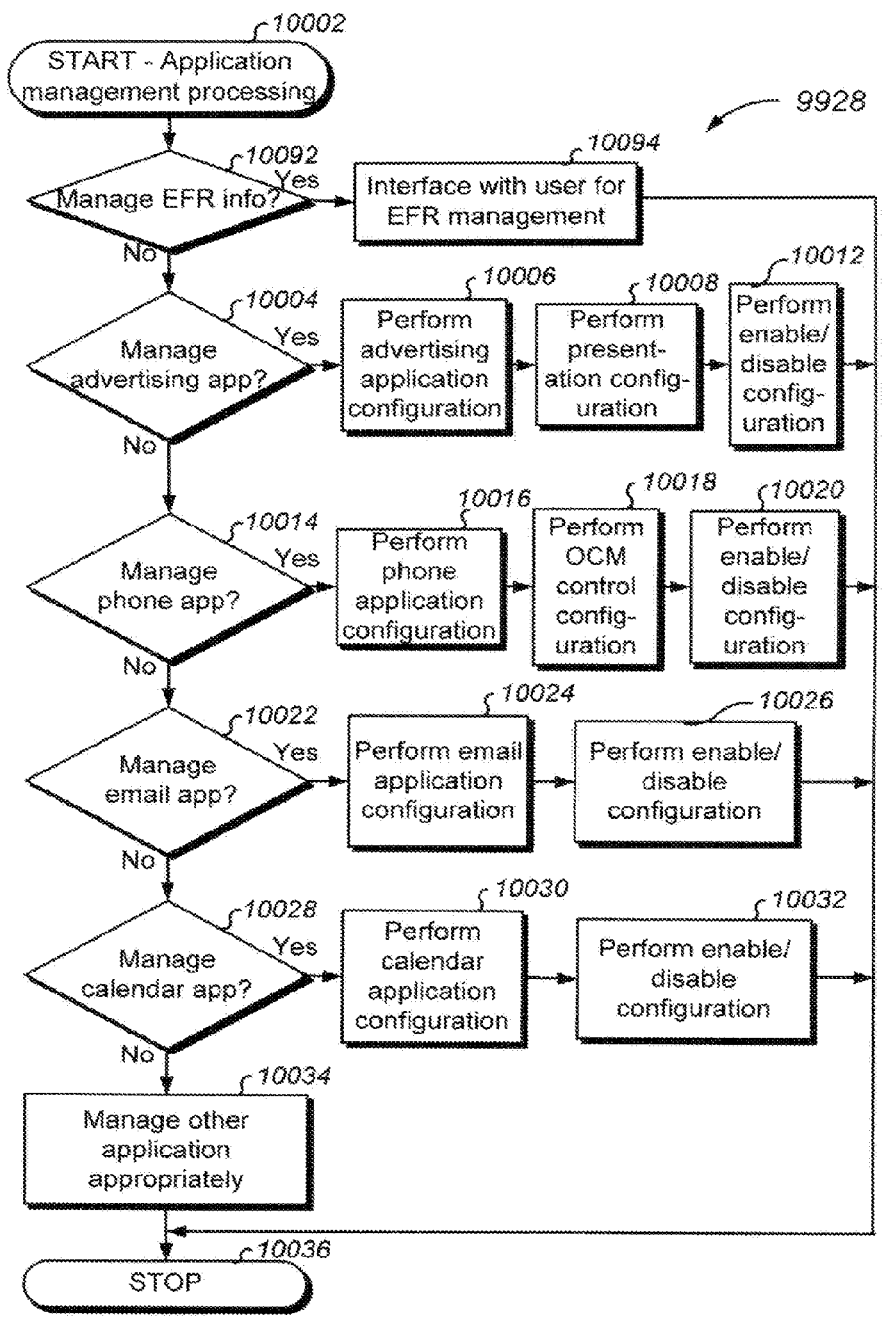
FIG. 19 depicts a flowchart for a preferred embodiment of application management processing.

FIG. 19 depicts a flowchart for a preferred embodiment of application management processing. Block 9928 processing begins at block 10002 and continues to block 10092. If block 10092 determines that EFR 9855 information was selected for being managed by the user, block 10094 interfaces with the user for creating, deleting, modifying and maintaining EFRs 9855. The user may choose to save changes or exit any changes before continuing to block 10036 for terminating block 9928 processing. EFRs tend to be application specific for filtering events for MADR processing, however the same EFRs may be configured for a plurality of different applications.

History field 9855e is to be appropriately updated to reflect user configurations made at block 10094. While not explicitly shown, field 9855e is used at block 10094 to enforce permissions (privileges) between the user using FIG. 19 processing and the user who originated or last updated the EFR for what EFR alterations and management is permitted to be performed. Block 10094 provides errors to the user of FIG. 19 processing when a needed privilege has not been granted.

If block 10092 determines the user did not select to manage EFRs, then processing continues to block 10004. Block 10004 starts the series of checking which particular application was selected for management from block 9906 options. If block 10004 determines the application to be managed is the advertising application, block 10006 performs advertising application configuration, for example data which may be found in section 8004f, and processing continues to block 10008. The user interfaces at block 10008 to set how the advertising application will present AD MADR information. A preferred embodiment of block 10008 configure a user's presentation preferences for all MADR presentations, in particular since many of the MADRs for any application may contain advertisement information, perhaps shared from another MS or system. Having block 10008 configure all MADR presentation reminds the user that advertising is involved despite there being useful MADR configurations that do not involve advertising. Block 10008 supports configuration outside of MADR data of a visual mode setting can be set here for the observer's preference of: full screen, dedicated user interface visual area, newly spawned window, pop-up (e.g. window) with "stolen" focus, title-bar area of currently focused window, user originator's intent, or other visual method for presenting MADR information. An audio mode setting can also be set for the observer's preference of: mix, preempt, or use originator's intent. Note that MADR presentation will compare an originator's intent configured in the MADR with the observer's preference for reconciling a best fit presentation of the MADR. Permissions govern authoritative reconciliation when there is a conflict between the originator's intent and the observer's preference. Block 10008 continues to block 10012.

Block 10012 preferably accesses the most recent settings of Boolean variables for enabling MADR processing as a whole. Each Boolean variable (data) accessed by FIG. 19 is preferably maintained to an application term, referred to as AppTerm. An AppTerm was well defined in the parent applications and was well described in context of the BNF grammar of FIGS. 8A through 8E (see FIG. 8D). At blocks 10012, 10020, 10026, 10032 and 10034, Boolean variables are provided for enable/disable of all MADR processing (e.g. MADR_srch), enable/disable certain application MADR processing (e.g. MADR_AD), or enable/disable certain subsets of application MADR processing (e.g. MADR_COM-R-cal for calendar). Blocks 10012, 10020, 10026, 10032 and 10034 preferably use permissions to enforce what subsets of processing can be enabled or disabled.

For example, the user can enable or disable all processing involving functionality provided by the message repository for any of: ADs, OGMs, OCMs, and COMs for inbound and/or outbound distributions in context of particular applications (advertising, phone, email, address book, calendar, profile, emergency, rfid, statistics, appliance, etc). This provides a user with the ability to enable or disable all of a category of message repository functionality as desired outside of activating/deactivating specific MADR fields 9850j. Current setting(s) are accessed at block 10012 and preferably presented to the user. The user may change (e.g. toggle) the setting within context of the particular application of FIG. 19 processing, or leave the current settings as they are.

Block 10012 provides the user with ability to enable/disable all MADR processing or any subset of AD and advertise application MADR processing. Processing continues to block 10036 where block 9928 processing terminates. If block 10004 determines the user did not select to manage the advertising application, processing continues to block 10014.

If block 10014 determines the application to be managed is the phone application, block 10016 performs phone application configuration, for example data which may be found in section 8002f as described in the parent application. For example, a user interfaces at block 10016 to set how the phone application will behave. Block 10016 preferably accesses the most recent settings, and the user confirms or changes as desired. Thereafter, block 10018 enables the user to specify how to request a desired OCM, and additionally saves any changes before continuing to block 10020. The user can specify which user action (e.g. hot-key, touch screen action, etc) will request a default OCM, which user action will request the best fit OCM, and which user action will select a specific referenced OCM (preferably using field 9850a). The user action specified may also indicate whether or not to wait for a recording delimiter prior to leaving the message, for any of the requests. For example, in a hot-key user action embodiment, a <ctrl-d> selects the default OCM, a <ctrl-b> selects the best fit OCM, and an <Alt> key pressed while followed by character(s) or number(s) maintained in an embodiment of field 9850a selects the particular OCM. However, when the capital lock key is on, this indicates to wait for a delimiter prior to automatically leaving the message. Unique touch motions may also be used. There are many different user actions which can be configured depending on the MS user interface. Waiting for a delimiter may be implemented regardless (e.g. no specific user action required), or may not be implemented at all (e.g. user waits for OGM). Depending on embodiments, block 10018 enables the user to select desirable user interface actions for making an OCM request. Block 10020 interfaces with the user for managing Boolean variables for enable/disable of all MADR processing (e.g. MADR_srch), enable/disable OGM MADR processing, enable/disable OCM MADR processing, or enable/disable certain subsets of phone application MADR processing (e.g. MADR_COM-L-phone). Thereafter, block 9928 processing terminates at block 10036. If block 10014 determines the user did not select to manage the phone application, processing continues to block 10022.

If block 10022 determines the application to be managed is the email application, block 10024 performs configuration of the email application, for example data which may be found in section 8002c as described in the parent application. For example, a user interfaces at block 10024 to set how the email application will behave. Block 10024 preferably accesses the most recent settings, and the user confirms or changes as desired. Thereafter, block 10026 interfaces with the user for managing Boolean variables for enable/disable of all MADR processing (e.g. MADR_srch), enable/disable all email application MADR processing or enable/disable certain subsets of email application MADR processing (e.g. MADR_COM-R-email). Thereafter, block 9928 processing terminates at block 10036. If block 10022 determines the user did not select to manage the email application, processing continues to block 10028.

If block 10028 determines the application to be managed is the calendar application, block 10030 performs configuration of the calendar application, for example data which may be found in section 8002d as described in the parent application. For example, a user interfaces at block 10030 to set how the calendar application will behave. Block 10030 preferably accesses the most recent settings, and the user confirms or changes as desired. Thereafter, block 10032 interfaces with the user for managing Boolean variables for enable/disable of all MADR processing (e.g. MADR_srch), enable/disable all calendar application MADR processing or enable/disable certain subsets of calendar application MADR processing. Thereafter, block 9928 processing terminates at block 10036. If block 10028 determines the user did not select to manage the calendar application, processing continues to block 10034.

Block 10034 interfaces with the user to manage an other application analogously to applications above (e.g. email, calendar). Thereafter, processing continues to block 10036 where block 9928 processing terminates. Block 10034 handles other applications, such as those shown in FIG. 14, including COM configurations for analogous processing. COM-L-app MADRs (via field 9850d) are utilized on inbound and outbound distributions at the local MS, and COM-R-app MADRs (via field 9850d) are utilized on outbound distributions for being processed at the remote (receiving) MS, for example as specified by the sending user (i.e. for all applications "app"=SMS/texting, advertise, profile, ab, emergency, rfid, statistics, appliance, etc).

Figure 20:
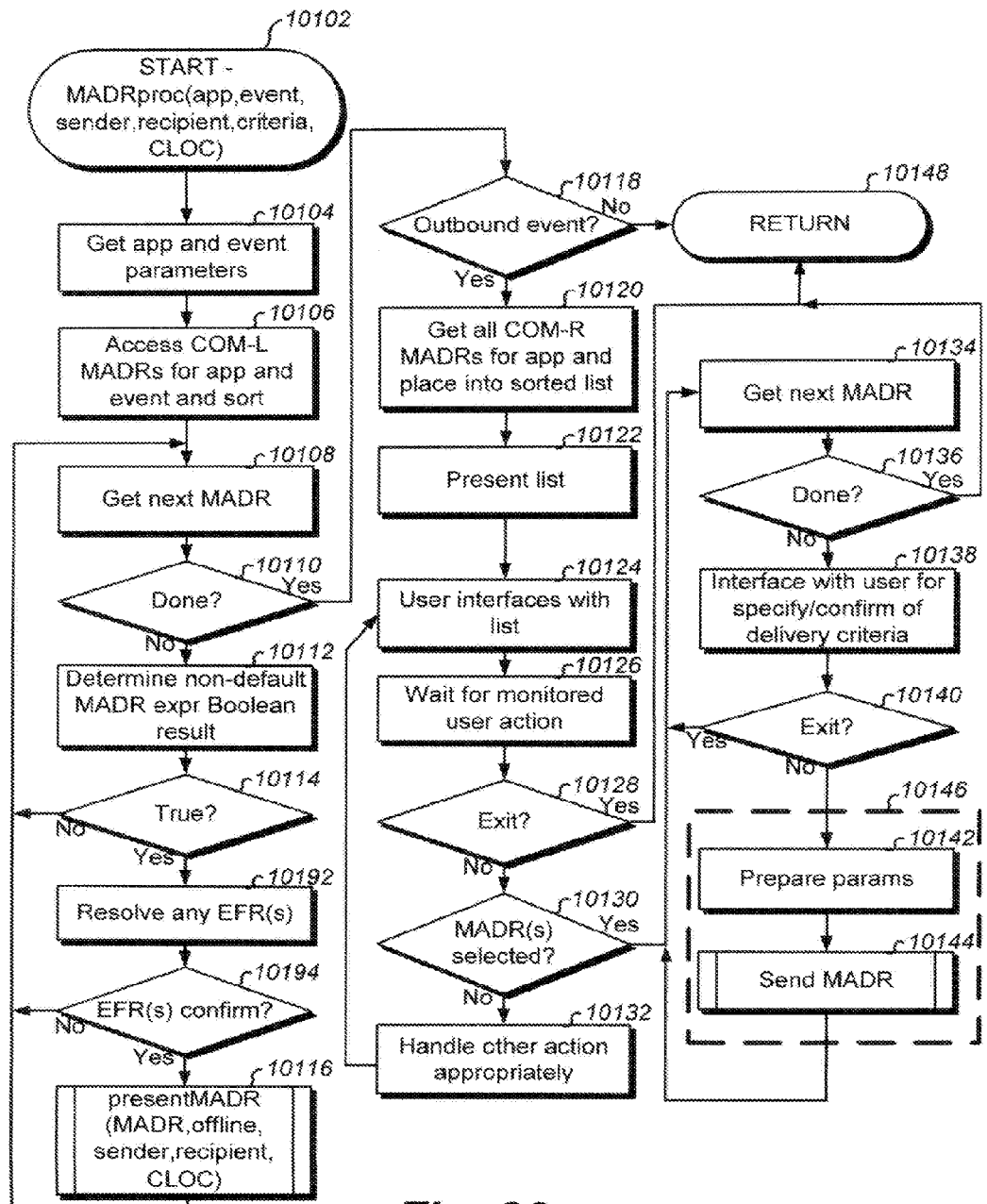
FIG. 20 depicts a flowchart for a preferred embodiment of a procedure for preferred MADR processing of a particular event for a particular application.

FIG. 20 depicts a flowchart for a preferred embodiment of a procedure for preferred MADR processing of an event for generic applications described by rows 9894 for a particular application, such as email, calendar, advertise, phone, profile, ab, emergency, rfid, statistics, appliance, etc. Special application rows 9892 are described below. Processing begins at block 10102 upon an inbound or outbound event (e.g. at a MS) for a particular application, and continues to block 10104 where parameters are determined. Depending on implementation, an inbound event may occur when a distribution is received, when a distribution is acted upon (e.g. seen) by a user, or as is appropriate in designating an inbound event, preferably consistent across MS applications. Depending on implementation, an outbound event may occur when a distribution is sent from the application, when a distribution is transmitted from the MS, or as is appropriate in designating an outbound event, preferably consistent across MS applications. An alternate embodiment maintains separate bits to field 9850d for different varieties of COM types for distinguishing between a plurality of inbound or outbound event types for the same application. While FIG. 20 demonstrates MADR processing of interest to this disclosure, it should be understood that the transport used (e.g. email transport) for the associated distribution may also be used for carrying a MADR object to prevent two separate transmissions, for example in the case of COM-R processing. For example, a MADR object can be attached as a special attachment to an email which is then sent with an email delivery API. There are other embodiments for sending the COM-R MADR to a receiving system.

The app parameter indicates which application is causing FIG. 20 invocation and the event parameter indicates which event occurred that is associated to the application. The invoking application is assumed to take care of the inbound/outbound distribution on its own so that FIG. 20 is for MADR processing. Other embodiments will support handling of the distribution (e.g. to send it) and the MADR in the same invoked interface and/or transmission. The sender parameter is the sender of the application event (e.g. phone call caller, text message sender, etc) and the recipient parameter is the recipient of the application event (e.g. callee, text message recipient, etc). In a preferred embodiment, criteria is a pointer to a text stream (email body, calendar item body, text message, text stream derived from an active call, etc) which can be compared to a field 9855c (e.g. keywords compare data) for when the application event is to be associated with matching EFR(s) to distribution information associated to the event. However, criteria can be any form which may be matched to EFR information. The CLOC parameter is CLOC information received with a distribution. Parameters may take on a variety of embodiments for passing the same information. The parameters sender, recipient, criteria and CLOC may or may not be null when FIG. 20 is invoked. In one embodiment, MADRs 9850 include additional fields for sender and recipient comparison information which can be used to access specific MADRs at block 10106.

Thereafter, block 10106 accesses all active and un-expired MADRs with use field 9850*d* for the particular application and event. For example, each COM-L variety includes: COM-L-email, COM-L-calendar, COM-L-phone, COM-L-advertise, COM-L-profile, COM-L-ab, COM-L-emergency, COM-L-rfid, COM-L-statistics, COM-L-appliance, etc; and an event can be either inbound or outbound. Block 10106 preferably sorts the MADRs for ordered processing based on a select set of field settings in the MADRs. Block 10106 also uses Boolean variables set in FIG. 19 to determine if any MADRs should be searched at all. Processing continues to block 10108. In one embodiment, block 10106 first accesses all expired MADRs (checking data in field 9850*f*) and expires them (i.e. preferably inactivates, or discards).

Block 10108 gets the next MADR for processing and block 10110 checks to see if all MADRs from block 10108 have been processed, in which case processing continues to block 10118, otherwise processing continues to block 10112. One MADR is preferably found if any are found (e.g. a default), but none may be found. When a MADR is marked a default with default field 9850*e*, expression field 9850*g* (probably null for this case) is assumed to be True (i.e. no field 9850*g* check necessary) and processing will proceed to block 10192 via block 10114. Otherwise, block 10112 determines the Boolean result for expression field 9850*g* preferably in real-time by evaluating conditions of the expression using stack processing and access to applicable terms. Thereafter, if block 10114 determines expression field 9850*g* evaluated to True, then block 10192 accesses any joined EFRs to the MADR in process. Block 10192 determines: a) no EFRs are joined; b) one or more EFR(s) joined do not match criteria and/or CLOC information passed as parameters; or c) all EFR(s) joined match the criteria and CLOC information passed as parameters. Block 10192 compares location type EFRs to the CLOC parameter if not null, compares the keyword(s) type EFRs to the criteria parameter, and compares the scheduling information type EFRs to the criteria parameter, if not null. The criteria parameter may include a type field for facilitating a match so multiple EFR types can be joined, or type field 9855*b* is used for interpretation of both fields 9855*c* and the criteria parameter for a single joined type. Many types of criteria may be supported in EFRs. Location type EFRs clarify event handling for a certain location match. Keyword(s) types EFRs clarify event handling for certain associated keywords, for example as contained in the application distribution (e.g. email, text message, etc). Date/time type EFRs are typically not used since expression field 9850*g* is used for qualifying this information anyway. Thereafter, if block 10194 determines the MADR does indeed match the requirements of the application which invoked FIG. 20 processing, then block 10116 invokes a presentMADR procedure of FIG. 25A with parameters passed for: the MADR object (e.g. or pointer thereof), a constant of "offline", sender, recipient and CLOC information if available, and processing continues back to block 10108. If block 10194 determines one or more EFRs do not match parameters, then processing continues back to block 10108. If block 10114 determines the expression evaluated to False, then processing leaves block 10114 for block 10108. When zero or more COM-L MADRs are processed, block 10018 checks to see if the application event is an outbound event. If the event is an outbound distribution, processing continues to block 10020, otherwise processing continues to block 10148 where the application context invoker is returned to. Block 10120 accesses active COM-R MADRs for the particular application (e.g. COM-R-email) and places them into a recognizable list a user can act upon, block 10122 presents the list to the user of the MS of FIG. 20 processing, block 10124 interfaces with the user for list selections, and block 10126 waits for particular user actions. Block 10120 preferably sorts the MADRs based on a select set of field settings in the MADRs. Block 10120 also uses Boolean variables set in FIG. 19 to determine if any MADRs should be searched at all. One MADR is preferably found if any are found, but none may be found. The user may examine any MADR data prior to making a selection at block 10124, for example by actions processed at block 10132. If no MADRs are found, the list is an empty list where the user can interface at block 10124 for exiting via block 10128. When an action is detected, block 10126 continues to block 10128. If block 10128 determines the user selected to exit processing, then the application context event detecting invoker of FIG. 20 is returned to at block 10148, otherwise processing continues to block 10130. If block 10130 determines the user selected one or more MADR(s) (e.g. COM-R), then processing continues to block 10134, otherwise any other action at block 10124 is appropriately handled at block 10132 and processing continues back to block 10124.

Block 10134 starts an iterative processing loop by getting each selected MADR and continuing to block 10136. If block 10136 determines all selected COM-R MADRs have not yet been processed, processing continues to block 10138, otherwise processing continues to block 10148 for returning to the invoker of FIG. 20. Block 10138 interfaces with the user to specify and/or confirm delivery criteria (field 9850*h*) for where to send/present the message field 9850*c* information (e.g. remote MS). When accessed at block 10120, COM-R MADR fields 9850*h* may be set to null, populated with a useful default or starter data, or may already contain complete information. The user can confirm or specify different delivery criteria at block 10138. In some embodiments, the user can alter any MADR fields prior to sending, preferably as governed by permissions. If the user decided to exit out of MADR processing at block 10138 as detected at block 10140, then processing continues back to block 10134, otherwise the MADR is delivered to the remote MS(s) by preparing send parameters at block 10142 and invoking send processing of FIG. 13A at block 10144 before continuing back to block 10134. Depending on settings in the application distribution for outbound processing, FIG. 13A may need to be invoked for a plurality of recipient MSs, therefore an iterative loop 10146 is appropriately incorporated around blocks 10142 and 10144 for handling multiple recipients, and for handling attempts for a prioritized retry. An alternate embodiment may handle multiple recipients in send processing invoked at block 10144 depending on a transport interface used. Parameters are prepared at block 10142 so a MADR is delivered in its entirety for processing at the receiving MS(s). Other transport mechanisms may be utilized. FIG. 20 focuses on MADR processing. Various embodiments may not assume the inbound or outbound application distribution associated with COM processing is processed appropriately outside of FIG. 20 processing. Preferably, a CLOC parameter is passed whenever possible, including via block 10144 (e.g. block 10142 accesses MS whereabouts for setting the CLOC data).

Another embodiment may not interface with the user at block 10138 and instead use delivery field 9850h to deliver the MADR for processing at the specified receiving MS(s). In this embodiment, the receiving MSs are assumed to be the targets for presentation/message information of the MADR sent.

Figure 13A:
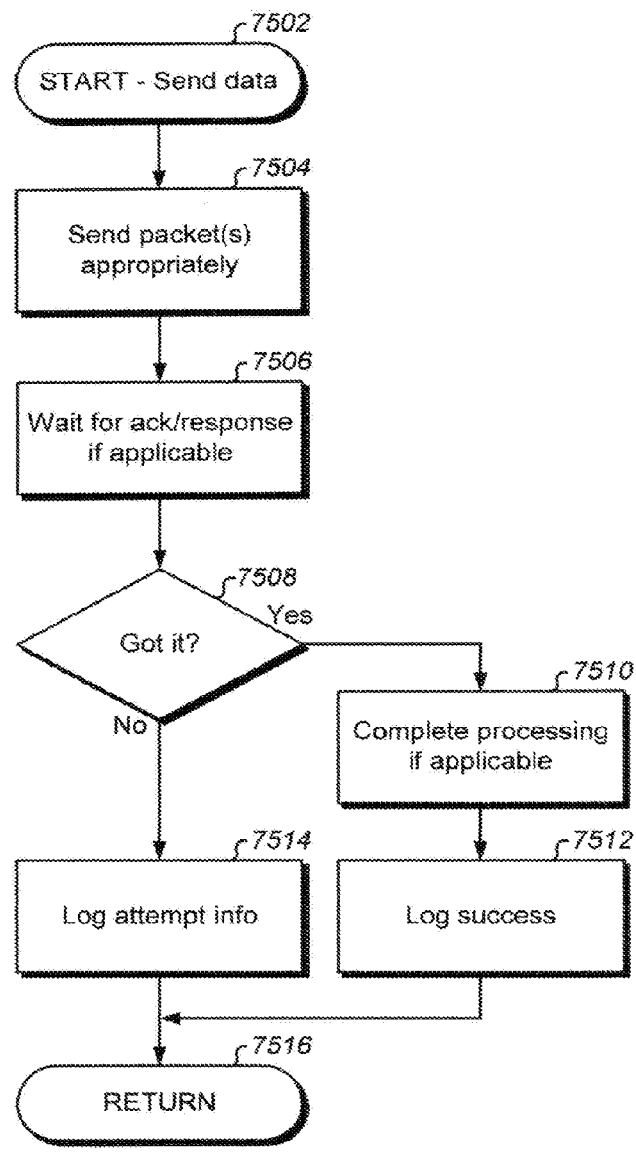
FIG. 13A depicts a flowchart for describing a preferred embodiment of a procedure for sending data to a remote MS.

With reference now to FIG. 13A, depicted is a flowchart for describing a preferred embodiment of a procedure for sending data to a remote MS, for example to perform a remote action of presenting the MADR information to a user. Parent applications contain discussions relevant to MADR processing. The purpose is for the MS of FIG. 13A processing (e.g. a first, or sending, MS) to transmit MADR data to other MSs (e.g. at least a second, or receiving, MS) for remote processing of the MADR information. The receiving MS may receive MADR data wirelessly by being within wireless range of the sending MS (i.e. no intervening data processing systems), or may receive over a peer to peer connection by way of data processing system(s) facilitating longer range data flow. Processing begins at block 7502, continues to block 7504 where the caller parameter(s) passed to FIG. 13A processing are used for sending at least one data packet containing properly formatted data for sending, and for being properly received and interpreted. Block 7504 may reformat parameters into a suitable data packet(s) format so the receiving MS can process appropriately (see FIG. 13B). Depending on the embodiment, any reasonable supported identity is a valid target (e.g. and may be derived from the delivery criteria). Thereafter, block 7506 waits for an acknowledgement from the receiving MS if the communication embodiment in use utilizes that methodology. In one embodiment, the o send data packet is an unreliable datagram(s) that will most likely be received by the target MS. In another embodiment, the send data packet(s) is reliably transported data which requires a final acknowledgement that it was received in good order. In any case, block 7506 continues to block 7508.

Block 7504 formats the data for sending in accordance with the specified delivery method, along with necessary packet information (e.g. source identity, wrapper data, CLOC, etc), and sends data appropriately. The targeted MS should recognize that the data is meant for it and receives it. Block 7506 waits for a synchronous acknowledgement if applicable to the send of block 7504 until either receiving one or timing out. Block 7506 will not wait if no ack/response is anticipated, in which case block 7506 sets status for block 7508 to "got it". Thereafter, if block 7508 determines an applicable ack/response was received (i.e. data successfully sent/received), or none was anticipated (i.e. assume got it), then processing continues to block 7510 for potentially processing a response. Block 7510 will process the response if it was anticipated for being received as determined by data sent at block 7504. Thereafter, block 7512 performs logging for success. If block 7508 determines an anticipated ack was not received, then block 7514 logs the attempt. An alternate embodiment to block 7514 will log an error and may require a user action to continue processing so a user is confirmed to have seen the error. Both blocks 7512 and 7514 continue to block 7516 where the invoker is returned to for continued processing (e.g. back to block 10144).

Figure 13B:
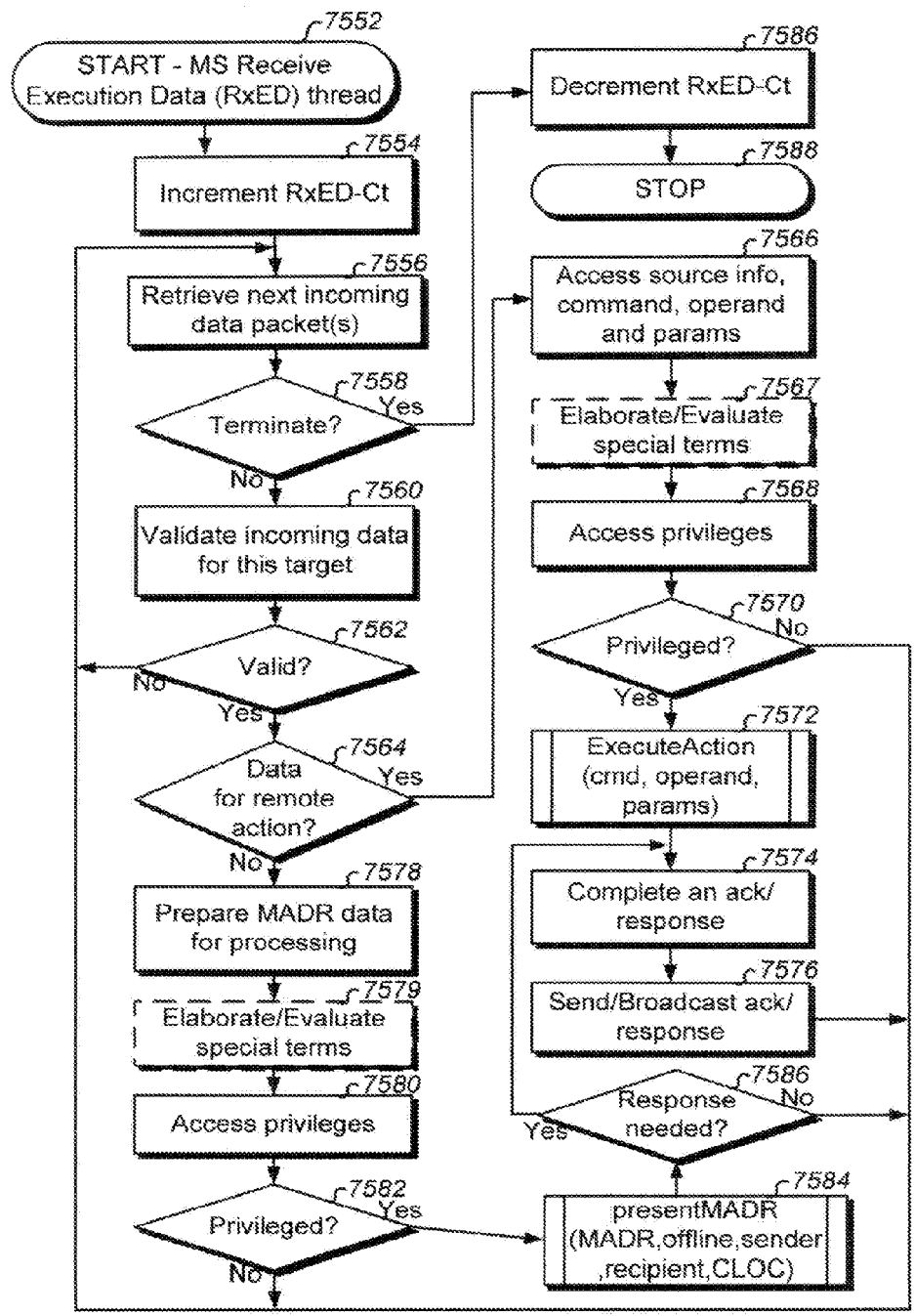
FIG. 13B depicts a flowchart for describing a preferred embodiment of processing for receiving execution data from another MS.

With reference now to FIG. 13B, depicted is a flowchart for describing a preferred embodiment of processing for receiving execution data from another MS, for example a MADR object. FIG. 13B processing describes a Receive Execution Data (RxED) process worker thread. There may be many worker threads for the RxED process. Parent applications contain discussions relevant to MADR data processing.

A RxED thread processing begins at block 7552, continues to block 7554 where a process worker thread count RxED-Ct is accessed and incremented by 1 (using appropriate semaphore access (e.g. RxED-Sem)), and continues to block 7556 for retrieving from a receive queue the sent data, perhaps a special termination request entry, and only continues to block 7558 when the MADR data, or record of data (e.g. action for remote execution, particular atomic command, or termination record) is retrieved. Block 7556 stays blocked on retrieving from a receive queue until data is retrieved, in which case processing continues to block 7558. If block 7558 determines a special entry indicating to terminate was not found in the receive queue, processing continues to block 7560. Block 7560 validates incoming data for this targeted MS before continuing to block 7562. A preferred embodiment of receive processing already validated the data is intended for this MS by having listened specifically for the data, or by having already validated it is at the intended MS destination (e.g. block 7558 can continue directly to block 7564 (no block 7560 and block 7562 required)). If block 7562 determines the data is valid for processing, then block 7564 checks the data for its purpose (remote action, particular command, or MADR processing). If block 7564 determines the data received is for processing a remote action, then processing continues to block 7566 as described in the parent applications. If block 7564 determines that the execution data is for processing MADR data, then processing continues to block 7578 where the MADR is prepared for subsequent processing. Block 7578 accesses MADR fields and block 7579 evaluates expression field 9850g in context of the receiving MS. Privileges should be accessed at block 7579 for special terms which require permission. If expression field 9850g evaluates to True, then the MADR data is so far assumed to be privileged for further processing. If the expression evaluates to False, or is not able to be evaluated because of an undefined or unprivileged term, then the MADR data is assumed to NOT be privileged for further processing, and block 7580 need not pursue access further to privilege data. Thereafter, block 7580 accesses privileges (i.e. if Expression evaluated to True) for eligible MADR processing to ensure the source has proper privileges for processing the MADR data at the MS of FIG. 13B processing. Block 7580 recognizes the MADR for not being privileged if expression field 9850g did not evaluate to True at block 7579. Expression field 9850g set to null implies a True evaluation result.

Figure 25A:
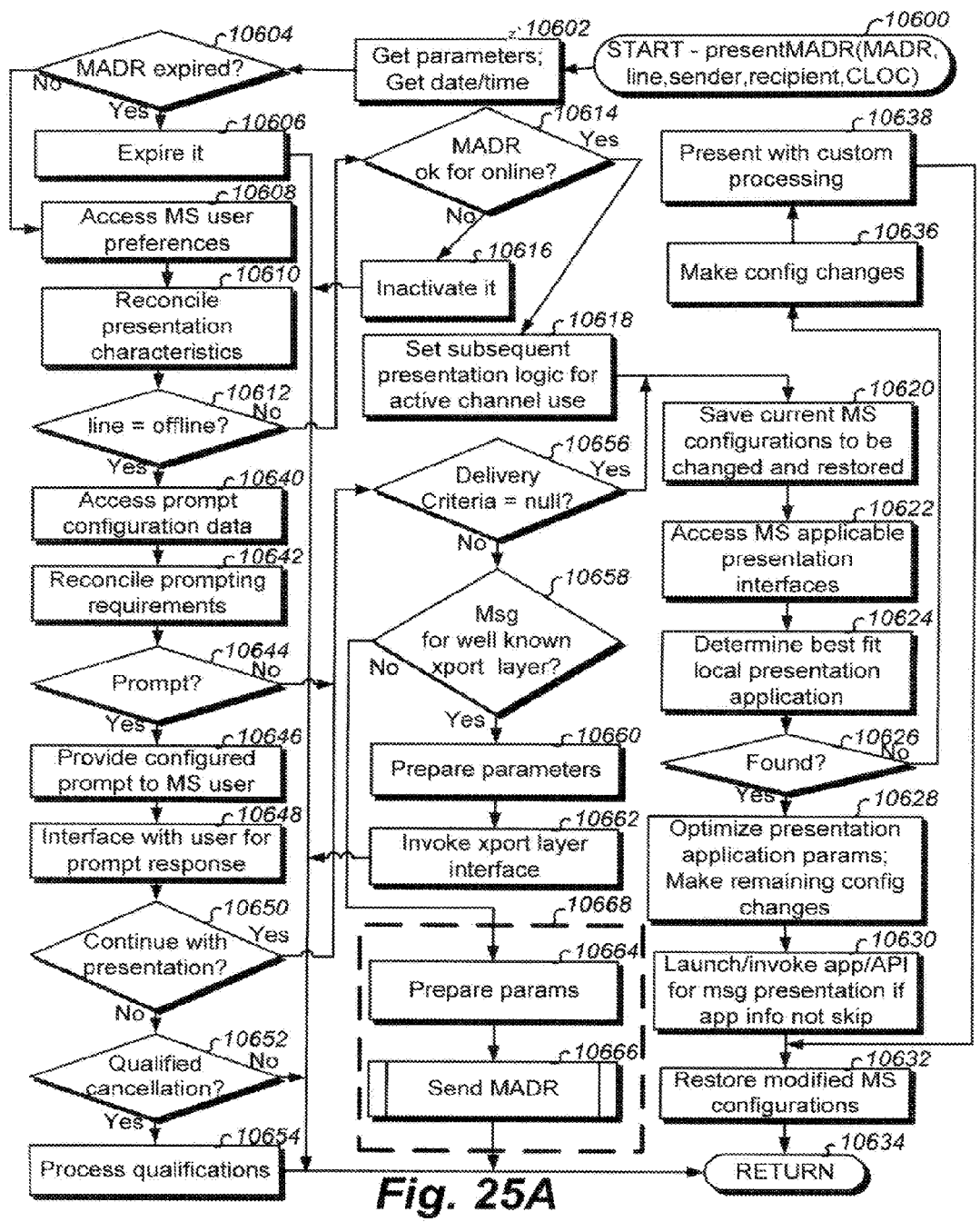
FIGS. 25A and 25B depict a flowchart for describing a preferred embodiment of a procedure for presenting MADR information.

Thereafter, if block 7582 determines the MADR data for execution is acceptable (and privileged), then block 7584 invokes the presentMADR procedure of FIG. 25A at the MS of FIG. 13B processing with parameters passed for: the MADR (e.g. a pointer thereof), a constant of "offline", and optionally (may be null) sender, receiver and CLOC information which may useful for presentation. Thereafter, block 7586 checks if a response is needed. If block 7586 determines a response is to be sent back to the originating MS, block 7574 completes a response to the originating MS of the data received at block 7556, and block 7576 sends/broadcasts the response before continuing back to block 7556 for the next incoming execution request data. If block 7586 determines a response is not to be sent back to the originating MS, then processing continues directly back to block 7556. If block 7582 determines the MADR for processing is not acceptable/privileged, then processing continues back to block 7556.

Referring back to block 7562, if it is determined that the data is not valid for the MS of FIG. 13B processing, processing continues back to block 7556. Referring back to block 7558, if a worker thread termination request was found at the receive queue, then block 7586 decrements the RxED worker thread count by 1 (using appropriate semaphore access (e.g. RxED-Sem)), and RxED thread processing terminates at block 7588. Block 7586 may also check the RxED-Ct value, and signal the RxED process parent thread that all worker threads are terminated when RxED-Ct equals zero (0).

For other acceptable receive processing, methods are well known to those skilled in the art for "hooking" customized processing into application processing of sought data received (e.g. mail application, callback function API, etc). Thus, there are well known methods for processing data for receiving MADRs for processing from an originating MS, for example when using email. Similarly, as described above, SMS/text messages can be used to communicate data, albeit at smaller data exchange sizes. The sending MS may break up larger portions of data which can be sent as parse-able text to the receiving MS. It may take multiple SMS/text messages to communicate the data in its entirety. Various embodiments will send MADR(s) along with an associated distribution.

Regardless of the type of receiving application, those skilled in the art recognize many clever methods for receiving data in context of a MS application which communicates in a peer to peer fashion with another MS. FIGS. 13A and 13B are an embodiment of MS to MS communications, referred to with the acronym MS2MS. Various MS2MS communication embodiments may include: reliable transport protocol involving a one or more packets (sends and acknowledgements) between systems for a single send; unreliable transport protocol involving one or more packets (sends and acknowledgements) between systems for a single send; or on-going communications processing which is subsequent to an initiation send of data between systems (e.g. peer to peer application processing. In some embodiments, the LBX service propagation architecture is leveraged for hopping data to the targeted peer MS wherein distance between an originating MS and a targeted MS is increased by intermediary MS(s) "middle-manning" the transmission.

COM-R event processing provides a user with useful confirmation of delivery status by sending a MADR object to a target remote system with an expression for checking presence of a previously sent distribution. If the previously sent distribution has been delivered, acted upon, or used as indicated by applicable AppTerm variables, the sending user can be delivered a message in any of the variety of presentation types for the confirmation of delivery status. Similarly, a confirmation of delivery status for a previously sent distribution not having been seen for a period of time, as indicated by applicable AppTerm variables, can be provided to the sending user in any of the variety of presentation types for the confirmation of delivery status. In some embodiments, processing of blocks 10120 through 10146 can be invoked at any time by a user, preferably with convenient user parameters for which MADRs to present in the list (e.g. by application and/or use and/or any selections of MADR field(s) values). All COM-R event processing can be accomplished with AD type MADR objects which are shared to target systems and triggered according to a plethora of configurable event options. COM-R processing is provided for convenience within context of a particular application event.

Figure 21A:
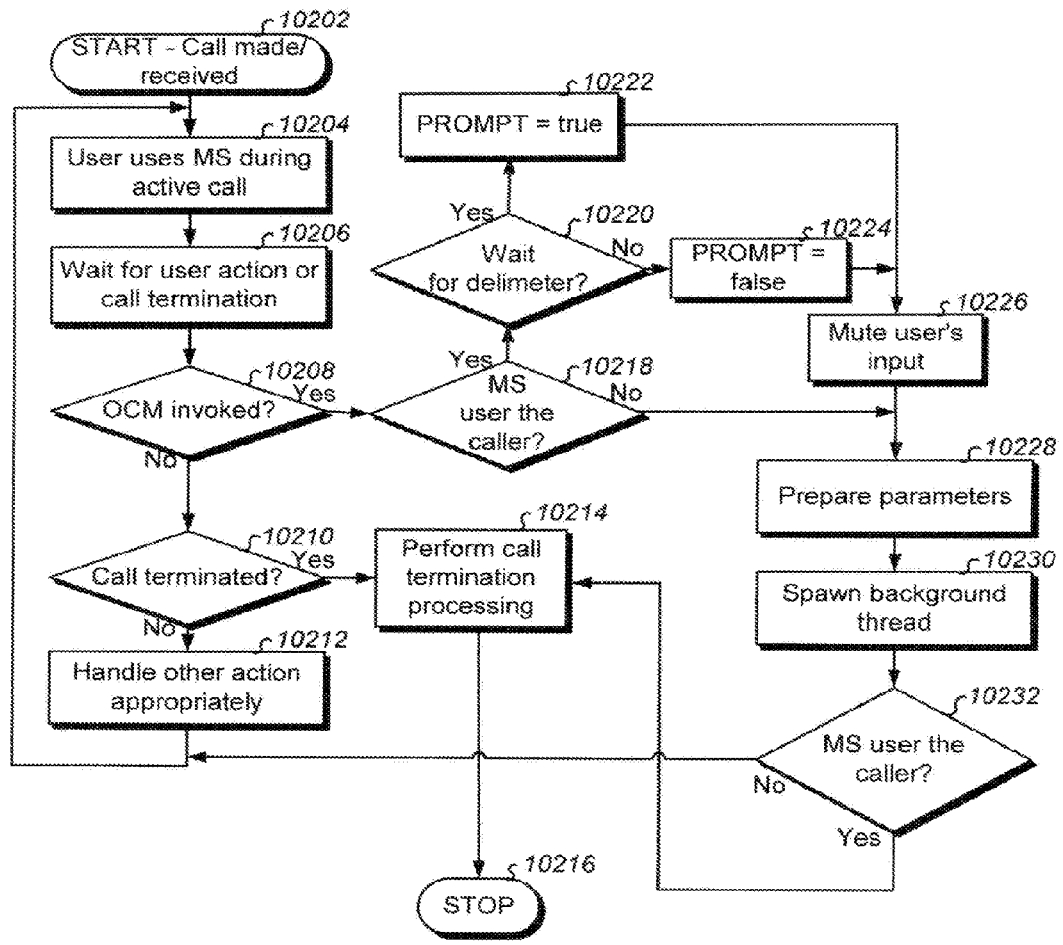
FIG. 21A depicts a flowchart for describing a preferred embodiment of OCM processing.

FIG. 21A depicts a flowchart for describing a preferred embodiment of OCM processing. Processing begins at block 10202 where a call is made from, or received to, the MS of FIG. 21A processing, and continues to block 10204 where the user interfaces to the connected call. Thereafter, when focusing on this disclosure, block 10206 monitors and waits for OCM actions invoked by a user to the MS user interface during the active call. Block 10206 also waits for call termination. When a monitored OCM action is detected or the call is terminated, block 10208 checks if an OCM action was invoked. If block 10208 determines an OCM was not invoked, processing continues to block 10210. If block 10210 determines the call was not terminated, block 10212 handles other user actions which may have caused leaving block 10206 and processing continues back to block 10204, otherwise usual call termination (e.g. active line closed) is performed at block 10214 and FIG. 21A processing terminates at block 10216.

If block 10208 determines an OCM action was invoked during the active call by a user of the MS of FIG. 21A processing, block 10218 checks origination of the call. If block 10218 determines the user of the MS of FIG. 21A processing made the active call, processing continues to block 10220. If block 10220 determines a OGM delimiter (e.g. beep, period of silence, combination thereof, etc) should be waited for prior to automatically leaving a message, block 10222 sets a PROMPT variable to True and processing continues to block 10226, otherwise block 10224 sets the PROMPT variable to False and processing continues to block 10226. There are different embodiments for indication whether or not to wait for an OGM delimiter such as: user action indicated to wait, or not wait (user waits for OGM and prompt); MS assumes delimiter should be waited for; MS assumes a delimiter should not be waited for; MS determines at block 10204 whether or not the MS user already waited for a delimiter; or block 10220 uses a prior experience with the callee together with block 10204 processing for whether or not there is a delimiter to wait for. Block 10226 mutes the user's input (e.g. mutes audio to the MS microphone) and processing continues to block 10228. Referring back to block 10218, if it is determined that the user of the MS of FIG. 21A processing received the call, then processing continues to block 10228 (e.g. to play MADR(s) during the active call for the benefit of the caller and/or callee without call termination).

Figure 21B:
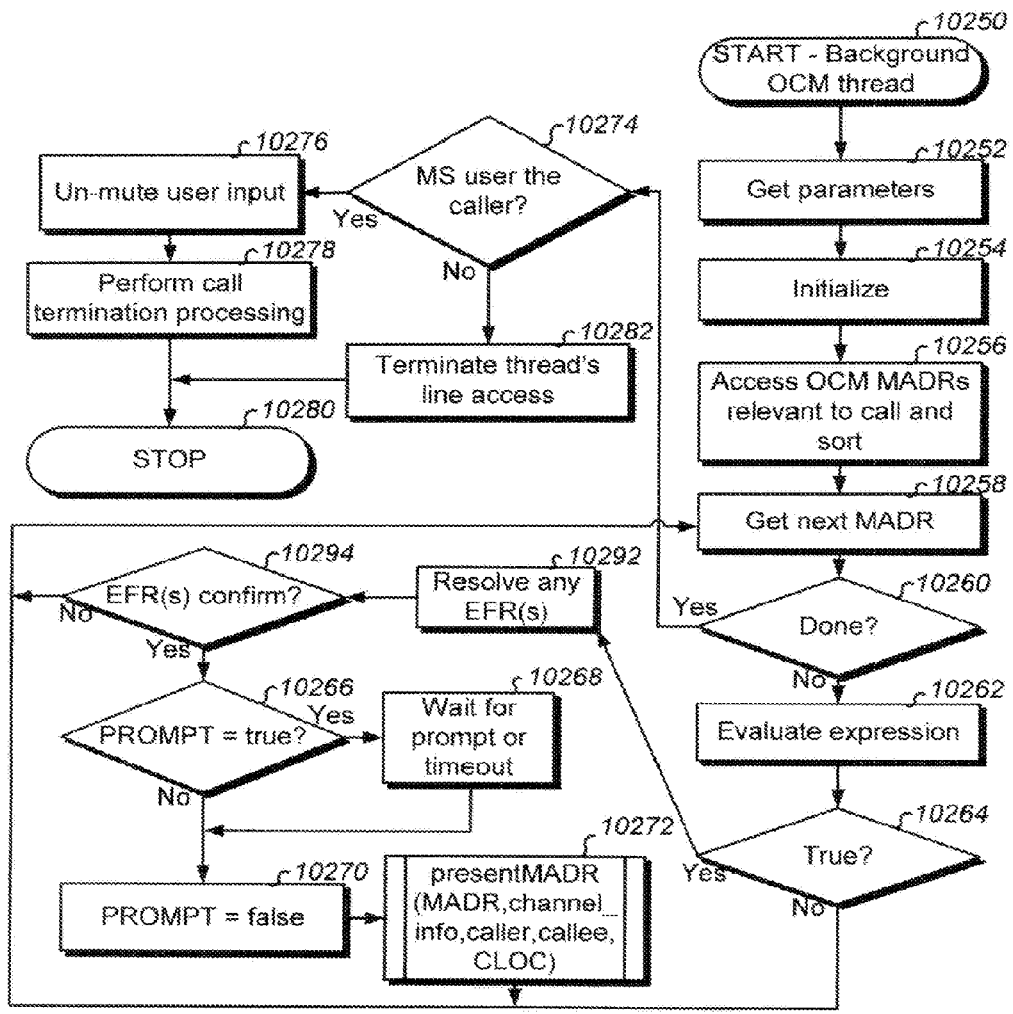
FIG. 21B depicts a flowchart for describing a preferred embodiment of OCM background thread processing.

Block 10228 prepares needed parameters for spawning FIG. 21B thread processing concurrently in the background while FIG. 21A processing continues. Thereafter, block 10230 spawns the background thread with parameters and block 10232 determines what to do with the active call. If block 10232 determines the MS user of FIG. 21A processing is the originator of the call (i.e. caller), processing continues to block 10214 for closing/terminating FIG. 21A processing (e.g. including access to the active call line which remains active for the background thread) and FIG. 21A processing terminates at block 10216. When arrived to by block 10232, block 10214 closes access to the active call channel, but does not terminate the active call. The MS user is now free to use any MS application while the FIG. 21B thread is running in the background. If block 10232 determines the user of the MS of FIG. 21A processing is not the caller, processing continues back to block 10204 where the active call continues, for example to have the caller and callee observe the presentation of MADR information by the background thread.

FIG. 21A is invoked in context of a specific active call including in a MS which supports a plurality of simultaneous active calls. FIG. 21A may be processed for each active call, and interfaces with the user for that particular active call.

FIG. 21B depicts a flowchart for describing a preferred embodiment of OCM background thread processing as invoked by block 10230. Thread processing begins at block 10250, continues to block 10252 where parameters passed are determined (e.g. user action, PROMPT variable, caller and callee information, active call line resource (channel) handle, etc), block 10254 for initialization processing (e.g. open access to active call line resource), and to block 10256. Block 10256 will use a parameter passed for what user action was invoked (best fit MADR, default MADR, specific MADR) and will get the distinct MADR if requested, otherwise block 10256 accesses MADRs that may be relevant to the active call (e.g. with a use field 9850*d* containing OCM) and preferably sorts the MADRs found based on any of the field settings in the MADRs. Block 10256 may also use caller and/or callee information for determining relevant MADRs, for example in a MADR embodiment which includes caller/callee fields for search. One MADR is preferably found if any are found, but none may be found. Block 10256 also uses Boolean variables set in FIG. 19 to determine if any MADRs should be searched at all. Processing continues to block 10258. Block 10258 gets the next MADR for processing and block 10260 checks to see if all MADRs found have been processed. If all MADRs are not yet processed, processing continues to block 10262. Block 10262 does nothing if the user selected a distinct MADR for processing, otherwise block 10262 determines the Boolean result for expression field 9850*g* preferably in real-time by evaluating the expression using stack processing and access to applicable terms. Thereafter, if block 10264 determines expression field 9850*g* evaluated to true or a default was found, then processing continues to block 10292, otherwise, processing continues back to block 10258. Block 10292 accesses any joined EFRs to the MADR in process. Block 10292 determines: a) no EFRs are joined; b) one or more EFR(s) joined do not match criteria and/or CLOC information for the active call; or c) all EFR(s) joined match the criteria and CLOC information for the active call. Block 10292 compares location type EFRs to the CLOC parameter if needed, and compares the keyword(s) type EFRs to call criteria if needed. Location type EFRs clarify event handling for a certain location match. Keyword(s) types EFRs clarify event handling for certain associated keywords, for example as detected in a text stream produced after converting voice to text of the active call (e.g. caller uses voice command information to clarify MADR selection). Thereafter, if block 10294 determines the MADR does indeed match the requirements of OCM processing, then block 10266 checks the PROMPT variable to see if an OGM delimiter (e.g. beep, period of silence, combination thereof, etc) should be waited for. If block 10266 determines an OGM prompt should be detected, then block 10268 waits for a prompt indication or times out after a reasonable wait period, and processing continues to block 10270. Block 10270 resets the PROMPT variable to False in case there are a plurality of MADRs for processing. Thereafter, block 10272 invokes the presentMADR procedure with parameters for the MADR in process (or pointer thereof), the active call line resource (e.g. channel) information, and optionally sender (caller), recipient (callee) and CLOC information, and processing continues back to block 10258. If block 10266 determines a prompt should not be waited for, then processing continues directly to block 10270. If block 10294 determines one or more EFRs do not match parameters, then processing continues back to block 10258.

Referring back to block 10260, if it is determined the last MADR was processed (or no MADRs found), then processing continues to block 10274. If block 10274 determines the caller is the user of the MS of FIG. 21B processing, block 10276 un-mutes any muting by block 10226, block 10278 performs call termination processing, and the FIG. 21B background thread terminates at block 10280, otherwise block 10274 continues to block 10282 where thread access to the active call line (e.g. opened at block 10254) is terminated and block 10280 terminates processing A video call is analogously processed to audio by FIGS. 21A and 21B. For a video call, block 10226 mutes the user's input (audio and video) to the video call, presentMADR processing will interrupt a video call channel (i.e. not mix it) so that a video MADR can be presented without interference. FIGS. 21A&B enable a MS user to automatically leave an audio and/or video message at a callee's system, thereby freeing the MS user to perform other MS tasks while background processing automatically leaves the message. Further, a MS user does not have to wait for a callee's system OGM in order to leave the message. The background thread waits for the appropriate moment to leave the message.

Figure 22A:
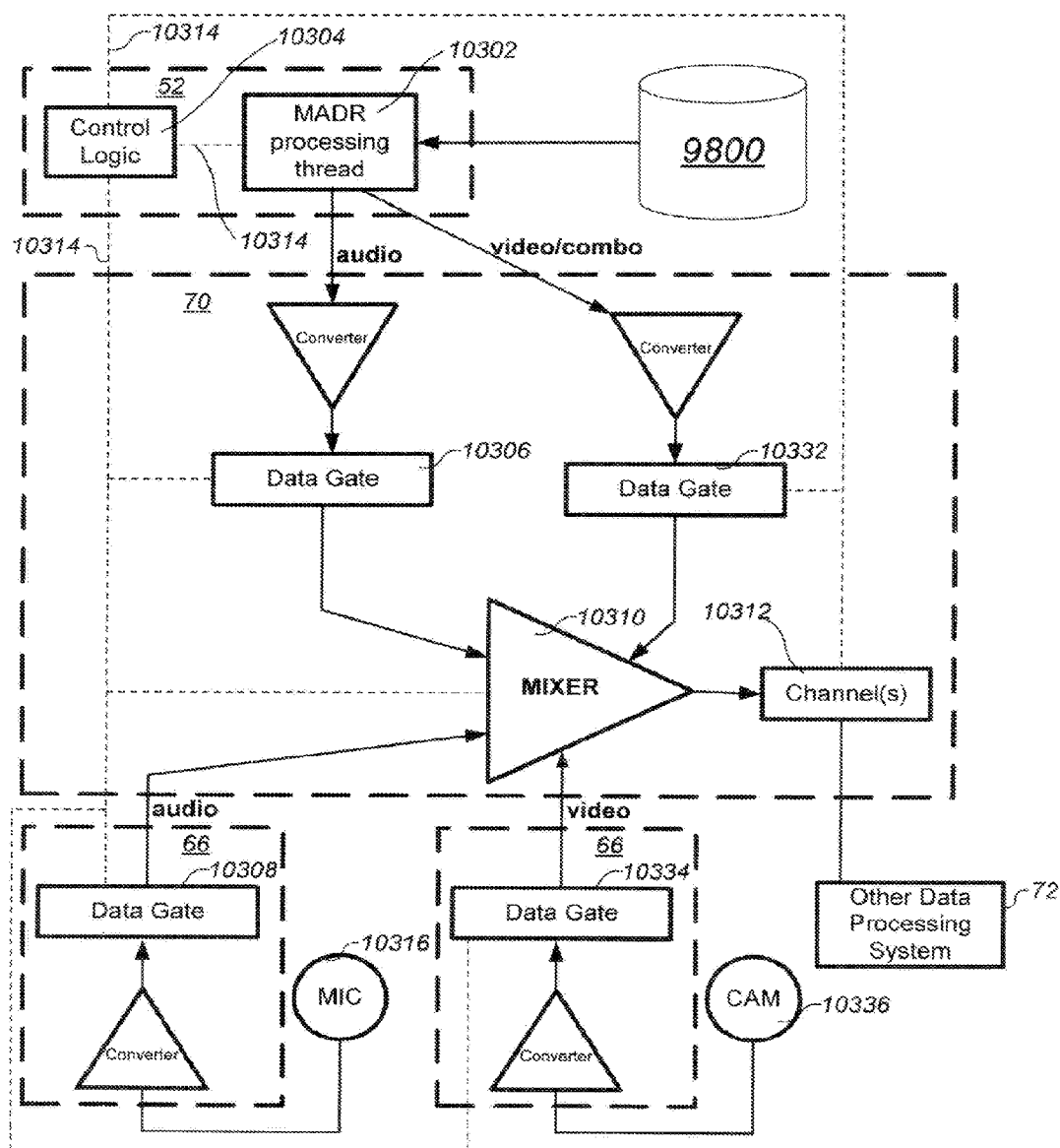
FIG. 22A is a simplified block diagram depicting a preferred embodiment for discussing architecture used to carry out mixing/multiplexing MADR data with an active call in progress.

With reference now to FIG. 22A, a simplified block diagram depicts a preferred embodiment for mixing/multiplexing MADR data (e.g. an audio recording), or interrupting a video call with MADR video data, for an active call in progress. Output is mixed, multiplexed and/or switched at the MS for generating an output interface using one or more channels. Examples of relevant U.S. Pat. No. 6,311,161 ("System and method for merging multiple audio streams", Anderson et al); U.S. Pat. No. 7,039,178 ("System and method for generating a simultaneous mixed audio output through a single output interface", Case et al); U.S. Pat. No. 7,369,071 ("Analog and digital signal mixer", Pollet et al); U.S. Pat. No. 5,647,008 ("Method and apparatus for digital mixing of audio signals in multimedia platforms", Farhangi et al); U.S. Pat. No. 5,729,225 ("Method and apparatus for asynchronous digital mixing", Ledzius); U.S. Pat. No. 5,986,589 ("Multi-stream audio sampling rate conversion circuit and method", Rosefield et al); U.S. Pat. No. 6,154,161 ("Integrated audio mixer", Leme et al); U.S. Pat. No. 7,119,267 ("Portable mixing recorder and method and program for controlling the same", Hirade et al); U.S. Pat. No. 6,438,434 ("Mixing, coding and decoding devices and methods", Kamiya); U.S. Pat. No. 6,744,815 ("Method for synchronizing audio and video streams", Sackstein et al); U.S. Pat. No. 6,330,338 ("Process and device for mixing digital audio signals", Von Ow et al); U.S. Pat. No. 6,373,954 ("Single-chip audio circuitry, method, and systems using the same", Malcolm, Jr. et al); U.S. Pat. No. 5,694,467 ("Integrated sound/telephone headset system", Young, III); U.S. Pat. No. 7,671,886 ("Video-phone terminal apparatus, image-shooting method, and computer product", Sawada); U.S. Pat. No. 7,555,141 ("Video phone", Mori); U.S. Pat. No. 7,408,924 ("Video communication method of internet protocol phone", Du); U.S. Pat. No. 6,704,040 ("Cellular phone set and remote control method used therefore", Sato); U.S. Pat. No. 6,788,322 ("Wireless imaging device and system", Cook); and U.S. Pat. No. 6,192,257 ("Wireless communication terminal having video image capability", Ray); The preferred system and method preferably utilizes processing in context of FIG. 3 discussions, for example to control adjusting volume or gain levels of separate audio data input sources, control flow of data to channel(s) with appropriate data conversions, operate mixing and switching data streams, etc but other embodiments may be used.

A MADR processing thread 10302 accesses a MADR and determines it is for audio play and/or video play. Further determined is that the audio/video is to be presented on an active channel, for example an active phone call (audio or video) in progress. While control logic 10304 owns system resources, coordinates data processing of the MS, and provides the foundation for interoperation of data processing system components, MADR processing thread 10302 is driving disclosed OCM processing. Control logic interfaces to MADR processing thread 10302 (e.g. process/thread execution by the CPU), data gate 10306, data gate 10308, data gate 10332, data gate 10334, mixer 10310 and channel(s) 10312 by way of appropriate control paths 10314, for example bus/ switch 54. MS microphone 10316 also provides an audio source, for example to talk over an active phone call in progress. Audio data from the microphone 10316 source may pass through a converter, for example an analog to digital converter prior to being communicated to data gate 10308. Similarly, the MADR processing thread 10302 may interface to data gate 10306 over a path including a converter, for example a digital format converter for proper bit sampling, decompression, or other format changes. In some embodiments, mixer 10310 includes functionality eliminating the need for a converter. Data gates (e.g. 10306, 10308, 10332, 10334) are controlled for allowing the audio/video information to pass through to the mixer 10310, or prevent the audio/video information from passing through to the mixer 10310. Data gates can be used for "muting" data. Each data gate has its own FIFO queue buffer which can be used for relaying data when controlled to allow data to pass, and its own ability to discard data when controlled to prevent data from passing. Depending on embodiments, data gates may operate on analog or digital data. Mixer 10310 can allow a single audio path to flow for output, or mixes a plurality of audio sources for a mixed and improved single audio signal containing the sources. Mixer 10310 preferably adjusts the relative volume or gain levels when mixing multiple audio data sources. Audio is output to other data processing system 72 by way of at least one channel 10312. In some embodiments, another converter may lie on the data path between mixer 10310 and channel(s) 10312, or a converter may be downstream from the channel(s) 10312 interface prior to transmission to system 72. In some embodiments, converters shown are not necessary, for example when digital data is in use throughout a data path. In some embodiments, converters may be used between a data gate and the mixer 10310. In some embodiments, mixer 10310 contains conversion capability (e.g. remove need for converter(s)). In some embodiments, data gates are located at strategic interfaces in different components than shown. Depending on embodiments, a converter may be a digital-to-analog converter or any of a variety of format converters (e.g. single data channel into a multiplexed data channel, or visa-versa). While two separate audio signal paths have been exemplified, those skilled in the art appreciate the basic design for supporting any number of audio input sources provided mixer 10310 supports appropriately mixing/multiplexing or switching the required plurality of sources. In one useful embodiment, an audio input signal originates from audio associated with an active video session (video call session (e.g. skype)) over channel(s) 10312 so that a MS user can mix an audio recording from repository 9800 with audio associated to the video session. Further, mixer 10310 can support a plurality of video source feeds (e.g. active call and MADR presentation thread) for mixing audio with the video information for a video call. Each video source feed includes data gates 10332 and 10334, and appropriate converters if necessary, which are coordinated by control logic 10304 driven by OCM processing. The MS video input 10336 feeds mixer 10310 by way of a converter. Mixer 10310 preferably supports a switched video stream source for pass-through on channel(s) at any particular time with control of data gates 10332 and 10334 while supporting mixing of audio streams. In an alternate embodiment, mixer 10310 may support a plurality of video sources for mixing in such a way that the recipient can simultaneously view all video source feeds (e.g. independent side by side video transmissions occupying less presentation space). In alternate embodiments, the video stream format may include audio information so that a single path to mixer 10310 is used for both video and audio (e.g. "combo"; inherent in video format, or converted upstream to a video format which also contains the audio information). Video and audio may use separate channels, or may share channels when communicating to other data processing system 72.

Figure 23:
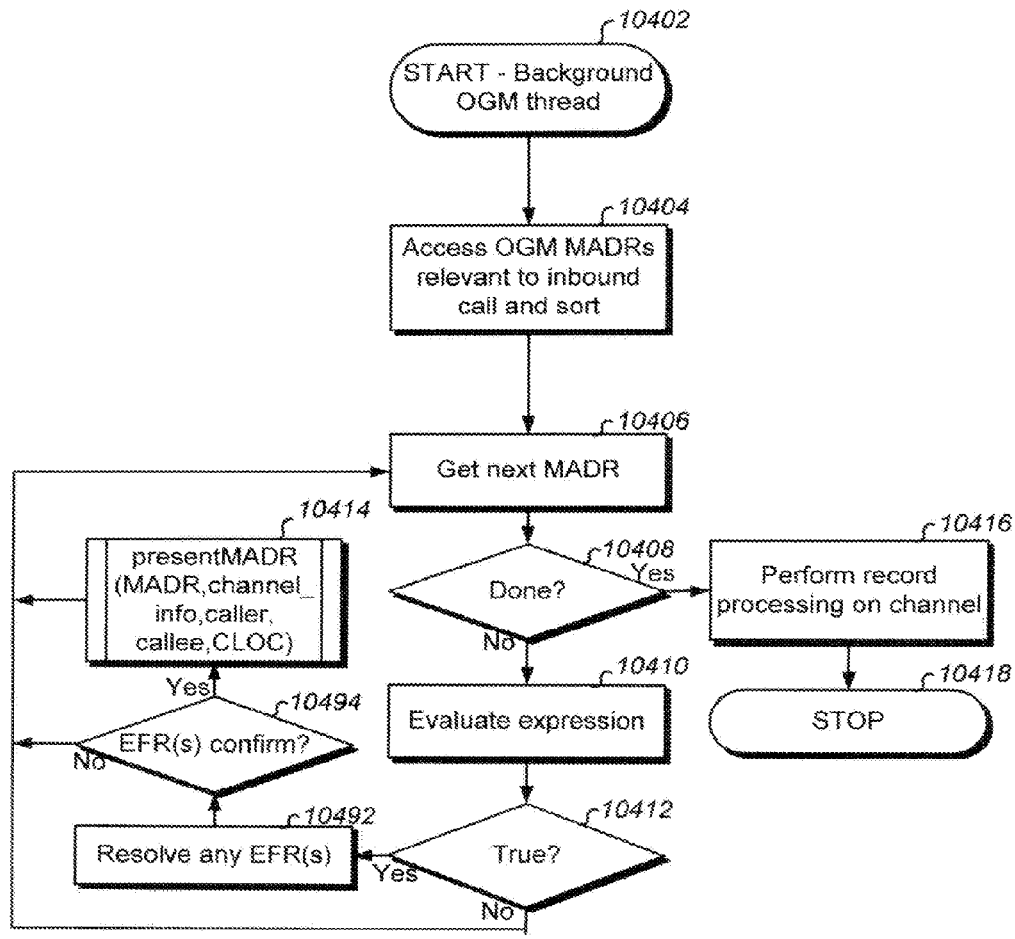
FIG. 23 depicts a flowchart for describing a preferred embodiment of OGM processing.

FIG. 23 depicts a flowchart for describing a preferred embodiment of OGM processing. OGM processing is well known by those skilled in the art. For example, a caller calls a callee who does not answer the call. Subsequently, an OGM is played to the caller and the caller has an opportunity to leave a message. MADR processing improves OGM processing with customized OGMs made more relevant to certain callers.

Background OGM thread processing begins at block 10402 after the receiving MS has already determined an OGM should be delivered to a caller to the MS of FIG. 23 processing. The active call is switched to background processing of FIG. 23 so the MS user can operate other MS applications while FIG. 23 processing occurs. A similar architecture to FIG. 22A may be used except the flow of data is from the channel(s) to componentry of the MS. The active call is switched to the FIG. 23 processing thread which in turn can store the caller's message. Other OGM processing embodiments are well known in small answering machines, combination telephone and answering machine, PBX systems, various phone mail systems, and recording of various video data streams. Block 10402 continues to block 10404 where MADRs with a use field 9850*d* containing OGM are accessed and sorted for ordered processing based on any of the field settings in the MADRs. One MADR is preferably found if any are found, but none may be found. Block 10404 also uses Boolean variables set in FIG. 19 to determine if any MADRs should be searched at all. Processing continues to block 10406. Block 10406 gets the next MADR for processing and block 10408 checks to see if all MADRs have been processed, in which case processing continues to block 10416, otherwise processing continues to block 10410. Block 10410 determines the Boolean result for expression field 9850*g* preferably in real-time by evaluating the expression using stack processing and access to applicable terms. Block 10410 may result in the call being terminated without the caller having an opportunity to leave a message (e.g. known solicitor). Thereafter, if block 10412 determines expression field 9850*g* evaluated to True, then processing continues to block 10492, otherwise, processing continues back to block 10406. Block 10492 accesses any joined EFRs to the MADR in process. Block 10492 determines: a) no EFRs are joined; b) one or more EFR(s) joined do not match criteria and/or CLOC information for the active call; or c) all EFR(s) joined match the criteria and CLOC information for the active call. Block 10492 compares location type EFRs to the CLOC parameter if needed, and compares the keyword(s) type EFRs to call criteria if needed. Location type EFRs clarify event handling for a certain location match. Keyword(s) types EFRs clarify event handling for certain associated keywords, for example as detected in a text stream produced after converting voice to text of the active call (e.g. caller uses voice command information to clarify MADR selection). Thereafter, if block 10494 determines the MADR does indeed match the requirements of OGM processing, then block 10414 invokes the presentMADR procedure with parameters for the MADR in process (or pointer thereof), the active call line resource (e.g. channel) information, and optionally sender (caller) and recipient (callee) information (e.g. may be useful in presentation), and processing continues back to block 10406. If block 10494 determines one or more EFRs do not match parameters, then processing continues back to block 10406. If block 10412 determines the expression resulted in False and no default was found, then processing continues directly back to block 10406.

By the time processing reaches block 10416, MADR OGM information will have already been presented. Block 10416 preferably provides a conventional prompt delimiter to notify a caller the system is ready to accept a recorded message. Block 10416 handles all post-OGM processing as is customary before OGM processing terminates at block 10418.

FIG. 23 provides an ultimate solution for personalized OGMs to callers. FIG. 23 is invoked in context of a specific active call including in a MS which supports a plurality of simultaneous active calls. FIG. 23 is processed for each active call for OGM processing.

Figure 22B:
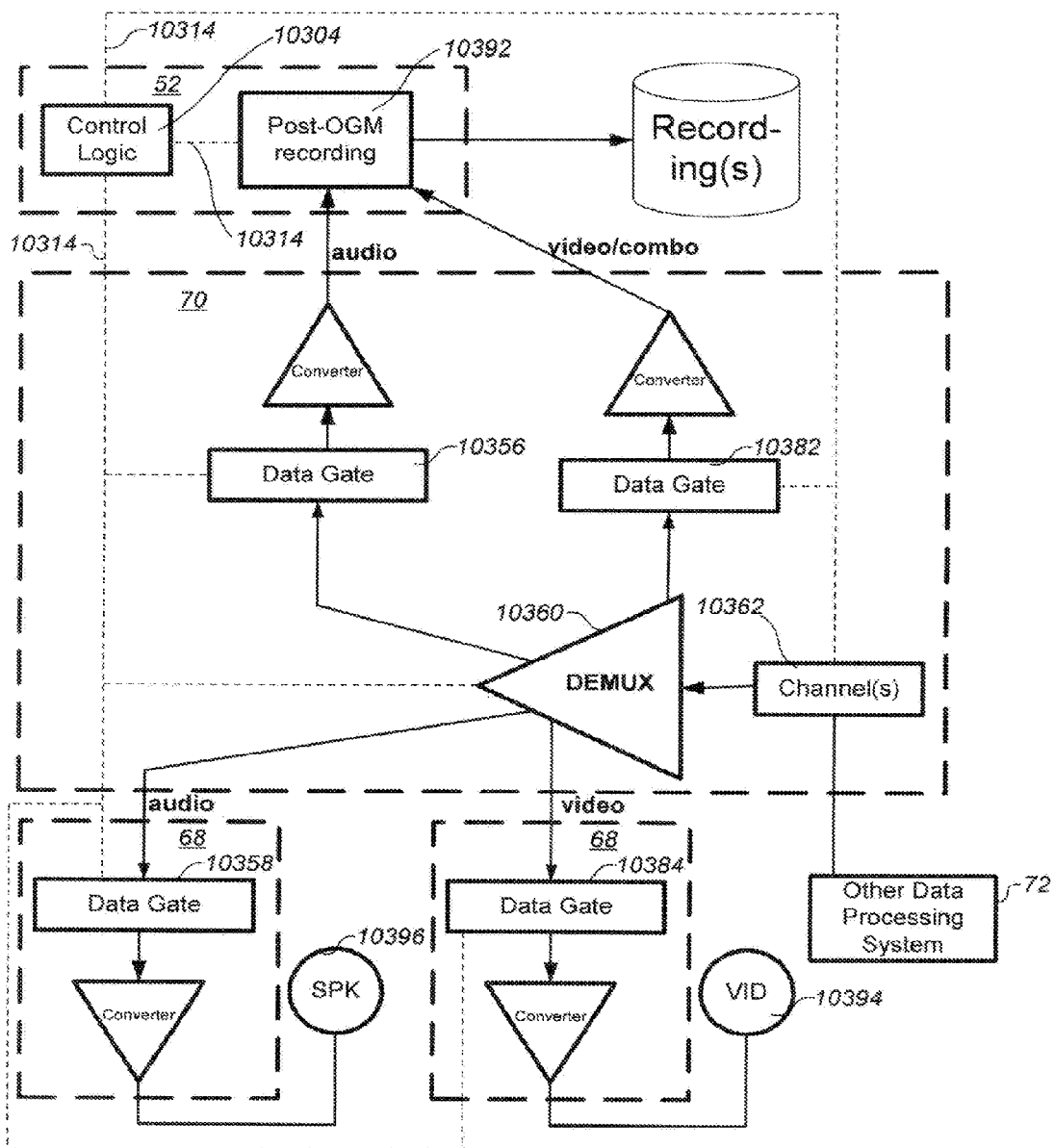
FIG. 22B is a simplified block diagram depicting a preferred embodiment for discussing architecture used to carry out receiving an active call for OGM processing.

With reference now to FIG. 22B, depicted is a simplified block diagram for a preferred embodiment for discussing architecture used to carry out receiving an active call for OGM processing. Input is demultiplexed and/or switched at the MS for recording an input interface from one or more channels. Examples of relevant U.S. Pat. No. 5,220,594 ("Cordless telephone system having a telephone answering machine function", Ohnishi et al); U.S. Pat. No. 5,896,165 ("Method and system for a video answering machine", Rao); U.S. Pat. No. 6,181,779 ("Rationalized automated answering machine", Hwang); U.S. Pat. No. 6,236,717 ("Simultaneous voice/data answering machine", Bremer et al); U.S. Pat. No. 6,252,945 ("Method for recording a digitized audio signal, and telephone answering machine", Hermann et al); U.S. Pat. No. 4,888,795 ("Videotelephone apparatus for transmitting high and low resolution video signals over telephone exchange lines", Ando et al); U.S. Pat. No. 5,046,079 ("Telephone answering device with TV telephone", Hashimoto); U.S. Pat. No. 4,829,555 ("TAD incorporated with VCR", Hashimoto); U.S. Pat. No. 6,377,664 ("Video phone multimedia announcement answering machine", Gerszberg et al); U.S. Pat. No. 3,903,368 ("Telephone automatic answering device with plural message recorders", Okamura et al); U.S. Pat. No. 6,700,954 ("Telephone with integrated digital answering machine for voice and fax data", Pflaum); and U.S. Pat. No. 6,973,167 ("Electronic document answering machine", Kikinis). The preferred system and method preferably utilizes processing in context of FIG. 3 discussions, for example to control flow of data with appropriate data conversions and operate routing/switching data streams, etc but other embodiments may be used.

A call is received at the MS and data paths which reverse those of FIG. 22A are depicted in FIG. 22B processing, however a demultiplexer 10360 can switch where the active call is to be routed for processing. Mixer 10310 and demultiplexer 10360 may or may not be the same component for bidirectional data pathing. Post-OGM recording processing 10392 is well known in the art for a variety of formats. After the OGM is presented, record processing continues for recording a MS caller's audio or video message. In one embodiment, recordings are saved as inactive MADRs which can later be used by a MS user. Control logic 10304 interlaces to post-OGM recording processing 10392 (e.g. process/thread execution by the CPU), data gate 10356, data gate 10358, data gate 10382, data gate 10384, demultiplexer 10360 and channel(s) 10362 by way of appropriate control paths 10314, for example bus/switch 54. MS speaker(s) 10396 provides for audio output, for example to hear an active phone call in progress. Audio data may pass through a converter, for example a digital to analog converter prior to being communicated to speaker(s) 10396. Similarly, converters may be necessary as shown for proper bit sampling, decompression, or other format changes. In some embodiments, demultiplexer 10360 includes functionality eliminating the need for a converter. Data gates (e.g. 10356, 10358, 10382, 10384) are controlled for allowing the audio/video information to pass through from the multiplexer 10360, or prevent the audio/video information from passing through from the multiplexer 10360. Each data gate has its own FIFO queue buffer which can be used for relaying data when controlled to allow data to pass, and its own ability to discard data when controlled to prevent data from passing. Demultiplexer 10360 can switch the flow of an audio path. Audio is input from other data processing system 72 by way of at least one channel 10362. In some embodiments, another converter may lie on the data path between demultiplexer 10360 and channel(s) 10362, or a converter may be upstream from the channel(s) 10362 interface after transmission from system 72. In some embodiments, converters shown are not necessary, for example when digital data is in use throughout a data path. In some embodiments converters may be used between a data gate and the demultiplexer 10360. In some embodiments, data gates are located in different components than shown at strategic interfaces. In some embodiments, demultiplexer 10360 contains conversion capability (e.g. remove need for converter(s)). Depending on embodiments, a converter may be a digital-to-analog converter or any of a variety of format converters (e.g. single data channel into a multiplexed data channel, or visa-versa). While two separate audio paths have been exemplified (to speaker(s) 10396) for post-OGM recording processing, those skilled in the art appreciate the basic design for supporting any number of audio input sources provided multiplexer 10360 supports mixing/multiplexing/switching the required plurality of sources. In one useful embodiment, an audio input signal originates from audio associated with an active video session (video call session (e.g. skype)) over channel(s) 10362 so that a MS user can hear it at speaker(s) 10396. Further, demultiplexer 10360 may support a plurality of audio and/or video source feeds from channel(s) 10362 for mixing audio with the video information for a video call. Video data path processing includes data gates 10382 and 10384, and appropriate converters if necessary, which are coordinated by control logic 10304 driven by post-OGM processing. The MS video output 10394 (two or three dimensional display, window, holographic image, or other visual means) feeds from multiplexer 10360, for example to display the video, perhaps after passing through a converter. Demultiplexer 10360 preferably supports a switched video stream output for pass-through from channel(s) 10362 to either video output 10394 or post-OGM recording processing 10392 at any particular time with control of data gates 10382 and 10384. In an alternate embodiment, demultiplexer 10360 may support a plurality of video sources over channels(s) 10362 for mixing in such a way that the recipient can simultaneously view all video source feeds at video output 10394 (e.g. independent side by side video transmissions occupying less presentation space). In alternate embodiments, the video stream format may include audio information so that a single path from multiplexer 10360 is used for both video and audio (e.g. "combo"). Video and audio may use separate channels, or may share channels when communicating from other data processing system 72. Demultiplexer 10360 may include integrated/interfaced components (not shown) to provide functionality described.

Figure 24:
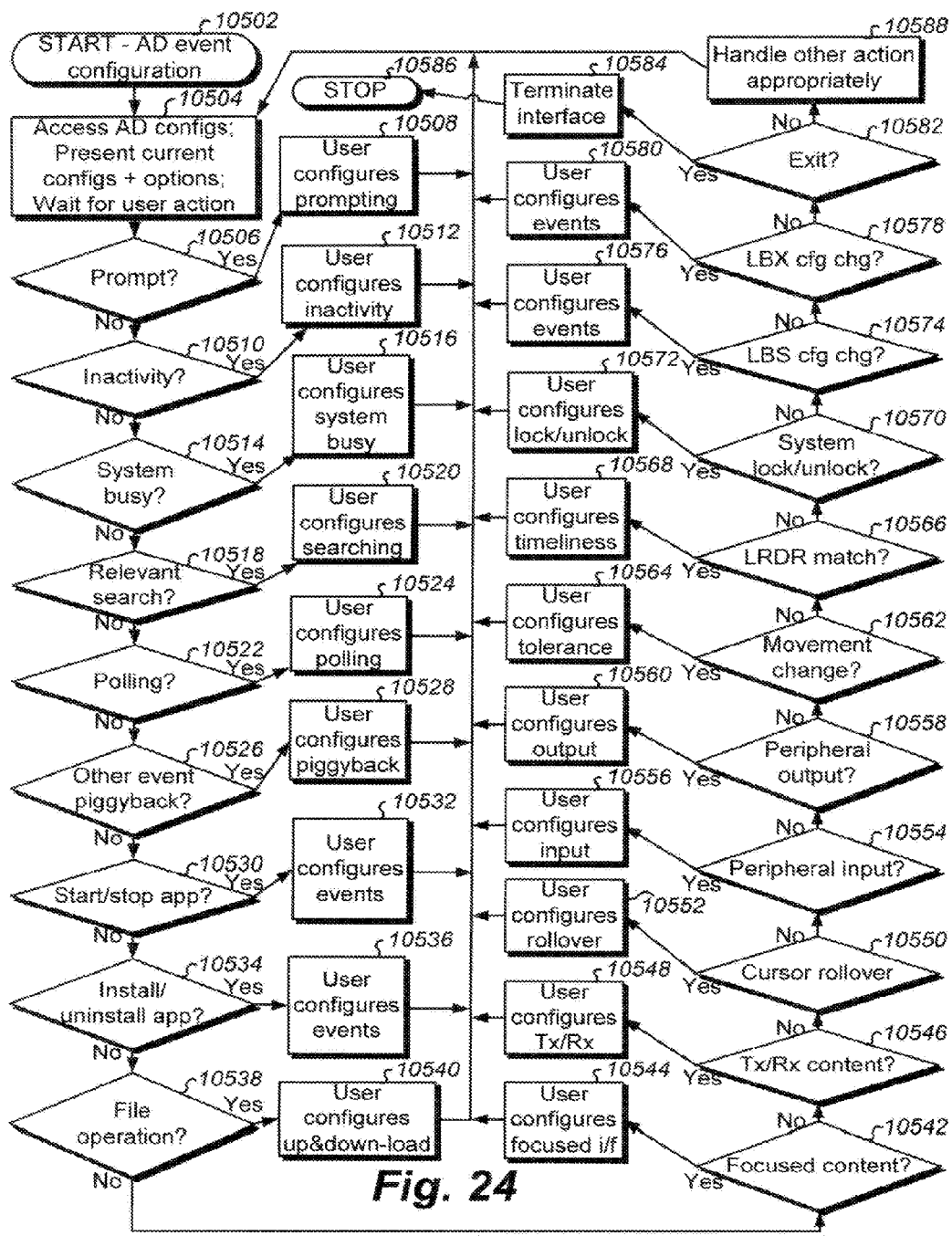
FIG. 24 depicts a flowchart for describing preferred embodiments of AD event configuration processing.

FIG. 24 depicts a flowchart for describing preferred embodiments of AD event configuration processing, namely events which can cause a local AD presented by way of a MADR, as well as events which may be used to cause an AD (i.e. MADR) to be presented at a remote MS. FIG. 24 may be used at a MS for governing observer preferences for how to present ADs, or may be used by an AD originator or maintainer for governing author's intent (in field 9850*f*) for how to present ADs (e.g. in FIG. 18). When used by a potential observer, FIG. 24 configurations are maintained outside of MADRs. A MS user could use FIG. 18 (e.g. FIG. 24 configurations maintained to field 9850*f*) for overriding how to present ADs at his MS, for example as enforced by privileges between credentials/identifiers as indicated in field 9850*i*. When used by a MADR originator or MADR-maintaining user (e.g. with permissions enforced through field 9850*i*), FIG. 24 configurations are preferably maintained as part of the MADR itself in field 9850*f* so that MADRs are objects containing complete data and processing methods for being distributed between data processing systems with the full prescription for how to be processed. FIG. 24 configurations are referred to as "data processing system control operation" configurations. Reconciliation will occur between the author/maintainer for intent of field 9850*f* with observer's preferences.

AD MADR fields 9850*d* may have bits set for AD COM-L and/or AD COM-R as described above for other applications, and for invoked FIG. 20 processing. Events configured in FIG. 24 are accomplished with charter configurations, however MADR expressions configured can be simplified when event conditions are moved out of the expression and configured by guiding the user through understanding what event is being configured. Also, MADRs may be completely self contained objects containing FIG. 24 configuration information (e.g. in field 9850*f*) for being distributed to receiving MSs and presented there accordingly.

It is expected that the MS provide convenient user interfaces (touch, drag and drop, click, etc) for making any of the user configurations disclosed herein and in the parent applications. The scope of a user making configurations within a user interface covers the many embodiments reasonable to make such configurations, preferably by isolating complexities from the user for making configurations. It may be tedious for an inexperienced/novice user to configure an event, or find an appropriate snippet, when being required to know which AppTerm is used for an application type of event for triggering an action, in particular if an implementation did not do a good job making the user configuration easy to do. A preferred embodiment is described in detail below for various useful events used to cause an AD presentation, and any subset of events is configurable for AD presentations. Appropriate synchronization (semaphore(s)) interfaces are used where appropriate. Invocations of the FIG. 20 MADRproc() interface for AD processing preferably passes parameters of: AD for application, specific AD event for event (e.g. COM-L-AD-polling, COM-L-AD-systembusy, . . . , a COM-L and/or COM-R event for each event type of FIG. 24 as indicated with a designated bit setting in field 9850*d*), originator or last owner identity from field 9850*i* for sender, identity of MS/user for recipient, criteria of null unless criteria is available for EFR comparison, and CLOC set to null unless location information is to be used for comparison. Field 9850*d* can contain use bits for each event type for ADs, or events can map to the same bit setting(s). The administrator of MADRs can decide whether or not COM-R-AD-specificevent uses are configured. Preferably, all AD processing events causing FIG. 20 processing are assumed to be outbound events so that COM-L and COM-R AD processing is searched. Callback functions described below are preferably dynamically linked and should be pre-loaded at event enabling processing blocks (e.g. 10516) upon enabling, and unloaded when not needed.

AD event configuration processing begins at block 10502 when a user requests AD event configuration, and continues to block 10504 where current AD event configurations are accessed, the current setting(s) presented to the user with options, and processing waits for a user action. Scrolling, or detailed information requests for seeing configurations, may be made at block 10504. Processing continues to block 10506 when an event configuration action is performed by the user.

If block 10506 determines the user selected to configure presentation prompt processing, then block 10508 interfaces with the user for optionally configuring a presentation prompt. The user can configure to not prompt prior to presenting an AD or to force a prompt prior to presenting an AD. Alternate embodiments may also support user specification for which of the options to provide a user within the prompt. In a preferred embodiment, prompt processing affects all MADR object presentations. In another embodiment, separate presentation prompt configurations may be made for different event types (i.e. different uses (field 9850*d*)). Processing leaves block 10508 and continues back to block 10504. Block 10504 re-accesses configurations when returned to for ensuring a refresh to the user for any configuration changes made up to that point. If block 10506 determines the user did not select to configure a presentation prompt, then processing continues to block 10510.

If block 10510 determines the user selected to configure a system inactivity event for automated AD presentation processing, then block 10512 interfaces with the user for configuring inactivity event criteria: threshold time period/duration (e.g. 10 minutes) which deems the MS not in use by the user for a period of time (e.g. no input peripheral input activity for a threshold time period). This enables presenting ADs automatically based on a period of user inactivity. Block 10512 supports the user starting (when enabling the inactivity event) and terminating (when disabling the inactivity event) a timer thread of processing for comparing SYS_lastActionDT (AppTerm in parent applications) with a current date/time stamp, and using a date/time stamp of the last check made (e.g. initialized to current date/time of block 10512 when starting the thread) for governing a timely re-check iteration. Different thread embodiments include a timer/worker combo thread with in-loop sleep processing wherein the thread can be interrupted for terminating, or two threads wherein the comparison worker thread feeds off of a queue when there is work (i.e. wake up) to do, or to terminate. A timer thread would timely feed the work queue. In any case, after determining a system inactivity event occurred, the worker thread invokes FIG. 20 processing. The worker thread may or may not access MS whereabouts for populating the CLOC parameter. Typically, a null is passed for the criteria parameter, however keywords may be used to clarify the type of inactivity event with EFR information. Processing leaves block 10512 and continues back to block 10504. If block 10510 determines the user did not select to configure inactivity event processing, then processing continues to block 10514. System use inactivity may be a useful time to present the user with an AD, assuming the user is attentive to the MS but not doing anything. Other embodiments can detect that the user is present, although not actively using the MS, for example through a body placed RFID in communications with the MS (i.e. user is there), or current output processing at the MS. When a user is using FIG. 18 to invoke FIG. 24 (e.g. originator intent setting(s) to field 9850*f*), appropriate worker thread processing is initiated for an active MADR, and is also initiated at block 4470 when receiving the MADR from a remote system, and in accordance with privileges.

If block 10514 determines the user selected to configure a system busy event for automated AD presentation processing, then block 10516 interfaces with the user for configuring system busy criteria: threshold time period/duration (e.g. 55 seconds) which deems the MS busy for a period of time (i.e. user is unable to get focused user interface for control of processing because of other MS processing). This enables presenting ADs automatically based on a period of the MS being busy anyway (e.g. task-prioritized large file download). In a preferred embodiment, block 10516 supports the user configuring in field 5300*m* an AppTerm trigger for a "SYS_blocked" AppTerm variable with a callback function invoked with the criteria duration parameter. SYS_blocked contains True when the user is blocked from using all features of the MS, and is changed to False when any one user interface becomes available for use. Under normal circumstances, the multi-threaded MS should not allow a total system busy condition, however the condition may be intentional for the purpose of forcing presentation of an AD to a user at the MS for the busy condition. When SYS_blocked become True, the callback function starts a timer thread for terminating after the time period/duration, and when SYS_blocked becomes False, the callback function terminates the timer thread prematurely if still running. When the timer thread terminates on its own without being told to by the callback function, FIG. 20 MADRproc( ) processing is invoked. The callback function may or may not access MS whereabouts for populating the CLOC parameter. Typically, a null is passed for the criteria parameter, however keywords may be used to clarify the type of system busy event with EFR information.

Figure 11:
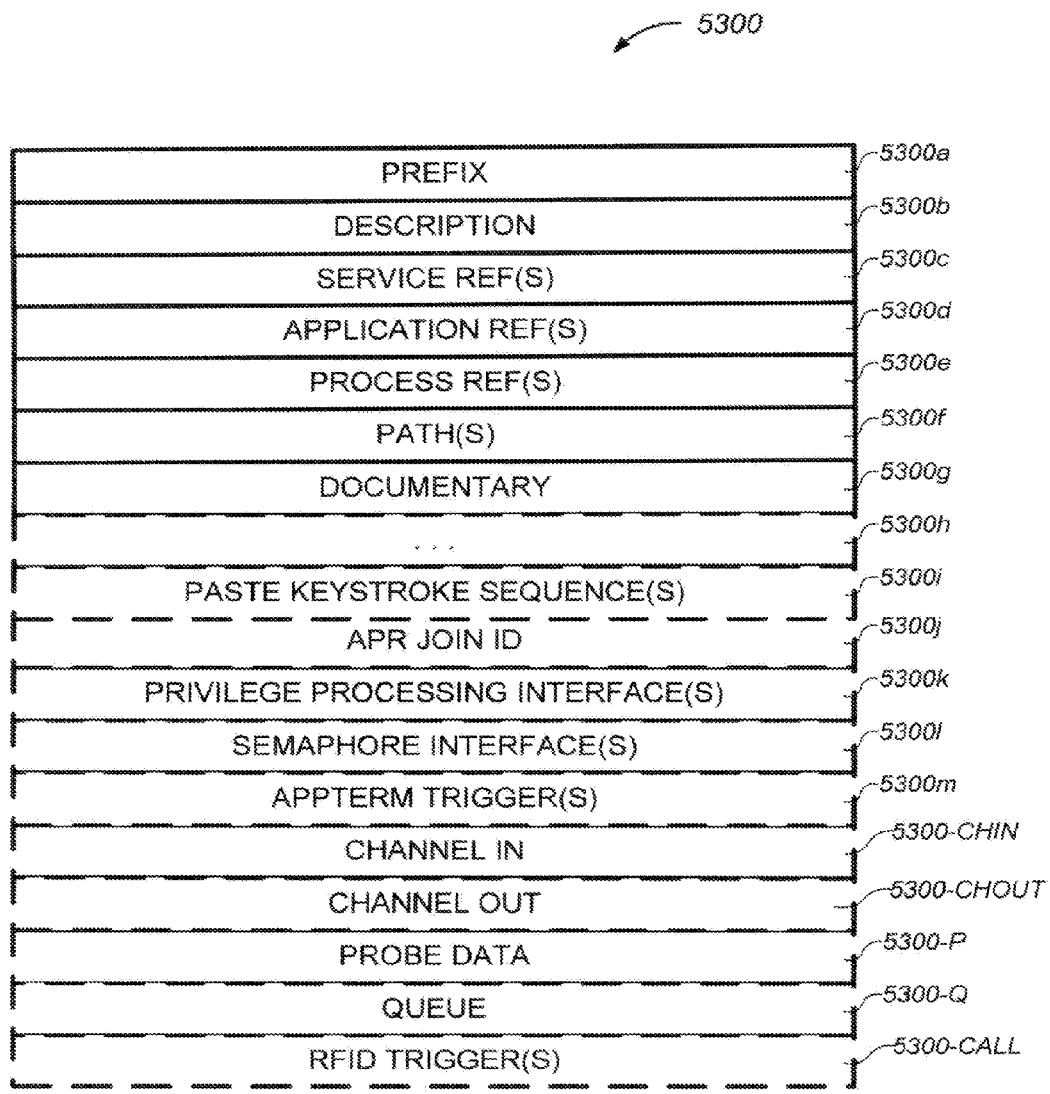
FIG. 11 depicts a preferred embodiment of a Prefix Registry Record (PRR) disclosed in detail in the parent applications.
Figure 12A:
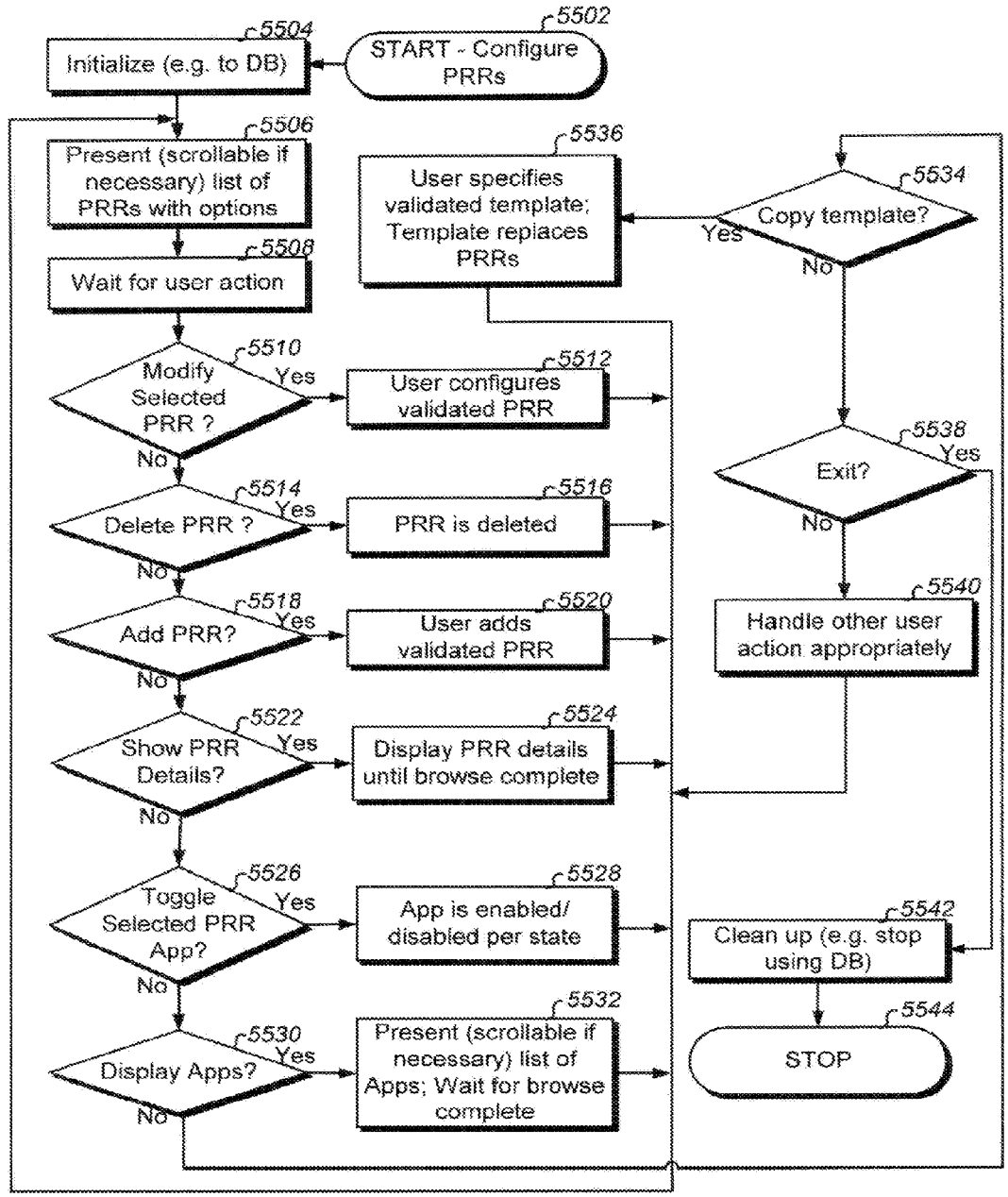
FIG. 12A depicts a flowchart for describing a preferred embodiment of MS user interface processing for Prefix Registry Record (PRR) configuration disclosed in detail in the parent applications.
Figure 12B:
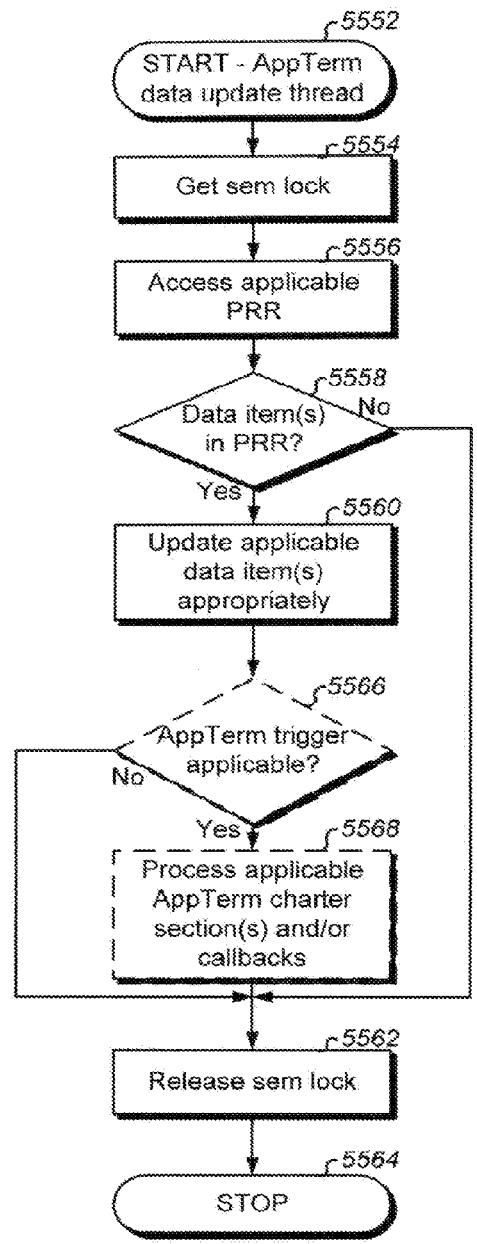
FIG. 12B depicts a flowchart for describing a preferred embodiment of Application Term (AppTerm) data modification disclosed in detail in the parent applications.

With reference now to FIGS. 11, 12A and 12B, the reader should appreciate the full scope, meaning, processing, and many embodiments possible for a PRR 5300 and applicable processing thereof. FIG. 11 depicts a preferred embodiment of a Prefix Registry Record (PRR), in particular for memorable reference of detail disclosed in the parent applications. FIG. 12A depicts a flowchart for describing a preferred embodiment of MS user interface processing for Prefix Registry Record (PRR) configuration, in particular for memorable reference of detail disclosed in the parent applications. FIG. 12B depicts a flowchart for describing a preferred embodiment of Application Term (AppTerm) data modification, in particular for memorable reference of detail disclosed in the parent applications.

With reference back to FIG. 24, block 10516 installs to field 5300*m* the AppTerm trigger for callback function processing when enabling system busy monitoring, and removes the AppTerm trigger when disabling system busy monitoring. There are other embodiments for qualifying a system busy condition within the context of a specific application in use, rather than an entire system busy condition which should be avoided unless the originator desires to force an AD presentation on the MS user, and has privileges to do so. For example, an AD may be presented within the focused interface (e.g. window) of a specific application when the application encounters a busy condition. This permits the user to navigate to other MS applications without incident. The AD would be forced to the user if the user decides to stay within context of that specific application user interface (e.g. that presentation window). Every MS application may have an associated "Prefix_blocked" AppTerm (like SYS_blocked) within the context of the "Prefix_" application for the same callback function (see Prefix field 5300*a* discussions in parent applications). The callback function can start a plurality of duration bound timer threads in the multi-threaded MS with the specific AppTerm as a parameter for special user interface processing. In all cases of ending a busy period, the timer thread has already terminated when invoking FIG. 20 processing, or is prematurely terminated by the callback function for a not busy event. The callback function may or may not access MS whereabouts for populating the CLOC parameter, and criteria may or may not be populated prior to the FIG. 20 invocation for using EFR data to clarify AD presentation. When a user is using FIG. 18 processing to invoke FIG. 24 (e.g. originator intent setting(s) to field 9850*f*), appropriate automated AppTerm trigger configuration is initiated for an active MADR, and is also initiated at block 4470 when receiving the MADR from a remote system, and in accordance with privileges. If block 10510 determines the user did not select to configure system busy (or application busy) event processing, then processing continues to block 10518.

If block 10518 determines the user selected to configure a relevant search event for automated AD presentation processing, then block 10520 interfaces with the user for configuring EFRs as well as PRR configurations (e.g. field 5300*m*) for an AppTerm variable (e.g. "B_srchcriteria" as explained in parent applications) triggering a callback function. For example, when the user enters a search query in the browser search criteria entry field referenced with the B_srchcriteria variable, the callback function is invoked for in turn invoking FIG. 20 processing with the search criteria string populated in the criteria parameter for comparing to EFR information. The callback function may or may not access MS whereabouts for populating the CLOC parameter. Block 10520 installs to field 5300*m* the AppTerm trigger for callback function processing when enabling a relevant search event, and removes the AppTerm trigger when disabling a relevant search event. When a user is using FIG. 18 processing to invoke FIG. 24 (e.g. originator intent setting(s) to field 9850*f*), appropriate automated AppTerm trigger configuration is initiated for an active MADR, and is also initiated at block 4470 when receiving the MADR from a remote system, and in accordance with privileges. If block 10518 determines the user did not select to configure search criteria event processing, then processing continues to block 10522.

If block 10522 determines the user selected to configure a polling event for automated AD presentation processing, then block 10524 interfaces with the user for configuring polling criteria: polling period, or schedule of calendar date/time information. This enables presenting ADs automatically based on polling MADRs for applicability. Block 10524 supports the user starting (when enabling the polling event) and terminating (when disabling the polling event) a polling thread of processing for timely invoking FIG. 20 processing. Different thread embodiments include a timer/worker combo thread with in-loop sleep processing wherein the thread can be interrupted for terminating, or two threads wherein the worker thread feeds off of a queue when there is work (i.e. wake up) to do (i.e. invoke MADRproc( ), or to terminate. A timer thread would timely feed the work queue. In any case, after waking up for the polling period or schedule, the worker thread invokes FIG. 20 processing. The worker thread may or may not access MS whereabouts for populating the CLOC parameter. Typically, a null is passed for the criteria parameter, however keywords may be used to clarify the polling event with EFR information. Processing leaves block 10524 and continues back to block 10504. When a user is using FIG. 18 processing to invoke FIG. 24 (e.g. originator intent), polling thread(s) are initiated for an active MADR, and are also appropriately initiated at block 4470 when receiving the MADR from a remote system, and in accordance with privileges. If block 10522 determines the user did not select to configure polling event processing, then processing continues to block 10526. A presentation prompt is preferably configured with polling events since the user's activity is unpredictable at the time of invoking FIG. 20.

If block 10526 determines the user selected to "piggyback" AD configuration on other events, then block 10528 interfaces with the user for setting field(s) 9850*d* for the desired use events of the ADs. Block 10528 interfaces with the user for preferably clearing or setting any bits of field 9850*d*. This enables presenting ADs automatically based on other application inbound and/or outbound events. Processing leaves block 10528 and continues back to block 10504. When a user is using FIG. 18 processing to invoke FIG. 24 (e.g. originator intent), field 9850*d* bits will already be set in the MADR(s) when received at block 4470 from a remote system, however field 9850*d* may be reset or cleared automatically in accordance with privileges. CLOC and criteria parameters will be passed as would have been for the particular event. Keep in mind that piggy-backing may cause multiple invocations to FIG. 20 processing, for example to satisfy the actual application event as well as the AD event. Typically, configurations prevent a single event type from causing more than one invocation to FIG. 20 processing. If block 10526 determines the user did not select to "piggyback" AD event processing, then processing continues to block 10530.

If block 10530 determines the user selected to configure application start or application termination events for automated AD presentation processing, then block 10532 preferably requests PRR 5300 prefix information for uniquely identifying application PRR information. Boolean event fields are maintained to fields 5300*h*: one for a start event and one for a termination event for each specified PRR (an application). Block 5528 invokes the MADRproc( ) procedure with the particular event when: starting the particular application and the start event Boolean is True; or when terminating the particular application and the termination event Boolean is True. If both Boolean settings in field 5300*h* are False, block 5528 processes without change as described in the parent applications. Thus, block 5528 interrogates field 5300*h* for AD event processing when starting or terminating an application. When an application is started or terminated elsewhere, fields 5300*h* should be interrogated there for the same block 5528 AD event processing. In some embodiments, the criteria parameter contains specific application criteria when passed to FIG. 20 processing of which application or application context is being started or terminated, so less Boolean variables are required. Other embodiments need not rely on the LBX framework for application start/stop events. Analogous Boolean variables can be maintained for the applications outside of the LBX framework for analogous MADRproc( ) invocations when starting or terminating applications. There are many embodiments for recognizing when an application is started or terminated. Some include:

Recognized in processing path used to start or terminate a particular application;

User interface object is spawned to the MS user interface with unique recognizable criteria (e.g. application window title bar text); or Keystroke(s), voice command(s), or other user actions are intercepted and recognized for being used to start or terminate an application.

Some embodiments will implement a start and terminate of a particular application context. There are many embodiments for recognizing when an application context is started or terminated. Some include:

Recognized in processing path used to start or terminate a particular application context;

User interface object is spawned to the MS user interface with unique recognizable criteria (e.g. application window title bar text); or Keystroke(s), voice command(s), or other user actions are intercepted within a focused application user interface object, and are recognized for being used to start or terminate an application context.

Likewise, the MS being started (power-on, rebooted, etc) or terminated (shutdown, power-off, etc) can have associated Boolean variables for these events that will cause MADRproc( ) invocations for checking for automated AD presentation processing. In another example, a user starts play of a certain song. Song criteria (music genre, name, artist, album, or any other criteria) can be passed as criteria to MADRproc( ) for the music application context event of involving a particular song. This enables using EFRs to determine automatically which ADs should be presented for the song played (e.g. EFR keywords match the criteria parameter). Similarly, any application or application context can have associated ADs for automated presentation through EFRs. EFRs are used to refine any particular application event for desirable criteria or whereabouts conditions. When a user is using FIG. 18 processing to invoke FIG. 24 (e.g. originator intent), the Boolean variables are automatically populated, also when receiving MADRs at block 4470 from a remote system in accordance with privileges. If block 10530 determines the user did not select to configure application, or application context, or MS start/terminate event(s), then processing continues to block 10534.

If block 10534 determines the user selected to configure application install or uninstall events for automated AD presentation processing, then block 10536 preferably maintains Boolean variables for: all applications installs, all application uninstalls, particular application(s) install, or particular application(s) uninstall. When particular applications are configured, an application handle must be anticipated. Example embodiments and handles include:

An anticipated field 5300*a* prefix is used at block 5520 (install event) or block 5516 (uninstall event) for invoking FIG. 20 MADRproc( ) in accordance with Boolean settings;

Recognized in processing path used to install or uninstall a particular application;

Keystroke(s), voice command(s), or other user actions are intercepted and recognized for being used to install or uninstall an application; or Detection of a file name(s) copied to (install), or removed from (uninstall) the MS.

Applicable Boolean variables are maintained and used where appropriate. In some embodiments, the criteria parameter contains specific application install/uninstall criteria when passed to FIG. 20 processing so less Boolean variables are required. Boolean variables are analogous to those described for application starting and terminating. Software vendor criteria (vendor name, product, product family, product category or any other criteria) can be passed as criteria to MADRproc( ) for the application being installed or uninstalled. This enables using EFRs to determine automatically which ADs should be presented for the application being installed or uninstalled (e.g. EFR keywords match the criteria parameter). CLOC information may also be used for clarifying the event. Boolean variable examples for triggering events to invoke FIG. 20 processing include:

ANYAPPINST—True=fire event when any application is installed; False=no special processing;

ANYAPPUNINST—True=fire event when any application is uninstalled; False=no special processing;

Prefix_INST—True=fire event when application with field 5300*a* "Prefix" is installed; False=no special processing;

Prefix_INST—True=fire event when application with field 5300a "Prefix" is uninstalled; False=no special processing;

APPNAME_INST—True=fire event when APPNAME application is installed; False=no special processing; and/or APPNAME_UNINST—True=fire event when APPNAME application is uninstalled; False=no special processing.

When a user is using FIG. 18 processing to invoke FIG. 24 (e.g. originator intent), the Boolean variables are automatically populated, and also when receiving MADRs at block 4470 from a remote system in accordance with privileges. If block 10534 determines the user did not select to configure all application install/uninstall events, or a particular application install/uninstall event(s), then processing continues to block 10538.

If block 10538 determines the user selected to configure file operation events (upload, download, copy, move, alter, open (e.g. view), delete, saving, renaming, or any other operation) for automated AD presentation processing, then block 10540 preferably maintains a Boolean variable for all file operations (True=trigger event, False=no special processing). When particular file operations trigger the event, the criteria parameter is populated with the specific event type (e.g. file download) for specific file operation event handling by comparing to configured EFR information. When particular files are to trigger the event, the criteria parameter is populated with the file name for specific file event handling by comparing to configured EFR information. The criteria parameter passed to FIG. 20 processing may contain a plurality of file specifications, for example when more than one file is operated on (e.g. uploaded/downloaded). In an alternate embodiment, a plurality of distinct Boolean variables may be used for distinct types of file operations to prevent overuse of the criteria parameter. File operations are preferably detected by:

User action(s) within context of a file management user interface;

Recognized in processing path used to operate on particular file(s); or

Keystroke(s), voice command(s), or other user actions are intercepted and recognized for commanding a file operation.

Whatever processing model used invokes FIG. 20 processing, the applicable Boolean variable(s) is consulted for whether or not to trigger the event. When the Boolean is True, the criteria parameter can be set to file names involved and CLOC information may or may not be populated for further clarifying the event. Various embodiments will pass through the criteria parameter to FIG. 20 processing, the full file name(s), file types (e.g. extension(s)), file source information (file path(s)), file creator, file owner, file attributes, file date/time stamp information, and/or any other file criteria for to comparing to applicable EFR information to clarify the file operation event. When a user is using FIG. 18 processing to invoke FIG. 24 (e.g. originator intent), Boolean variable(s) is automatically populated, and also when receiving MADRs at block 4470 from a remote system in accordance with privileges. If block 10538 determines the user did not select to configure events for file operations, then processing continues to block 10542.

If block 10542 determines the user selected to configure focused content events for automated AD presentation processing, then block 10544 preferably maintains a Boolean variable for whether or not to detect sought content to trigger AD presentation processing (True=trigger event, False=no special processing). EFR information is used to qualify the focused content event with specific content information. When an object is focused at the MS, the criteria parameter is preferably populated with readable text found in the focused object (e.g. window, icon, full screen, etc) and FIG. 20 processing is invoked. In-focus object event handling is well known in the art and can be intercepted for processing FIG. 20 invocations determined through the Boolean variable setting. Obtainable text from the focused object is accessed and the criteria parameter is preferably populated with a text stream of text identified from the focused object. CLOC information may or may not be populated for further clarifying the event. Criteria parameter information is compared with configured EFR information to match anticipated content for presenting the AD. In a preferred MS embodiment, recognizable textual data from the focused object is used to populate the criteria parameter. In some embodiments, an OCR process scans the focused object for text that is formatted as text to the criteria parameter. In some embodiments, graphical criteria may be sought in a focused object and compared with graphical criteria in EFR data (e.g. new type field 9855b). In one embodiment, only title bar text or certain areas of focused objects are accessed for populating the criteria parameter. Regardless of embodiment, performance of the MS must be considered so as to not significantly impact every object focus in the MS user interface. When a user is using FIG. 18 processing to invoke FIG. 24 (e.g. originator intent), the Boolean variable is automatically populated, and also when receiving MADRs at block 4470 from a remote system in accordance with privileges. If block 10542 determines the user did not select to configure events for focused objects, then processing continues to block 10546.

If block 10546 determines the user selected to configure data transmission or data reception content events for automated AD presentation processing, then block 10548 preferably maintains Boolean variables for whether or not to detect sought content in transmissions (Tx=True to trigger event) or receptions (Rx=True to trigger event). EFR information is used to qualify the event with specific content information. When data is transmitted outbound from the MS, the criteria parameter is preferably populated with data destined for outbound transmission (may or may not be entire stream or packet at a time depending on communications layer implemented). When data is received at the MS, the criteria parameter is preferably populated with the data received (may or may not be entire stream or packet at a time depending on communications layer implemented). CLOC parameter information may or may not be populated for further clarifying the event. FIG. 20 processing is invoked for these inbound or outbound transmission events when the applicable Boolean is True. Criteria parameter information is compared with configured EFR information to match anticipated content being transmitted/received. In a preferred MS embodiment, recognizable textual data is used to populate the criteria parameter. In another embodiment, the binary data stream is used to populate the criteria parameter for compare to the EFR data (e.g. new type field 9855b). Transmission or data reception events at the MS may be monitored on all communication interfaces 70, a subset of communications interfaces 70, or any one of the communications interfaces 70, for example those described in parent applications. When a user is using FIG. 18 processing to invoke FIG. 24 (e.g. originator intent), the Boolean variables are automatically populated, and also when receiving MADRs at block 4470 from a remote system in accordance with privileges. If block 10546 determines the user did not select to configure events for data transmitted/received, processing continues to block 10550.

If block 10550 determines the user selected to configure cursor rollover events for automated AD presentation processing, then block 10552 preferably maintains a Boolean variable for whether or not to trigger AD presentation processing for rollover content events. In one embodiment, HTML pages loaded at the MS (e.g. being viewed by user) contain tag information which causes a cursor rollover event, for example in context of a browser. It is well known in the art how rollovers work and how they are detected. For example the HTML string "<img src="images/picture.gif" alt="Rollover Text Here" width="217" height="153"/>" implements a cursor rollover in the browser window such that when the cursor is moved by a user over the "picture.gif" area of the content displayed, the text "Rollover Text Here" automatically displays. Thus, the rollover event can trigger FIG. 20 invocation when the Rollover Boolean variable is True, and the rollover content can be formatted to the criteria parameter for being compared with EFR information. CLOC information may or may not be populated for further clarifying the event. In alternate embodiments, an HTML architecture may not be used. Objects which are rolled over by the cursor of the MS may be interpreted at real-time for building the criteria parameter which is compared to EFR information. The MS cursor approach referred here is a metaphor in various embodiments wherein the user's touch to objects in the user interface, or user's implement touch to objects of the user interlace, indicate a rollover action for subsequent processing. Criteria parameter information is populated appropriately depending on the touched object data. Criteria parameter information is compared with configured EFR information to match anticipated content for presenting the AD. Regardless of embodiment, performance of the MS must be considered so as to not significantly impact every user touch or rollover action in the MS user interface. When a user is using FIG. 18 processing to invoke FIG. 24 (e.g. originator intent), the Boolean variable is automatically populated, and also when receiving MADRs at block 4470 from a remote system in accordance with privileges. If block 10550 determines the user did not select to configure rollover events, then processing continues to block 10554.

If block 10554 determines the user selected to configure peripheral input events for automated AD presentation processing, then block 10556 preferably maintains a Boolean variable for whether or not to detect content in peripheral input data (True to trigger event). EFR information is used to qualify the event. When data is transmitted from an input peripheral (keyboard, keystrokes through an enter key, voice command, touch action, or any other user action), the criteria parameter is preferably populated with data from the peripheral (may or may not be entire stream or packet at a time depending on peripheral interface layer implemented). CLOC parameter information may or may not be populated for further clarifying the event. FIG. 20 processing is invoked for the input peripheral data (e.g. action described or data associated with the action) when the applicable Boolean is True. An alternate embodiment maintains separate Booleans for each type of peripheral input. Criteria parameter information is compared with configured EFR information to match the anticipated user action or content being input. For example, data is used to populate the criteria parameter for compare to the EFR data (e.g. may use a new type field 9855b). Peripheral input data events may be monitored on all input peripheral interfaces 66, a subset of peripheral interfaces 66, or any one peripheral interface 66. Preferably, well known Terminate and Stay Resident (TSR) processing is used to intercept data destined for input peripheral processing. When a user is using FIG. 18 processing to invoke FIG. 24 (e.g. originator intent), the Boolean variable(s) are automatically populated, and also when receiving MADRs at block 4470 from a remote system in accordance with privileges. If block 10554 determines the user did not select to configure events for input peripheral data, then processing continues to block 10558.

If block 10558 determines the user selected to configure peripheral output events for automated AD presentation processing, then block 10560 preferably maintains a Boolean variable for whether or not to detect content in peripheral output data (True to trigger event). EFR information is used to qualify the event. When data is transmitted to an output peripheral (printer output, display output, scanner output, or any other device output), the criteria parameter is preferably populated with data destined for the peripheral (may or may not be entire stream or packet at a time depending on peripheral interface layer implemented). CLOC parameter information may or may not be populated for further clarifying the event. FIG. 20 processing is invoked for the output peripheral data when the applicable Boolean is True. An alternate embodiment maintains separate Booleans for each type of peripheral output. Criteria parameter information is compared with configured EFR information to match for content being output. For example, data is used to populate the criteria parameter for compare to the EFR data (e.g. may use a new type field 9855b). Peripheral output data events may be monitored on all output peripheral interfaces 68, a subset of peripheral interfaces 68, or any one peripheral interface 68. Preferably, well known Terminate and Stay Resident (TSR) processing is used to intercept data destined for output peripheral processing. When a user is using FIG. 18 processing to invoke FIG. 24 (e.g. originator intent), the Boolean variable(s) are automatically populated, and also when receiving MADRs at block 4470 from a remote system in accordance with privileges. If block 10558 determines the user did not select to configure events for output peripheral data, then processing continues to block 10562.

If block 10562 determines the user selected to configure a MS movement event for automated AD presentation processing, then block 10564 interfaces with the user for convenient specification of the following information:

1) a movement tolerance in conveniently specified units (meters, yards, feet, miles, etc);
2) location area information for where a movement change should be monitored;
3) date/time criteria of when the movement change should be monitored; and
4) Optional EFR criteria for comparing to automatically recognized data (e.g. text) by the MS as one or more frames are captured or "seen" by the MS.

The user may specify a plurality of movement configurations at block 10564. After validated user configurations are made at block 10564, automatically built charter(s) is saved. Data configured at block 10564 should be saved and used to default selections at future invocations of block 10564. Block 10564 will create the charter(s) when movement is enabled, and will delete the charter(s) when movement is disabled. EFR information is used to qualify the event for what the MS "sees" at the location and movement criteria specified. The charter(s) access the appropriate AppTerm variables for whether or not the camera/video input is active and a running length of recognition criteria since being activated. Optional #4 data above is passed as criteria to FIG. 20 processing, and the current MS whereabouts may or may not be passed for the CLOC parameter. The charter expression contains #1, #2 and #3 user specification conditions. When the charter expression is true, the charter action invokes FIG. 20 processing. When a user is using FIG. 18 processing to invoke FIG. 24 (e.g. originator intent), the corresponding charter(s) is maintained to field 9850f for automatically updating charter information, and also when receiving MADRs at block 4470 from a remote system in accordance with privileges. If block 10562 determines the user did not select to configure movement events, then processing continues to block 10566. In some embodiment, an optional #5 configuration for the charter('s) expression(s) can be made for time period/duration criteria for when a movement has, or has not been, made.

If block 10566 determines the user selected to configure a LRDR event for automated AD presentation processing, then block 10568 interfaces with the user for convenient specification of one or more name fields 9860*a* for a list of LRDRs being monitored, along with date/time information/scheduling information for when the LRDRs should be compared against the specified MS identity whereabouts. In one embodiment, field 9860*e* contains a list of MS identifiers with associated scheduling information for when LRDRs are applicable for matching to MS whereabouts, for example to isolate expression field 9850*g* specifications outside of a MADR. In another embodiment, specifications from block 10568 are maintained outside of LRDRs and accessed when needed. LRDRs can be used to compare against whereabouts of any MS including the MS of FIG. 24 processing. In one embodiment, charters are created and handled in a manner analogous to block 10564. Map terms, waymark information terms, and any other encoding for location information kept in LRDRs are determined with type field 9860*b*, and references can still use map term reference syntax. Charter processing will use type field 9860*b* for proper interpretation of 9860*c*, regardless of encoding type maintained to LRDRs. In one embodiment, processing is incorporated into MS whereabouts processing.

Figure 6:
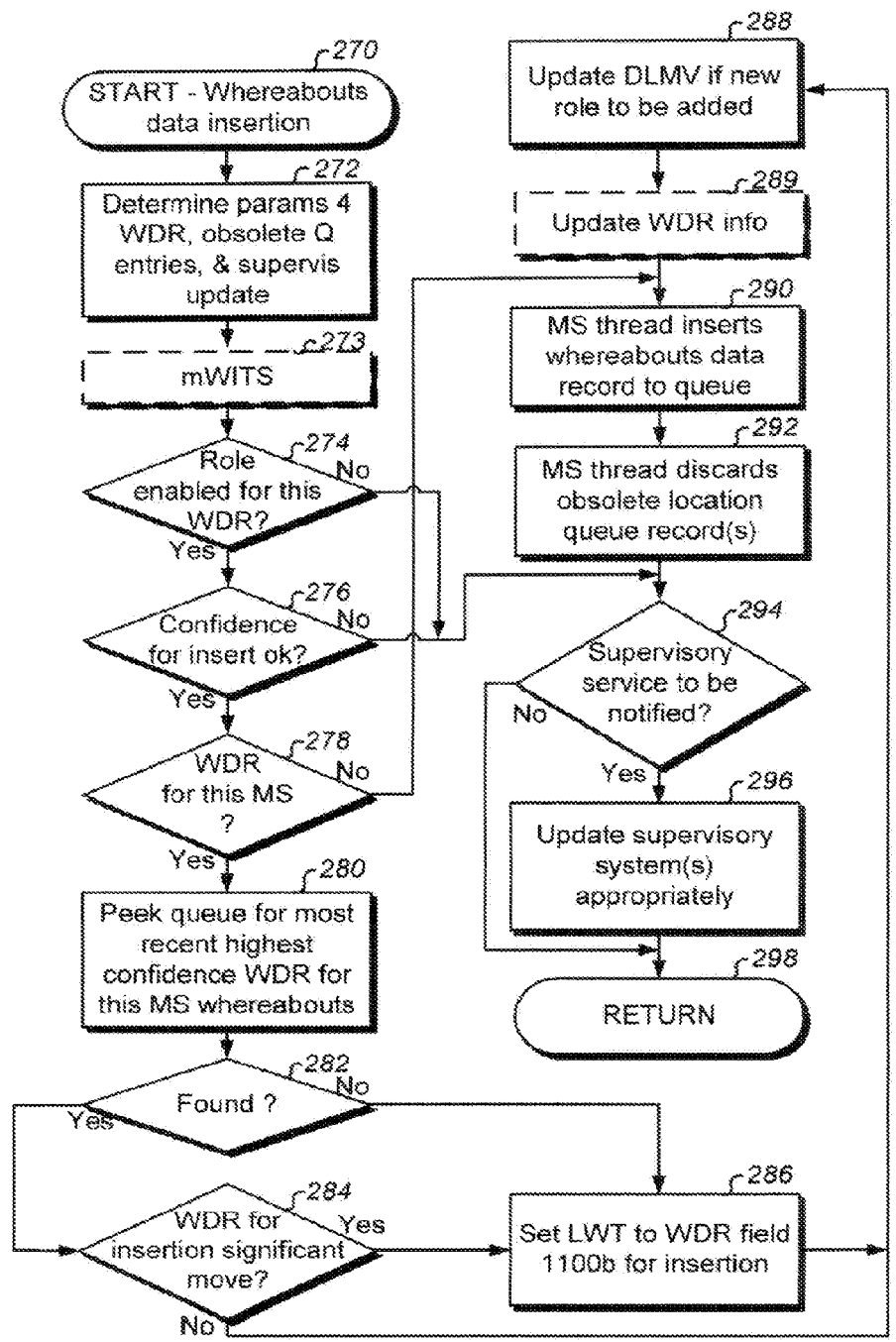
FIG. 6 depicts a flowchart for describing a preferred embodiment of a procedure for inserting a Whereabouts Data Record (WDR) to an MS whereabouts data queue, as described in detail in the parent applications.

With reference now to FIG. 6, depicted is a flowchart for describing a preferred embodiment of a procedure for inserting a Whereabouts Data Record (WDR) to an MS whereabouts data queue, in particular for memorable reference of detail disclosed in the parent applications. LRDR match processing using specified LRDRs with specifications for MS identifier(s) with date/time specifications may be incorporated at block 290 for any WDR information maintained, for example the MS of FIG. 6 processing or any other MS (e.g. in the vicinity). When a user is using FIG. 18 processing to invoke FIG. 24 (e.g. originator intent), the LRDR data or reference to LRDR data, MS identifier data and date/time qualification data is maintained to field 9850*f*, and also for being received at block 4470 from a remote system in accordance with privileges. With reference back to FIG. 24, if block 10566 determines the user did not select to configure LRDR event(s), then processing continues to block 10570.

If block 10570 determines the user selected to configure a system lock/unlock event for automated AD presentation processing, then block 10540 preferably maintains a Boolean variable for lock events and a Boolean variable for unlock events. When the MS is locked (e.g. by a user, or system automatically locks because of inactivity), the lock event triggers invoking FIG. 20 processing, preferably with user identifier information passed in the criteria parameter. CLOC information may or may not be populated for further clarifying the event. Similarly, when the MS is unlocked (e.g. by a user (e.g. with validated password)), the unlock event triggers invoking FIG. 20 processing, preferably with user identifier information passed in the criteria parameter. CLOC information may or may not be populated for further clarifying the event. Various embodiments will pass through the criteria parameter to FIG. 20 processing the full user name, encrypted credentials, or any other associated information which can be maintained and compared to in field 9855*c* through use of an appropriate type field 9855*b*. When a user is using FIG. 18 processing to invoke FIG. 24 (e.g. originator intent), the Boolean variables are automatically populated, and also when receiving MADRs at block 4470 from a remote system in accordance with privileges. If block 10570 determines the user did not select to configure events for system lock or unlock, then processing continues to block 10574. Blocks 10570 through 10572 may also handle system power-on or power-off similarly since this can be a variant of system lock and unlock. FIG. 20 processing should terminate prior to locking or powering-off the system.

EFR information enables targeting ADs to certain users that locked or unlocked the MS. Another embodiment supports maintaining date/time information to EFRs for compare to date/time criteria formatted for comparisons. Date/time EFR information may be used for other events as well for clarification. In some embodiments, different EFR data types can be maintained to the criteria parameter to FIG. 20 processing for joining a variety of EFR data types for comparison processing.

If block 10574 determines the user selected to configure a LBS configuration change event for automated AD presentation processing, then block 10580 preferably maintains a Boolean variable for LBS configuration events. When an LBS configuration change is made as detected in configuration processing (e.g. by a user at the MS), FIG. 20 processing is invoked, preferably with keyword information describing the specific change made passed in the criteria parameter (for compare to EFR information). CLOC information may or may not be populated for further clarifying the event. When a user is using FIG. 18 processing to invoke FIG. 24 (e.g. originator intent), the Boolean variable is automatically populated, and also when receiving MADRs at block 4470 from a remote system in accordance with privileges. If block 10574 determines the user did not select to configure an event for LBS configuration changes, processing continues to block 10578.

If block 10578 determines the user selected to configure a LBX configuration change event for automated AD presentation processing, then block 10580 preferably maintains a Boolean variable for LBX configuration events. When an LBX configuration change is made as detected in configuration processing (e.g. by a user at the MS), FIG. 20 processing is invoked, preferably with keyword information describing the specific change made passed in the criteria parameter (for compare to EFR information). CLOC information may or may not be populated for further clarifying the event. When a user is using FIG. 18 processing to invoke FIG. 24 (e.g. originator intent), the Boolean variable is automatically populated, and also when receiving MADRs at block 4470 from a remote system in accordance with privileges. If block 10578 determines the user did not select to configure an event for LBX configuration changes, then processing continues to block 10582.

If block 10582 determines the user selected to exit FIG. 24 processing, block 10584 terminates the user interface and FIG. 24 processing terminates at block 10586, otherwise block 10582 continues to block 10588. Block 10588 handles other user actions, including other event types for being configured before continuing back to block 10504.

Figure 25B:
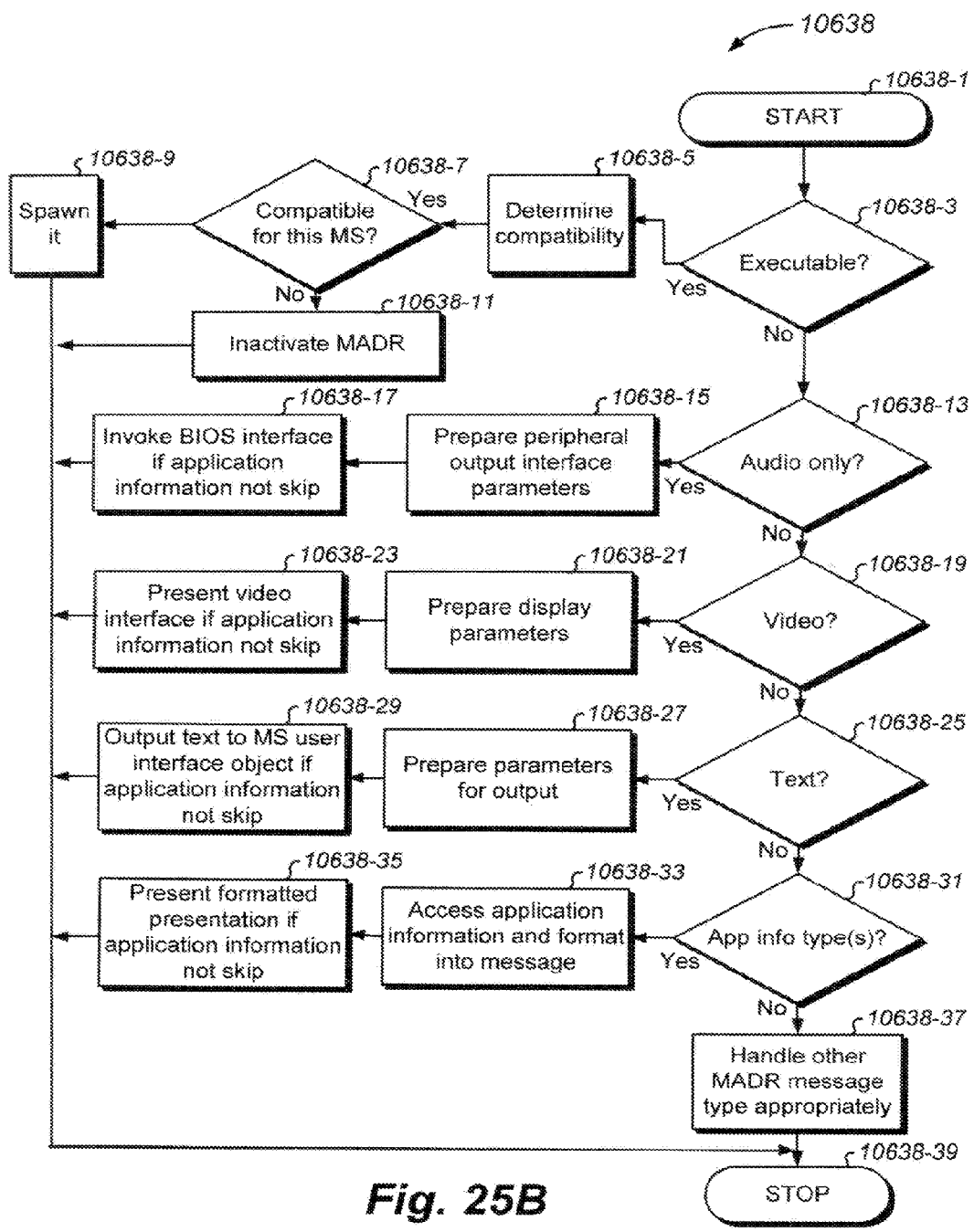

FIGS. 25A and 25B depict a flowchart for describing a preferred embodiment of a procedure for presenting MADR information. MADR presentation processing begins at block 10600, continues to block 10602 where parameters passed are determined, and a current system date/time stamp is accessed. Thereafter, block 10604 checks for expiration criteria in field 9850*f*, and if specified, compares the expiration date/time with the current date/time. If block 10604 determines the MADR is expired, block 10606 expires it (one embodiments inactivates field 9850*j* and another embodiment deletes the MADR entirely) and processing returns to the invoker at block 10634, otherwise block 10608 accesses user preferences maintained outside of MADR objects such as those made by the user with FIG. 24. Thereafter, block 10610 reconciles the MS (observer's) user's configured preferences with MADR (originator's) intent field 9850*f*.

Reconciliation includes setting MS configuration changes to make based on the originator's intent with the observer's preferences for any presentation characteristics (e.g. appearance specifications, volume adjustment specifications, full screen presentation, dedicated area presentation, pop-up/window, title-bar area, mix/preempt, etc), preferably using privileges to govern what can and cannot be set with authority. Thereafter, if block 10612 determines FIG. 25A was invoked for an active phone call line (channel information in parameter passed), processing continues to block 10614. If block 10614 determines the MADR cannot be presented appropriately for the active call line audio or video channel information (e.g. using type field 9850*b*), then block 10616 deactivates the MADR field 9850*j* and the invoker is returned to at block 10634. An alternate embodiment of block 10616 includes error notification processing. If block 10614 determines the MADR to be presented is suitable for the active phone call line, then block 10618 sets this FIG. 25A invocation's subsequent processing logic for making use of the active call line channel information, block 10620 saves current MS configurations determined for change at block 10610, block 10622 accesses available and suitable presentation interfaces at the MS, block 10624 determines which interface is a best fit for the MADR to be presented, and block 10626 checks if a suitable presentation interface was found. A MS should provide a variety of content presentation applications suitable for presenting MADR information. Some of these applications are prepackaged with the MS, or postfactory installed to the MS. For example, a video presentation application may be installed, or an audio application may be installed. A video presentation API may be installed, or an audio API may be installed. When arrived to from block 10618, there is preferably a phone API available for presenting audio information on the active audio channel, and there is preferably a video API for presenting video information on the active video call channel, preferably using FIG. 22 architectures. A MS user may also install APIs or applications for certain presentation content types. Block 10622 accesses known useful applications/interfaces depending on type field 9850*b* and any active channel information, and block 10624 selects a best fit if there is more than one suitable application or interface, perhaps using a user's precedence configuration for which application to select. Thereafter, if block 10626 determines a suitable application or interface (e.g. API) was found, processing continues to block 10628.

Block 10628 optimizes parameters to the application or interface based on MADR field settings and block 10610 reconciliations, makes any remaining MS configuration changes that are not supported with parameters to the application or interface, and block 10630 invokes the application or interface with the parameters for presenting the MADR message field 9850*c*. Block 10628 will invoke FIG. 26 for resolving any application information specifications, for example to build the message for presentation, and block 10630 will not invoke the application or interface if FIG. 26 returns for skipping the presentation. Thereafter, block 10632 restores configurations (if any were modified at block 10628) saved at block 10620, and the FIG. 25A invoker is returned to at block 10634. If block 10626 determines a suitable application or interface was not identified for presenting the MADR at the MS, then block 10636 makes configuration changes (if any) determined at block 10610, block 10638 presents field 9850*c* with FIG. 25B custom processing, and processing continues to block 10632. Custom processing should be a last resort of presentation. The MS is preferably configured with suitable presentation applications or interfaces which can be determined at blocks 10622/10624. Suitable application or interfaces not already factory provided in the MS are preferably a "plug-in" and use installation. Blocks 10622/10624 may determine that the message type field 9850*b* cannot be handled, and that an attempt at presenting MADR information with custom processing should be made.

Referring back to block 10612, if it is determined FIG. 25A was not invoked for an active call (i.e. offline), then block 10640 accesses the MS (observer's) user's prompt configuration data (e.g. configured by FIG. 24), and block 10642 reconciles the MS (observer's) user's configured prompt preferences with any MADR (originator's) intent field 9850*f* prompt configurations. Reconciliation includes setting prompt processing based on the originator's intent with the observer's preferences, preferably using privileges to govern what can and cannot be set with authority. Thereafter, reconciled prompt processing begins at block 10644 for checking to see if a prompt should be provided at all for the presentation.

If block 10644 determines a prompt is to be provided, block 10646 provides the prompt and configured options to the user and block 10648 interfaces with the user for a response. When a user response is made, processing continues to block 10650. Some embodiments present description field 9850*l*, sender information, recipient information, MADR type information, and/or any other useful data about the presentation. Applications, event, CLOC or any other useful information may also be presented in the prompt, and may be enabled/disabled for example for software debug purposes. A preferred embodiment presentation prompt presented at block 10646 may provide any of the following options, depending on reconciliation at block 10642.

Continue with presentation (e.g. Monitor for continue user action);

Cancel presentation (e.g. Monitor for cancel user action);

Re-schedule this presentation at a future time on the MS user's calendar;

Re-schedule in convenient time units this presentation for processing in a period of time (e.g. delay for retrying presentation in 1 hour, 5 minutes or 200 seconds);

Re-schedule this presentation for a specified future date/time; or

Save presentation reference to history information for optional access at a later time;

If block 10650 determines the user did not select to continue with the presentation, then block 10652 determines if the user qualified the cancellation for any of the options provided. If block 10652 determines the user selected to qualify canceling the presentation, then block 10654 processes qualifications and the invoker is returned to at block 10634. Block 10654 processes qualifications preferably as described here:

Re-schedule this presentation at a future time on the MS user's calendar; Block 10652 creates a calendar entry containing MADR handle field 9850*a* for the user's specified date/time information. The calendar entry becomes in effect a schedule processing alert which executes at that time. The processing alert uses the MADR handle to access the MADR, sets FIG. 25A invocation parameters, and invokes FIG. 25A processing at that time.

Re-schedule in convenient time units this presentation for processing in a period of time (e.g. delay for retrying presentation in 1 hour, 5 minutes or 200 seconds) <OR> Re-schedule this presentation for a specified future date/time; An asynchronous thread is started for sleeping the specified period of time and then invoking at that time FIG. 25A parameters including the MADR. The thread terminates after invoking FIG. 25A for the re-processing of the MADR.

Save presentation reference to history information for optional access at a later time; The MADR, or handle field 9850a, is saved to history (e.g. LBX history) so that the MS user can later select it for presentation, perhaps with saved parameters, at that time.

If block 10652 determines the user did not qualify the cancellation (i.e. outright cancelled it), then processing continues to block 10634. Referring back to block 10650, if it is determined the user selected to continue with the presentation, processing continues to block 10656. Referring back to block 10644, if it is determined that no prompt was to be provided, processing continues to block 10656. If block 10656 determines that delivery criteria field 9850h is null, then processing continues for MS local presentation at block 10620. Block 10620 and subsequent processing is as described above except there is no active line (channel) information to be associated with the presentation.

If block 10656 determines delivery criteria is specified, then processing continues to block 10658. If block 10658 determines the MADR is to be sent using a well known transport layer interface (e.g. SMTP), then block 10660 prepares parameters (e.g. appearance information) for sending the MADR information, block 10662 invokes the transport interface and processing continues to block 10634. In effect, the MADR is presented by sending it to the delivery criteria which may be a single recipient, group of recipients, or wildcard specification of recipients. If block 10658 determines delivery criteria is not destined for a well known transport layer interface, the MADR is delivered to the remote MS(s) by preparing send parameters at block 10664 and invoking send processing of FIG. 13A at block 10666 before continuing to block 10634. Depending on settings in the application distribution for outbound processing, FIG. 13A may need to be invoked for a plurality of recipient MSs, therefore an iterative loop 10668 is appropriately incorporated around blocks 10644 and 10666 for handling multiple recipients, and for handling attempts for a prioritized retry. An alternate embodiment may handle multiple recipients in send processing invoked at block 10666 depending on a transport interface used. Parameters are prepared at block 10664 so a MADR is delivered in its entirety for processing at the receiving MS(s). Other transport mechanisms may be utilized. Preferably, a CLOC parameter is passed whenever possible, including via block 10666, whereby whereabouts is accessed at block 10664.

FIG. 25B depicts a flowchart for describing block 10638 custom presentation processing to do the best possible presentation in absence of a suitable application or interface. Block 10638 processing begins at block 10638-1, and continues to block 10638-3. If block 10638-3 determines field 9850c is an executable, block 10638-5 determines compatibility for being executed by the MS. Thereafter, if block 10638-7 determines the executable is compatible for the MS (e.g. 32 bit Intel executable for 32 bit Intel architecture), block 10638-9 spawns the executable process for execution at the MS and block 10638 processing terminates at block 10638-39, otherwise block 10638-11 deactivates MADR field 9850j and processing continues to block 10638-39. Some embodiments will provide an error notification at block 10638-11. If block 10638-3 determines field 9850c is not for an executable, processing continues to block 10638-13.

Figure 26:
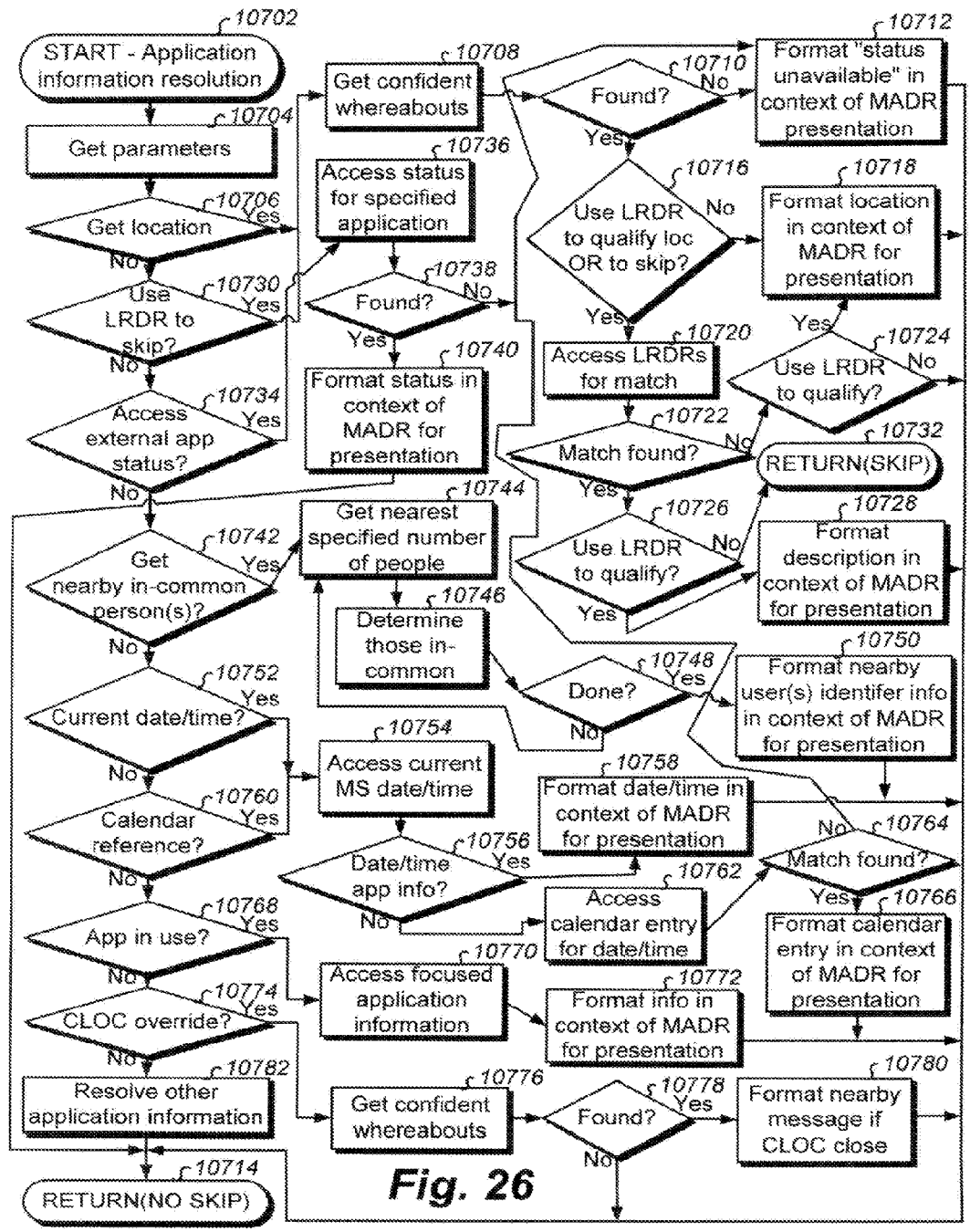
FIG. 26 depicts a flowchart for describing a preferred embodiment of application information resolution processing.

If block 10638-13 determines field 9850c is for audio only, block 10638-15 prepares peripheral output interface parameters using block 10610 reconciliations and first invoking the FIG. 26 procedure for resolving any specified application information. LRDR is information may be used to skip presentation processing (e.g. no presenting at MS whereabouts described by a LRDR), therefore a skip return is checked for at block 10638-17. After resolving any application information, block 10638-15 finalizes the message and block 10638-17 invokes the peripheral BIOS interface for presenting the audio if no skip was to be processed. Block 10638-15 is capable of many format transformations in order to get the audio to a proper format to the interface invoked at block 10638-17. Active call line (channel) audio play was preferably handled with an API in FIG. 25A, and active call information preferably need not be used at block 10638-17, however block 10638-17 can interface for audio output using architecture of FIG. 22. Processing leaves block 10638-17 for block 10638-39. If block 10638-13 determines field 9850c is not for audio only, processing continues to block 10638-19.

If block 10638-19 determines field 9850c is for video, block 10638-21 prepares display interface parameters using block 10610 reconciliations and first invoking the FIG. 26 procedure for resolving any specified application information. LRDR information may be used to skip presentation processing (e.g. no presenting at MS whereabouts described by a LRDR), therefore a skip return is checked for at block 10638-23. After resolving any application information, block 10638-21 finalizes the message and block 10638-23 invokes the video display interface for presenting the video if no skip was to be processed. In one embodiment, the MS display buffer is written to for display to the MS. Block 10638-21 is capable of many format transformations in order to get the video to a proper format. Depending on FIG. 26 processing and block 10610 reconciliations, MS whereabouts information may be encoded as a ghosting image over the video of message field 9850c. Active call line (channel) video play was preferably handled with an API in FIG. 25A, and active call information preferably need not be used at block 10638-23, however block 10638-23 can interface for video output using architecture of FIG. 22. Processing leaves block 10638-23 for block 10638-39. If block 10638-19 determines field 9850c is not for video, processing continues to block 10638-25.

If block 10638-25 determines field 9850c is for text, block 10638-27 prepares textual display parameters using block 10610 reconciliations and first invoking the FIG. 26 procedure for resolving any specified application information. LRDR information may be used to skip presentation processing (e.g. no presenting at MS whereabouts described by a LRDR), therefore a skip return is checked for at block 10638-29. After resolving any application information, block 10638-27 finalizes the message and block 10638-29 presents text to the appropriate user interface object if no skip was to be processed. Block 10638-27 is capable of many format transformations in order to get the final form text. Active call line audio play was preferably handled with an API in FIG. 25A, and active call information preferably need not be used at block 10638-29, for example to annunciate the text during an active call, however block 10638-29 can interface for audio output using architecture of FIG. 22. Processing leaves block 10638-29 for block 10638-39. If block 10638-25 determines field 9850*c* is not for text, processing continues to block 10638-31.

If block 10638-31 determines field 9850*c* is exclusively for an application information type, block 10638-33 prepares presentation parameters using block 10610 reconciliations and first invoking the FIG. 26 procedure for resolving the specified application information. LRDR information may be used to skip presentation processing (e.g. no presenting at MS whereabouts described by a LRDR), therefore a skip return is checked for at block 10638-35. After resolving the application information, block 10638-33 finalizes the message and block 10638-35 presents the message in accordance with other MADR fields if no skip was to be processed. Block 10638-33 is capable of many format transformations in order to get the target presentation format. Active call line play was preferably handled with an API in FIG. 25A, and active call information preferably need not be used at block 10638-35, for example to provide information during an active call, however block 10638-35 can interface for output using architecture of FIG. 22. Processing leaves block 10638-35 for block 10638-39. If block 10638-31 determines field 9850*c* is not for an application information type, processing continues to block 10638-37 where other MADR types (if defined) are processed appropriately, and processing continues to block 10638-39.

FIG. 26 depicts a flowchart for describing a preferred embodiment of application information resolution processing, for example as invoked by blocks 10628, 10638-15, 10638-21, 10638-27, 10638-33 and 10638-37. Processing begins at block 10702, continues to block 10704 for accessing parameters passed (e.g. MADR, sender, recipient, CLOC), and block 10706 for starting the checks for which application information has been specified. If block 10706 determines application information is for presenting the current MS location information, block 10708 gets the current MS (of FIG. 26 processing) whereabouts of a reasonable confidence and processing continues to block 10710. If block 10710 determines a confident whereabouts of the MS could not be determined, then block 10712 uses MADR information to form an appropriate "status unavailable" message for presentation and processing returns to the invoker at block 10714 for not skipping the presentation. If block 10710 determines the MS location (whereabouts) was determined, then block 10716 checks the application information for being qualified for using LRDR information to enhance the presentation message (e.g. use user friendly description field 9860*d*) in which case processing continues to block 10720, otherwise block 10718 forms an appropriate message containing location information in as informative terms as possible (some embodiments just report latitude and longitude which is not very informative), and processing continues to block 10714. Block 10720 accesses LRDRs 9860 for a match to whereabouts from block 10708, and processing continues to block 10722. If block 10722 determines the MS whereabouts match the location of a LRDR (uses encoding field 9860*c* using type field 9860*b*), then processing continues to block 10726, otherwise processing continues to block 10724. If block 10726 determines the application information qualified using LRDR information to make a more informative message, then block 10728 uses description field 9860*d* of the matched LRDR to provide a user friendly whereabouts message of where the MS is currently located (e.g. use convenient waymark information description to describe the current MS whereabouts to: a caller for OGM processing or callee for OCM processing), and processing continues to block 10714. Block 10726 will continue to block 10732 if arrived to by way of block 10730.

If block 10724 determines a LRDR should be used to qualify MS whereabouts (however no LRDR match was found), then processing continues to block 10718. Block 10724 will continue to block 10714 if arrived to by way of block 10730. Returning back to block 10706, if block 10706 determines application information is not for presenting the current MS location information, then processing continues to block 10730.

If block 10730 determines application information is for using LRDR information to potentially skip providing the presentation, then processing continues to block 10708 for processing as described above with the following exceptions:
1) Block 10716 continues unconditionally to block 10720;
2) Block 10724 continues to block 10714 when no LRDR match was found for the current MS whereabouts (i.e. do not skip the presentation); and
3) Block 10726 continues unconditionally to block 10732 for returning to the invoker for skipping the MADR presentation entirely (when a LRDR match was found). This provides the user with a way to use waymark information for defining where not to have a presentation.

If block 10730 determines application information is not for checking to skip the presentation, then processing continues to block 10734.

If block 10734 determines application information is for accessing MS user status from an external application (e.g. Facebook, Twitter), then processing continues to block 10736 for accessing the status, preferably through an API. Other embodiments can force a user interface refresh from the external application (e.g. load html page) in order to access data therein for obtaining status. Thereafter, if block 10738 determines useful status was found, then block 10740 builds an informative message with the status and processing continues to block 10714, otherwise processing continues to block 10712. If block 10734 determines application information is not for accessing MS user status from an external application, then processing continues to block 10742.

If block 10742 determines application information is for accessing information about MS users in the vicinity and "in common" with the MS of FIG. 26 processing, then processing continues to block 10744 for accessing locally maintained whereabouts information for the specified number of users in the vicinity of the MS of FIG. 26 processing. Application information specifications for nearby "in common" person(s) include a number of nearby MS users (1 or more), and a distance measurement in convenient units for how nearby (e.g. 25 feet). Thereafter, block 10746 accesses permissions granted to both the sender passed to FIG. 26 processing (if not null) and each user found in the vicinity of the MS (user) of FIG. 26 processing. Granted permissions are one embodiment for determining the "in common" condition. Other embodiments will access contact lists, call history, email history, SMS history, the like, or combination thereof, to determine the "in common" condition. Thereafter, if block 10748 determines that the sought number (e.g. 1) of "in common" MSs in the vicinity (within specified distance) are found, then block 10750 builds an informative message with user identifier information, for example to inform to call someone else nearby. Block 10750 preferably uses source section 8002*a* to build a message with the best identifier information depending on the message type field 9850*b*. Processing leaves block 10750 for block 10714. If block 10748 determines the sought number of nearby person(s) "in common" have not yet been found, then processing continues back to block 10744 for checking for additional MSs in the vicinity. Blocks 10744, 10746 and 10748 stay in a loop until MSs are identified, or there are not enough of them in the vicinity meeting specifications. Block 10750 also builds a message indicating there is no status available and no people "in common" nearby that may help. If block 10742 determines application information is not for accessing MS user information for nearby person(s) in common, then processing continues to block 10752.

If block 10752 determines application information is for accessing the current MS date/time information, block 10754 accesses the current MS time and processing continues to block 10758 through block 10756 for building a message containing date/time information. Thereafter, processing continues to block 10714. If block 10752 determines application information is not for accessing the current MS date/time information, then processing continues to block 10760.

If block 10760 determines application information is for accessing MS user calendar information, block 10754 accesses the current MS time and processing continues to block 10762 through block 10756 for accessing a calendar information scheduled for the current time. Thereafter, if block 10764 determines a calendar entry matches the current time, then block 10766 builds a message containing the informative scheduled calendar information and processing continues to block 10714, otherwise processing continues to block 10712. If block 10760 determines application information is not for accessing the calendar information, then processing continues to block 10768. An alternate embodiment supports qualifying the application information for calendar access with identifier information identifying the owner of the calendar information to be accessed.

If block 10768 determines application information is for accessing the current application in use at the MS, block 10770 accesses the currently focused application information (e.g. title-bar information, application name, description field information 5300*b*, or other informative data), block 10772 builds an informative message using the information found, and processing continues to block 10714. If no focused information could be determined, then default a message is built at block 10772 (e.g. message as to user is busy using MS). If block 10768 determines application information is not for accessing the current application in use, then processing continues to block 10774.

If block 10774 determines application information is for overriding a message with CLOC information, block 10776 accesses a confident MS (of FIG. 26 processing) whereabouts. Thereafter, if block 10778 determines a confident whereabouts could not be determined, then processing continues to block 10714 for normal processing of the field 9850*c*, otherwise block 10780 overrides (replaces) any message in field 9850*c* with an informative message that the sender/caller is nearby if the MS of FIG. 26 processing is nearby the CLOC associated with the sender/caller. A preferred embodiment allows qualifying with a specification for a distance in convenient units for how close to denote being nearby. Block 10780 will not override message field 9850*c* if CLOC is null, or if the nearby condition is not true. If the CLOC is nearby the whereabouts determined at block 10776, then an informative message is built that the sender is nearby, perhaps with how nearby using the qualifier specification in the message. Thereafter, processing continues to block 10714. If block 10774 determines application information is not for overriding a message with CLOC information, then processing continues to block 10782 where other application information types (if defined) are resolved, and processing continues to block 10714. In one example, a CLOC override is useful for letting a remote caller know they are within shouting range.

MS whereabouts (e.g. at blocks 10708, 10776, etc) are determined using the MS GPS interface, a WDR queue disclosed in the parent applications, a location retrieval interface, or any other MS resource for determining the location of the MS.

An alternate embodiment defines a new use field 9860*f* containing what application information the LRDR is to be used for (e.g. bit field mask like use field 9850*d* for: presentation skipping and/or location reporting and/or specific map application use, etc).

The sender or caller, and recipient or callee, can take on a variety of identifier embodiments. When provided in a form which should be transformed to another form for proper comparison or processing, source section 8002*a* information can be used for cross application addressing to translate from one identifier form to another identifier form when necessary.

Statistics and history are maintained for user configurations with FIG. 18 (e.g. each variety of MADR objects (and associated EFRs) created, deleted and modified for distinct settings in any record fields), varieties of MADR objects sent with FIG. 10A and received with FIG. 10B (e.g. each variety of MADRs (and associated EFRs) based on distinct settings in any record fields), observer and originator configurations through FIG. 24 (e.g. each variety of events configured), varieties of MADR objects sent with FIG. 13A and received with FIG. 13B (e.g. each variety of MADRs (and associated EFRs) based on distinct settings in any MADR fields), varieties of events which occur for searching MADRs and which varieties of MADRs and EFRs are matched along with event date/time information, observer and originator configurations for reconciliation and how reconciled, MADR varieties which are presented along with date/time information, varieties of AD event configurations received by FIG. 10B, errors which are encountered or unanticipated, or criteria of any other processing block or data. An LBS service informant may also be used to inform a service of how MADR objects were used, maintained, presented, or processed at a MS.

In an alternate embodiment, MADRs do not contain an expression field 9850*g*. Permissions (privileges) in place between the sender/caller and recipient/callee are completely relied upon for governing what conditional processing is to take place. In another embodiment, both the expression and privileges are used to determine what conditional processing is to take place, preferably with privileges having precedence over expression evaluation. Wherever permissions are used herein, they are enforced through the LBX model of identifiers or groups of identifiers (e.g. field 9850*i* may carry group information).

Company name and/or product name trademarks used herein belong to their respective companies.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

What is claimed is:

1. A method comprising:
   initiating a telephony call from a calling mobile data processing system to a called data processing system, wherein the telephony call is completed through to the called data processing system;
   in response to invocation of a user request to leave message information at the called data processing system, initiating background processing on the calling mobile data processing system for handling the telephony call, the background processing transferring management of the telephony call from active processing to the background processing, wherein the calling mobile data processing system is capable of executing other applications on the calling mobile data processing system while the telephony call is handled by the background processing;

determining with the background processing the message information from a plurality of preconfigured information including user defined waymark information and by comparing a situational location of the calling mobile data processing system with another situational location of another data processing system;

the background processing initiating transmission of the message information from the calling mobile data processing system to the called data processing system; and following transmission of the message information to the called data processing system, the background processing terminating the telephony call.

2. The method of claim 1 further including detecting with the background processing a prompt provided by the called data processing system indicating readiness to accept the message information.

3. The method of claim 1 wherein the message information includes audio information.

4. The method of claim 1 wherein the message information includes visual media information.

5. The method of claim 1 wherein the calling mobile data processing system confirms that the called data processing system will save transmitted message information to a storage device prior to transmitting the message information.

6. The method of claim 1 wherein the message information contains status from an externally accessed application.

7. The method of claim 1 wherein the plurality of preconfigured information includes a plurality of messages configured by a user of the calling mobile data processing system.

8. The method of claim 1 wherein the transmission of the message information includes the background processing leaving a voice message at the called data processing system.

9. A calling wireless handheld mobile device, comprising:
a processor;
a user interface;
a wireless communication interface, coupled to the processor and configured to be coupled to at least one wireless communication channel; and
a memory coupled to the processor, wherein the memory includes instructions which, when executed by the processor, results in the calling wireless handheld mobile device:
initiating a telephony call from the calling wireless handheld mobile device to a called data processing system, wherein the telephony call is completed through to the called data processing system;
in response to invocation of a user request to leave message information at the called data processing system, initiating background processing on the calling wireless handheld mobile device for handling the telephony call, the background processing transferring management of the telephony call from active processing to the background processing, wherein the calling wireless handheld mobile device is capable of executing other applications on the calling wireless handheld mobile device while the telephony call is handled by the background processing;

determining with the background processing the message information from a plurality of preconfigured information including user defined waymark information and by comparing a situational location of the calling wireless handheld mobile device with another situational location of another data processing system;

the background processing initiating transmission of the message information from the calling wireless handheld mobile device to the called data processing system; and following transmission of the message information to the called data processing system, the background processing terminating the telephony call.

10. The calling wireless handheld mobile device of claim 9, further including detecting with the background processing a prompt provided by the called data processing system indicating readiness to accept the message information.

11. The calling wireless handheld mobile device of claim 9, wherein the message information includes audio information.

12. The calling wireless handheld mobile device of claim 9, wherein the message information includes visual media information.

13. The calling wireless handheld mobile device of claim 9, wherein the calling wireless handheld mobile device confirms that the called data processing system will save transmitted message information to a storage device prior to transmitting the message information.

14. The calling wireless handheld mobile device of claim 9, wherein the message information contains status from an externally accessed application.

15. The calling wireless handheld mobile device of claim 9, wherein the plurality of preconfigured information includes a plurality of messages configured by a user of the calling wireless handheld mobile device.

16. The calling wireless handheld mobile device of claim 9, wherein the transmission of the message information includes the background processing leaving a voice message at the called data processing system.

* * * * *